United States Patent
Phillips et al.

(10) Patent No.: US 12,021,758 B2
(45) Date of Patent: Jun. 25, 2024

(54) MANAGING NETWORK SLICE BANDWIDTH FOR REMOTE GAME SESSIONS

(71) Applicants: Telefonaktiebolaget LM Ericsson (publ), Stockholm (SE); Chris Phillips, Hartwell, GA (US)

(72) Inventors: Chris Phillips, Hartwell, GA (US); Robert Hammond Forsman, Jr., Sugar Hill, GA (US); Per-Erik Brodin, Scotts Valley, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 18/034,845

(22) PCT Filed: Oct. 29, 2020

(86) PCT No.: PCT/US2020/058002
§ 371 (c)(1),
(2) Date: May 1, 2023

(87) PCT Pub. No.: WO2022/093238
PCT Pub. Date: May 5, 2022

(65) Prior Publication Data
US 2023/0403242 A1 Dec. 14, 2023

(51) Int. Cl.
*G06F 15/16* (2006.01)
*A63F 13/355* (2014.01)
(Continued)

(52) U.S. Cl.
CPC .......... *H04L 47/803* (2013.01); *A63F 13/355* (2014.09); *H04L 47/76* (2013.01); *H04L 67/131* (2022.05)

(58) Field of Classification Search
CPC ..... H04L 47/76; H04L 47/131; H04L 47/803; A63F 13/355
(Continued)

(56) References Cited

U.S. PATENT DOCUMENTS

| 8,595,787 | B2* | 11/2013 | Riley | H04L 47/781 726/1 |
| 8,619,630 | B2* | 12/2013 | Riley | H04L 47/781 370/255 |

(Continued)

OTHER PUBLICATIONS

Experiential Networked Intelligence (ENI); ENI use cases, ETSI GS ENI 001 V3.0.8, Jul. 2020.
(Continued)

*Primary Examiner* — Moustafa M Meky
(74) *Attorney, Agent, or Firm* — Weisberg I.P. Law, P.A.

(57) ABSTRACT

A multisession remote game scheme in a distributed network architecture including a dedicated network slice for gaming. A remote game rendering application service deployed in a trusted edge data network includes a remote render system (RRS) manager operative to instantiate one or more remote game rendering engines coupled to respective game engines. RRS manager interfaces to a remote gaming back office disposed in an external network, wherein the RRS manager instantiates and manages a plurality of gaming sessions responsive to game session setup requests propagated from the back office on behalf of clients. An edge routing application is configured to provide edge network location information of the game engines to the remote game back office. A multisession game slice bandwidth manager is operative to allocate a respective bandwidth to each of the plurality of gaming sessions from a dedicated bandwidth of the network slice serving the plurality of gaming sessions.

20 Claims, 29 Drawing Sheets

(51) Int. Cl.
*H04L 47/76* (2022.01)
*H04L 47/80* (2022.01)
*H04L 67/131* (2022.01)

(58) Field of Classification Search
USPC .......................................................... 709/226
See application file for complete search history.

(56) References Cited

U.S. PATENT DOCUMENTS

| | | | | |
|---|---|---|---|---|
| 11,477,610 | B2* | 10/2022 | Hagland | A63F 13/216 |
| 11,654,354 | B2* | 5/2023 | Zimring | A63F 13/335 |
| | | | | 463/42 |
| 2004/0230444 | A1 | 11/2004 | Holt et al. | |
| 2005/0091505 | A1* | 4/2005 | Riley | H04L 47/781 |
| | | | | 713/182 |
| 2005/0163060 | A1* | 7/2005 | Riley | H04L 47/70 |
| | | | | 370/254 |
| 2007/0180119 | A1 | 8/2007 | Khivesara et al. | |
| 2016/0006835 | A1* | 1/2016 | Robinson | H04L 65/60 |
| | | | | 709/203 |
| 2016/0072853 | A1* | 3/2016 | Bellet | H04L 65/1059 |
| | | | | 709/204 |
| 2017/0312626 | A1 | 11/2017 | Colenbrander | |
| 2018/0287891 | A1 | 10/2018 | Shaw et al. | |
| 2019/0321725 | A1* | 10/2019 | Zimring | A63F 13/358 |
| 2021/0220733 | A1* | 7/2021 | Zimring | A63F 13/335 |
| 2021/0377696 | A1* | 12/2021 | Hagland | H04L 67/52 |
| 2023/0117969 | A1* | 4/2023 | Zimring | A63F 13/358 |
| | | | | 463/42 |

OTHER PUBLICATIONS

Qualcomm Incorporated (Rapporteur), FS_XRTraffic: Permanent document, v0.3.0, S4-201245, 3GPP TSG SA WG4#110-e meeting, Aug. 19-28, 2020.

3GPP TR 26.928 V16.0.0, "3rd Generation Partnership Project; Technical Specification Group Services and System Aspects; Extended Reality (XR) in 5G (Release 16)", Mar. 2020.

3GPP TS 23.501 V16.5.1, "3rd Generation Partnership Project; Technical Specification Group Services and System Aspects; System architecture for the 5G System (5GS); Stage 2 (Release 16)", 3GPP TS 23.501 V16.5.1, Aug. 2020.

Alshahrani et al., Efficient Multi-Player Computation Offloading for VR Edge-Cloud Computing Systems, Applied Sciences, vol. 10, No. 16, 5515, Aug. 10, 2020.

Leconte et al., "A Resource Allocation Framework for Network Slicing", IEEE Conference on Computer Communications, p. 2177-2185, Apr. 16, 2018.

EPO Communication dated Apr. 23, 2024 for Patent Application No. 20828872.0, consisting of 6 pages.

* cited by examiner

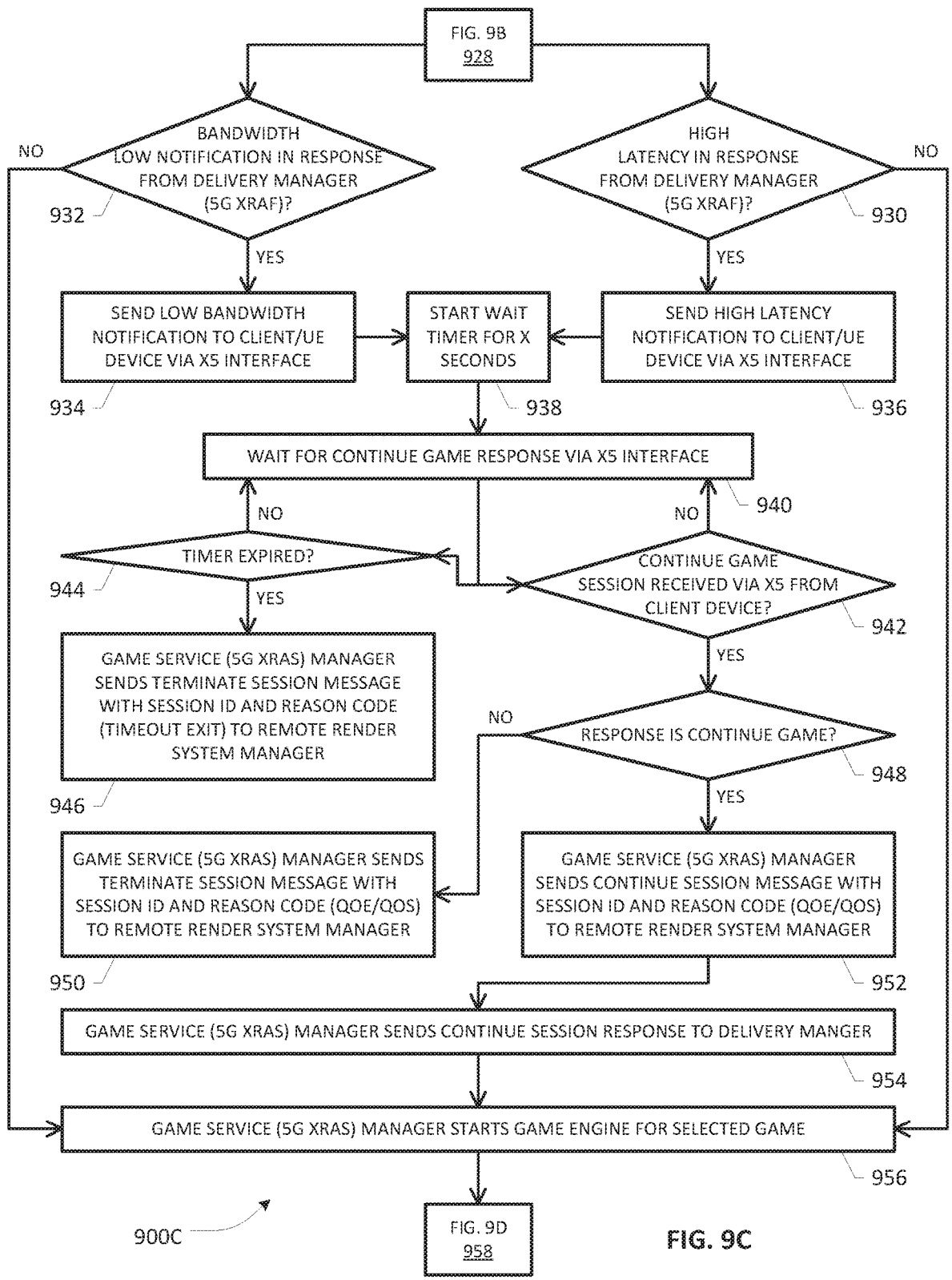

MANAGING NETWORK SLICE BANDWIDTH FOR REMOTE GAME SESSIONS

RELATED APPLICATIONS

This application is a national phase application of International Patent Application No. PCT/US2020/058002, filed Oct. 29, 2020, the disclosure of which is hereby incorporated herein by reference in its entirety.

TECHNICAL FIELD

The present disclosure generally relates to remote game rendering. More particularly, and not by way of any limitation, the present disclosure is directed to a system, method, apparatus and associated computer readable media for managing network slice bandwidth for remote game sessions in a distributed network architecture.

BACKGROUND

Remote game rendering, also referred to as cloud gaming, is gaining traction by game studios, Internet companies and network operators. Currently, there are products on the market (e.g., Google's Stadia, Sony's PS Now, etc.) that offer remote game streaming and download as a service. Download refers to downloading the game to the local hard drive where the game runs locally on the gaming console or personal computer (PC). Streaming refers to running the game (e.g., executing, rendering, and encoding) somewhere in the network and receiving the output of the rendered game (e.g., a stream) on a client device. The controller input is consumed on the local device and delivered over the network to the remotely running game engine.

This approach provides several advantages, including making the game accessible on-demand without the need to download and install it locally, and on a wider range of devices, including, e.g., mobile devices such as smartphones, tablets, digital media players, or proprietary thin client-like devices, due to lower hardware requirements for running the game locally.

Cloud gaming requires significant infrastructure for the services to work as intended, including datacenters and server farms for running the games, and high-bandwidth internet connections with low latency for delivering the streams to users. The network infrastructure required to make cloud gaming feasible was, for many years, not available in most geographic areas, or unavailable to consumer markets. Due to their dependency on high-quality streaming video, the ability to use a service regularly may also be limited by data caps enforced by some Internet Service Providers (ISPs).

Increasingly, augmented and virtual reality (AR/VR) are becoming standard offerings in gaming environments, with companies finding potential in the technology in a host of gaming applications including cloud gaming. One of the goals of the industry is to replace and/or supplement conventional user interfaces such as keyboards, displays, joysticks, handheld gaming controllers, etc. with new paradigms for human-machine communication and collaboration, thereby facilitate a major shift in user engagement in AR/VR-based gamespaces for providing a richer and more immersive player experience.

Regardless of whether VR or non-VR gaming environment is involved, a major factor in the quality of a cloud gaming service is latency, as the amount of delay between the user's inputs and when they take effect can affect gameplay—especially in fast-paced games dependent on precise inputs (such as, e.g., first-person shooters, fighting games, etc.).

Although advances in cloud gaming continue to take place on various fronts, several lacunae remain thereby requiring further innovation as will be set forth hereinbelow.

SUMMARY

The present patent disclosure is directed to systems, methods, apparatuses, devices, and associated non-transitory computer-readable media for facilitating multisession remote game rendering in a split network architecture that leverages a distributed computational topology, wherein a trusted operator network and a cloud-based remote gaming back office are cooperatively interfaced to effectuate edge-optimized game rendering on a session-by-session basis. In one aspect, an embodiment of a trusted operator network is disclosed, which comprises, inter alia, a remote render system (RRS) manager having an interface to a remote gaming back office disposed in an external network, the RRS manager operative to instantiate and manage a plurality of gaming sessions responsive to game session setup requests. In one arrangement, the game session setup requests may be propagated from the remote gaming back office on behalf of one or more gaming client devices disposed in the network. A plurality of remote rendering subsystems or engines may be instantiated by the RRS manager, each remote rendering subsystem coupled to a corresponding game engine operative to support a particular respective gaming session of the plurality of gaming sessions. An edge routing application service or subsystem is configured to provide edge network location information of the game engines to the remote game back office based on the location of the respective client devices in the network. In one arrangement, a game database may be included containing a plurality of games provisioned from the external network. In one arrangement, example operator network may further comprise a multisession game slice (MGS) bandwidth manager operative to allocate a respective bandwidth to each of the plurality of gaming sessions from a dedicated bandwidth of a network slice serving the plurality of gaming sessions. In one arrangement, a remote rendering engine instantiated by the RRS manager with respect to a particular gaming session may be executed as a virtual machine (VM) or container comprising a game service manager for managing the gaming session, wherein the game service manager is operative to communicate with a session handler executing at a corresponding client device with respect to at least one of establishing and terminating the particular gaming session involving a selected game title. Depending on implementation, a remote rendering engine and associated game engine may be executed on the same VM/container with respect to a gaming session. In one arrangement, a game service manager is further operative to receive and/or process, inter alia, a filtered quality profile of the selected game title to match the capability information of the corresponding client device. In one arrangement, a game service manager may be configured to launch a delivery manager, an adaptive projection mapping module, a low latency adaptive video/audio (V/A) encoder with haptics and mesh delivery module, and a gaze and controller data handler module, and wherein at least one of the delivery manager, the adaptive projection mapping module, the low latency adaptive V/A encoder with haptics and mesh delivery module, and the gaze and controller data handler module may be configured based on the filtered quality profile of the selected game title.

In another aspect, an embodiment of a cloud data network is disclosed, which comprises, inter alia, a remote gaming back office (RGBO) subsystem that includes a first interface to receive game session requests from a plurality of client devices; a second interface to an RRS manager disposed in a trusted operator network configured to support multisession game rendering, the RGBO subsystem operative to correspond with the RRS manager with respect to the game session requests from the client devices; and a third interface to an edge routing application service subsystem disposed in the operator network for selecting and/or obtaining edge network location information of a plurality of game engines instantiated based on the respective locations of the respective client devices in the network. In one arrangement, the cloud data network may include a game database having a plurality of game title profiles for providing gaming content to the respective game engines disposed in the operator network. In one arrangement, one or more interfaces between the cloud data network and the trusted operator network may be effectuated as standards-based interfaces compliant with a 5G network implementation.

In another aspect, an embodiment of a remote game render management method is disclosed, which comprises, inter alia, receiving a game session setup request from a remote gaming back office subsystem, the session setup request including a quality profile with respect to a game title requested from a game client; instantiating a game service instance including a game service manager for starting a game session for the requested game title; sending a session startup request to the game service manager, the session startup request including a remote render session identifier (ID); sending a game session setup response to the RGBO subsystem with the remote render session ID and connection information of the game service manager; and receiving a session startup response for the game service manager and commencing delivery of gaming content to the game client with respect to the requested game title. In one arrangement, a remote game render management method may further include, responsive to determining that a termination message is received from the game service manager with respect to a current game session, transmitting a session termination message including the session ID of the current game session to the RGBO subsystem; and stopping the game session with the game client and terminating the game service instance. In one arrangement, a session termination message received from the game service manager may include a reason code identifying a cause for terminating the game session with the game client.

In another aspect, an embodiment of a remote gaming back office method is disclosed, which comprises, inter alia, receiving game session requests from a plurality of client devices; obtaining edge network location information of a plurality of game engines, each respective game engine operative for facilitating remote rendering with respect to a corresponding game session with a particular client device; transmitting to an RRS manager a plurality of session setup requests corresponding to the game session requests for starting a corresponding plurality of game sessions, each particular respective session setup request including a session ID and quality profile information associated with a requested game title received via a corresponding game session request from a respective client device; receiving from the RRS manager a plurality of session setup responses, each respective session setup response including connection information of a corresponding game service manager and the session ID associated with a respective game session; and transmitting the connection information of the game service manager and the session ID of each respective game session to a particular respective client device via a corresponding game session response.

In another aspect, an embodiment of a method for managing network slice bandwidth for remote game sessions is disclosed. The claimed bandwidth management method comprises, inter alia, populating a remote game session list corresponding to one or more remote game sessions sharing a network slice having a slice bandwidth size, each remote game session identified in the remote game session list with a session identifier (ID) and having a bandwidth ceiling, a bandwidth floor and a tier, wherein the bandwidth ceiling, the bandwidth floor, and the tier corresponding to a particular respective remote game session are determined based on at least one of; a quality of service (QoS) indication identified in a session request from a gaming client device with respect to a game title, a game profile table associated with the game title, and one or more device capability parameters indicated in the session request. Responsive to detecting a triggering input, a bandwidth allocation process is executed to determine a bandwidth allocated or reallocated to each respective remote game session, wherein the bandwidth (re)allocation process includes an initial assignment of the bandwidth floors to respective remote game sessions and iteratively incrementing respective bandwidth allocations of one or more remote game sessions based on respective adequacy values determined using at least one of respective tier, bandwidth floor and ceiling parameters. In one arrangement, a triggering event or input may comprise, e.g., adding a new game session to the network slice, deleting/terminating an ongoing session from the network slice, changing the slice bandwidth, detecting changes in network conditions, etc. In one arrangement, an example bandwidth management may further include performing a culling process on a subset of the remote game sessions after the initial assignment responsive to determining that a sum of the bandwidth floors exceeds the slice bandwidth size.

In still further aspects, one or more network nodes, elements or apparatuses are disclosed, each comprising at least one processor and persistent memory having program instructions stored thereon, wherein the program instructions are configured to perform an embodiment of the methods set forth herein when executed by the respective at least one processor. In still further aspects, a computer program product comprising a non-transitory computer readable medium is disclosed, which is operative to store computer readable program code, the computer readable program code operable, when executed by processing circuitry to perform any of the methods set forth herein. Further features of the various embodiments are as claimed in the dependent claims.

Disclosed embodiments may provide one or more of the following technical advantages and benefits. For example, embodiments may be configured to solve the bandwidth and latency issues described the present patent disclosure for both non-VR and VR remote game rendering, especially in a multisession remote gaming scenario. In particular, example embodiments are advantageously configured to effectuate a managed remote gaming service with QoS policy control with respect to a plurality of gaming sessions supported by a dedicated network slice. By leveraging a split network architecture, edge-optimized infrastructure may be deployed at a trusted operator network edge for handing computationally intensive game rendering processes, wherein the edge infrastructure is configured to interoperate in concert with a cloud-hosted game application provider using standards-based interfaces in an example implementation. Multiple gaming sessions may be instantiated on per-request basis, which may be managed in a dynamic fashion with respect to bandwidth allocation in a dedicated network slice such that QoS requirements and Key Performance Indicators (KPIs) such as, e.g., bandwidth, latency, etc., can be met for the sessions involving various types of games and gaming rigs.

These and other advantages will be readily apparent to one of skill in the art in light of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

FIGS. 9A-9E depict a flowchart of various blocks, steps and/or acts associated with a game service management process for facilitating session setup at an operator network according to an example embodiment;

DETAILED DESCRIPTION

Figure 1:
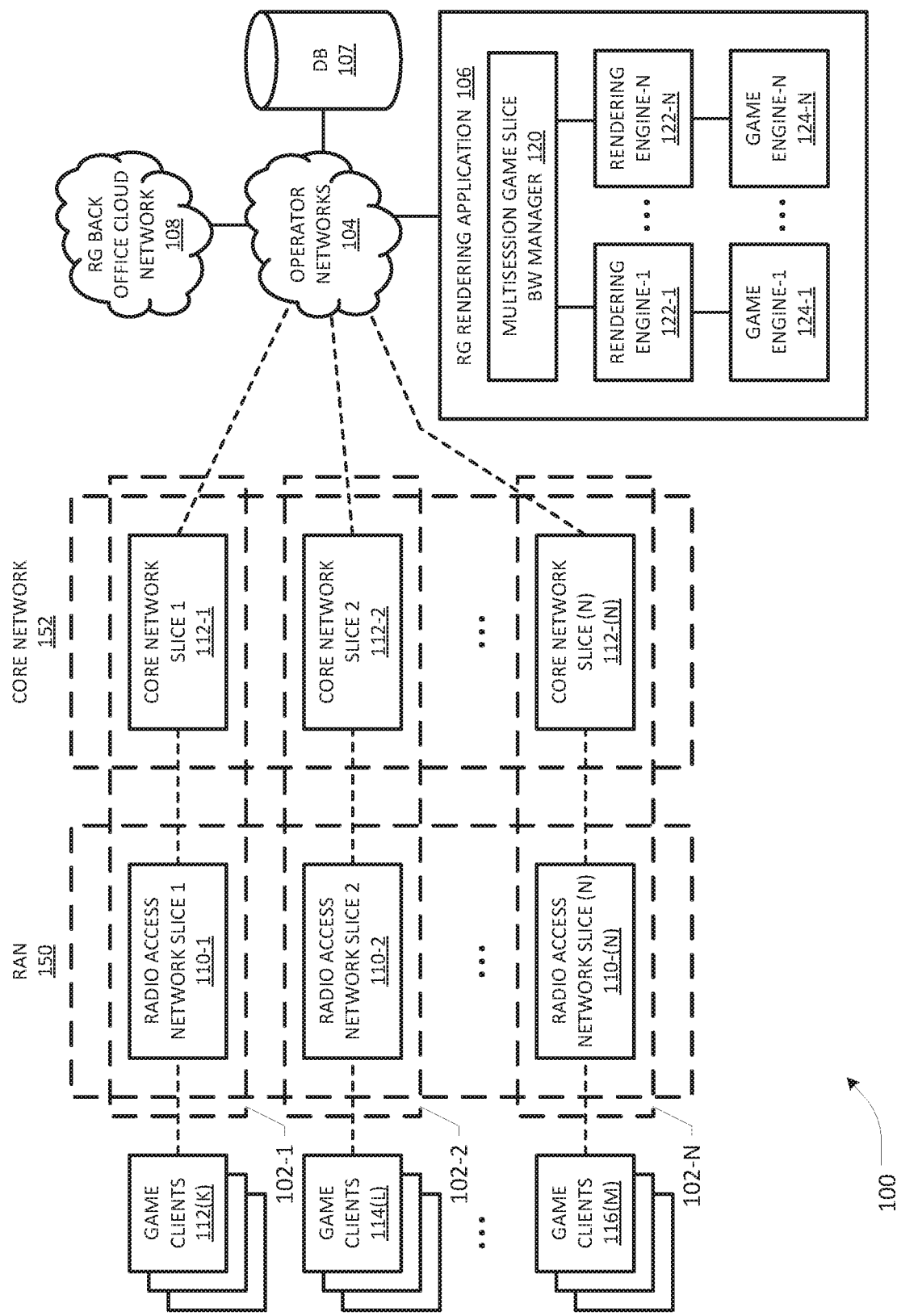
FIG. 1 depicts an example network environment having a network slice architecture wherein one or more embodiments of the present patent disclosure may be practiced for purposes of effectuating multisession remote game rendering in accordance with the teachings herein.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged or programmed under suitable executable code to perform that function.

As used herein, a network element or node may be comprised of one or more pieces of service network equipment, including hardware and software that communicatively interconnects other equipment on a network (e.g., other network elements, end stations, etc.). Some network elements may comprise "multiple services network elements" that provide support for multiple networking functions (e.g., routing, bridging, switching, Layer-2 aggregation, session border control, Quality of Service/Experience (QoS/QoE), and/or subscriber management, and the like), and/or provide support for multiple application services (e.g., data, voice, video, multimedia, gaming, etc.). In some embodiments, network elements or nodes may be adapted to host one or more applications or services with respect to a plurality of subscriber end stations or client devices. Accordingly, for purposes of some of the embodiments, a network element may be deployed in enterprise networks, intranets, extranets, data center networks, service provider networks, web-based content provider/distribution networks, cloud platforms, telecom operator networks (e.g., wireline and/or wireless/mobile networks, satellite communications networks, etc.), including mobile network operator (MNO) networks, mobile virtual network operator (MVNO) networks, mobile virtual network aggregator (MVNA) networks, mobile virtual network enabler (MVNE) networks, the Internet of Things (IoT) or Internet of Everything (IoE) networks, and the like. In general, such networks may be organized in any known or heretofore unknown configurations and topologies, wherein a managed cloud-based remote game rendering system, application, scheme, and service architecture may be implemented according to the teachings herein.

Example end stations and client devices (broadly referred to as User Equipment or UE devices) may comprise any device configured to consume and/or create any service via one or more suitable access networks or edge network arrangements based on a variety of access technologies, standards and protocols, including a heterogeneous network environment in some embodiments. Accordingly, example UE devices may comprise various classes of devices, e.g., multi-mode UE terminals including terminals adapted to communicate using various communications infrastructure (s), e.g., terrestrial cellular communications infrastructure (s), Non-Terrestrial Network (NTN) infrastructure(s), or WiFi communications infrastructure(s), or any combination thereof, as well as smartphones, multimedia/video phones, mobile/wireless user equipment, Internet appliances, smart wearables such as smart watches, portable laptops, netbooks, palm tops, tablets, phablets, mobile phones, connected vehicles (manual and/or autonomous), and the like, as well as smart TVs including high definition (HD), ultra HD (UHD), 4/8K projection/display devices, set-top boxes (STBs), holographic computers, other media consumption devices, etc., which may include gaming applications that provide gaming user experiences with augmented reality (AR), virtual reality (VR) or mixed reality (MR) (generally referred to as Extended Reality or XR) experiences) well as non-VR/XR gaming experiences. Still further, some example UE devices may comprise dedicated networked or local gaming devices/consoles operative to provide AR/VR/MR/XR or non-VR/XR gaming experiences, and the like, including one or more display devices operative to facilitate immersive and partially immersive experiences (e.g., up to 360° immersive gamespace experience), each having at least some level of network communication functionalities for accessing suitable infrastructures configured to provide a managed remote gaming service.

One or more embodiments of the present patent disclosure may be implemented using different combinations of software, firmware, and/or hardware in one or more modules suitably programmed and/or configured. Thus, one or more of the techniques shown in the Figures (e.g., flowcharts) may be implemented using code and data stored and executed on one or more electronic devices or nodes (e.g., a network element, a cloud-based data center node, a network management node, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database (s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present patent disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate, mutatis mutandis. Likewise, any advantage of any of the embodiments may apply to any other embodiments, and vice versa. Other objectives, features and advantages of the disclosed embodiments will be apparent from the following description.

Referring now to FIG. 1, depicted therein is an example network environment 100 having a network slice architecture, where one or more embodiments of the present patent disclosure may be practiced for purposes of effectuating multisession remote game rendering in accordance with the teachings herein. In one arrangement, example network environment 100 may be implemented in a split network architecture having a distributed computing topology such that various subsystems relating to gaming client management, back office functionality, global gaming content provisioning, etc. may be hosted in a global data network 108 (e.g., a public, private or a hybrid cloud) that may be external to one or more trusted operator networks 104 configured to support various subsystems relating to game session establishment, rendering, bandwidth management, etc., disposed at one or more respective network edge locations for optimizing gaming quality and performance. In some arrangements, an example operator network 104 may be configured to support multiple game clients or subscriber stations via one or more dedicated network slices, wherein a network slice may be deployed as an independent end-to-end logical network that runs on a shared physical infrastructure capable of providing a negotiated service quality. In some implementations, a network slice may span across multiple hierarchical levels of the infrastructure, e.g., access network, core network and transport network. Further, a network slice may also be deployed across multiple operators depending on service level agreements. In general, a network slice may therefore be deemed as a logical or virtualized partitioning of a network infrastructure comprising dedicated and/or shared resources, e.g., in terms of processing power, storage, and/or bandwidth, having logical isolation from other network slices that may be deployed for similar or different services and applications. By way of illustration, network slices 102-1 to 102-N are exemplary of a plurality of remote game slices that may be deployed by and/or on behalf of trusted operator networks 104, wherein each game slice may be provisioned with a respective dedicated or negotiated bandwidth for servicing respective groups of remote gaming clients/client devices, e.g., devices 112(K), 114(L), 116(M), that may be disposed in different geographical areas. Although each game slice is exemplified as spanning across access network and core network portions 150, 152, thereby comprising a respective access network slice 110-1 to 110-N and a core network slice 112-1 to 112-N, it should be appreciated that different slice arrangements may also be implemented for serving remote game clients by operator networks 104 in some implementations.

Regardless of how a game slice is configured in the network environment 100, a remote game rendering application service 106 may be deployed as part of the infrastructure of an example operator network 104 for facilitating multisession remote game rendering on behalf of a plurality of game clients, e.g., clients 112(K), wherein the bandwidth of the serving game slice may be managed by a multisession game slice (MGS) bandwidth manager 120 operating to dynamically allocate bandwidth to the individual gaming sessions. As will be set forth in detail further below, a remote render system (RRS) manager may be deployed in association with the remote game rendering application service 106 for instantiating a plurality of remote rendering subsystems or engines 122-1 to 122-N, each coupled to a corresponding game engine 124-1 to 124-N for supporting edge-located game rendering with minimal latency in respect of the instantiated game sessions wherein gaming content may be pre-provisioned at a local database 107. Furthermore, appropriate network interfacing may be provided between or among the various operator network subsystems as well as with the remote game back office subsystems for coordinating game play requests, session setup, game engine instantiation, rendering and game content delivery, bandwidth management, etc. in a tightly coupled manner that enhances the overall gaming QoE for the clients while optimizing the operator network's game slice bandwidth.

Figure 2:
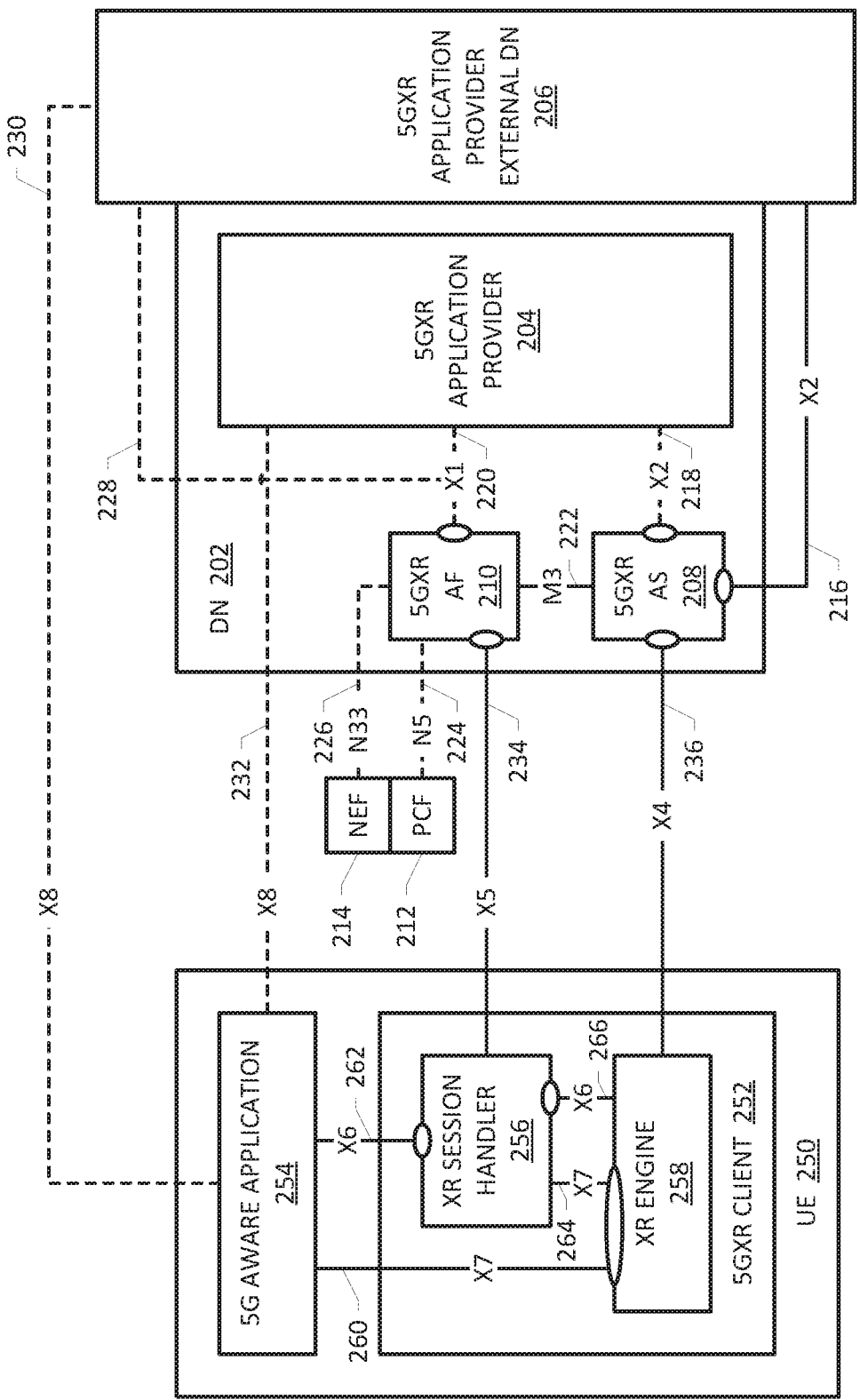
FIG. 2 depicts an example 5G-compliant network architecture configured for supporting multisession remote game rendering in an implementation of the network environment of FIG. 1 according to an embodiment of the present patent disclosure.

In some example embodiments, a standards-based network interfacing may be implemented in a distributed architecture such as the network environment 100 of FIG. 1 for leveraging advanced communications infrastructure in provisioning remote gaming services. FIG. 2 depicts an example 5G-compliant network architecture 200 configured for supporting multisession remote game rendering in an implementation of the network environment of FIG. 1 according to an embodiment of the present patent disclosure, wherein various network and client entities, subsystems and components relating to gaming may be abstracted as one or more 5G-specific entities, subsystems and components having standards-based interfacing as defined in 3GPP TR 26.928. Technical Specification Group Services and System Aspects; Extended Reality (XR) in 5G (Release 16), incorporated by reference herein. Whereas the network architecture 200 illustrates a high level overview of the distributed topology and abstracted entities that may be adapted for remote gaming services, various individual entities, subsystems, components and functionalities of an operator network, a global external network and a gaming client device that correspond to the abstracted entities and operate using 5G-compliant interfacing will be set forth further below in reference to FIGS. 3-5.

Broadly, three categories of functionalities or subsystems may be defined in the context of the distributed network architecture 200 of FIG. 2: (i) 5G-XR AF, which is an Application Function operative to provide 5G-XR services; (ii) 5G-XR AS, which is an Application Server operative to provide 5G-XR services; and (iii) 5G-XR Client, which is a user equipment (UE) function operative to provide 5G-XR services. In some embodiments, 5G-XR AF and 5G-XR AS entities may be provisioned as functionalities defined in 3GPP TS 23.501 (e.g., clause 6.2.10), which may be deployed in an operator data network (DN) that may communicate with a UE device via known interfaces N6, N3 and Uu as defined in 3GPP TS 23.501, incorporated by reference herein. Because the 5G Radio may be differentiated between 5G Uu and 5G Sideline/PC5 interfacing in the context of the exemplary distributed architecture, communication through a Sidelink PC5 interface may be provided as an alternative to Uu-based communications in some embodiments. As defined in 3GPP TS 38.300, incorporated by reference herein, Uu is the interface between UE and the radio access network (RAN) and sidelink is a mode of communication whereby UEs can communicate with each other directly. An example UE device 250 adapted for gaming may comprise a client application, module, entity or subsystem 252 (referred to as 5G-XR or 5GXR Client), which may be operative as a receiver of 5G-XR session data that may be accessed through well-defined inter-component interfaces or application program interfaces (APIs) by an XR application or service 254 (refereed to as 5G-XR or 5GXR Aware Application) executing on the UE device 250. 5GXR client 252 may in turn include two sub-functions or components. A session handler component 256 is operative as a function of the UE device 250 that communicates via an X5 interface 234 with an XR application function disposed in a trusted operator DN 202, e.g., 5GXR AF 210, in order to establish, control and support the delivery of an XR session. Also, session hander 256 may be adapted to expose suitable APIs that can be used by XR application 250 via known interface, e.g., X6 interface 262, executing on the UE device 250. An XR engine component 258 of client 252 is operative as a function of the UE device 250 that communicates via an X4 interface 236 with an XR application server disposed in the operator DN 202, e.g., 5GXR AS 208, in order to obtain access to XR related data, which may include XR relevant functionalities such as sensors, tracking, etc. In one arrangement, XR engine 258 is operative to process the data and communicate with XR session handler 258 for facilitating XR session control via known interfaces, e.g., X6 interface 266 and X7 interface 264.

In one embodiment, 5GXR Client 252 is typically controlled by 5GXR Aware Application 254, which may be provided as an external XR aware application, e.g., an "app" that implements the external (e.g., a third-party) application service provider specific service logic for establishing and maintaining an XR session. 5GXR Aware Application 254 is operative to make use of 5GXR Client functionalities and network functionalities using suitable interfaced and APIs, e.g., interfacing with XR engine 258 and session handle 256 via X7 and X6 interfaces 260, 262, respectively, and X8 interface 232 with an application provider 204 disposed in the operator DN 202 that may include or otherwise interface with one or more 5GXR application servers and application functions. e.g., AS 208 via X2 interface 218 and AF 210 via X1 interface 220, which in turn interface with the 5GXR Client 252 as noted above. Internally, 5GXR AF and 5GXR AS entities may communicate with each other via an M3 interface 222. In one arrangement, a 5GXR AS entity may be deployed as an application server configured to host 5G-XR media and media functions, e.g., relating to gaming media including immersive video, audio, etc., wherein a 5GXR application provider may be configured as a service provider that makes use of 5GXR client and network functionalities to provide an XR experience to the 5GXR Aware Applications 254 executing on the UE device 250. Control functionality may be effectuated by a 5GXR AF entity that provides user control functions to XR session handler 256 on the UE device 250 (e.g., via X5 interface 234) and/or network control functions to the application provider 204 (e.g., via X1 interface 220). In one arrangement, an AF entity may be configured to perform operations such as, e.g., accessing s Network Exposure Function (NEF) for retrieving resources, interaction with a Policy Control/Charging Function (PCF) for Policy Control, applications traffic routing, exposing services to end users, etc. As illustrated, example 5GXR AF entity 210 may interface with one or more NEFs 214 and PCFs 212 via respective N33 interfaces and N5 interfaces for exposing services and resources over APIs within and outside the 5G Core (e.g., by communicating via N33 interface 226) and for governing control plane functions via Policy rules defined and User plane functions via Policy enforcement (e.g., by communicating via N5 interface 224). For example, services exposure by NEF 214 may be based on RESTful (Representational State Transfer or REST) APIs over a service based interface bus (not shown in this FIG.), wherein NEF may be configured to operate as a Security layer when an application (e.g., remote gaming optimization service) attempts to connect with the 5G Core Network functions (e.g., a network slice).

The distributed network architecture 200 of FIG. 2 further includes an external DN 206 that may be deployed as a global cloud network for hosting additional and/or distributed functionalities of a managed application service, wherein the entities of DN 206 executing such additional and/or distributed functionalities may access or otherwise be interfaced with UE functionalities and/or trusted operator DN entities using additional network interfaces such as X8 interfaces 230, X1 interfaces 228, and X2 interfaces 216, among others. For example, global remote gaming back office entities for facilitating a multisession remote game rendering service in the context of the network environment 100 may be adapted to interface with a 5GXR Aware Application 250 configured for remote gaming via X8 interface 230 and one or more operator network based entities such as, e.g., 5GXR AS 208 via X2 interface 216, as will be set forth below in further detail.

Figure 3A:
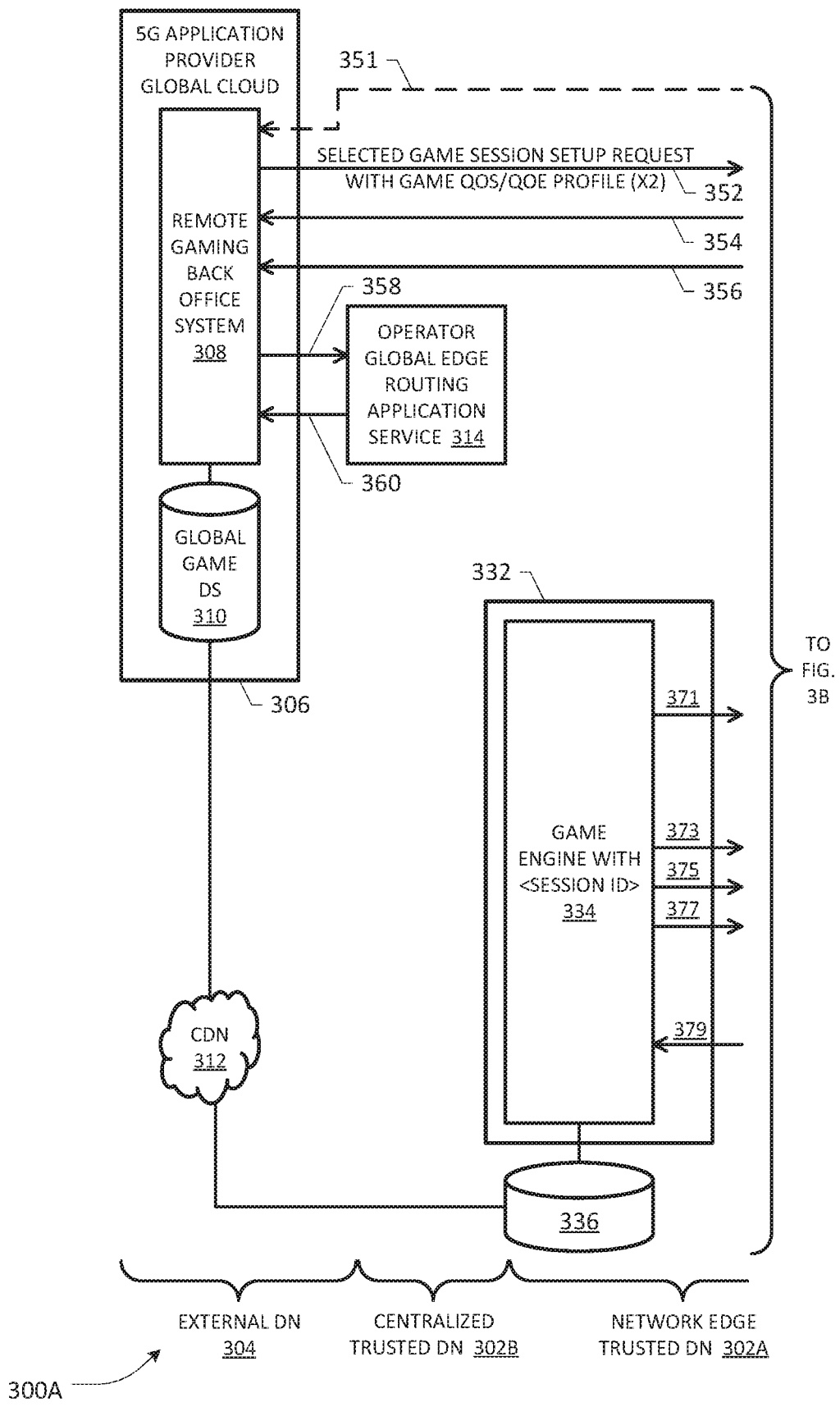
FIGS. 3A-3C depict a multisession remote game rendering network that may be implemented in accordance with the architecture of FIG. 2 wherein a single instance of a remote gaming service provided at a trusted operator network is illustrated in detail.
Figure 3B:
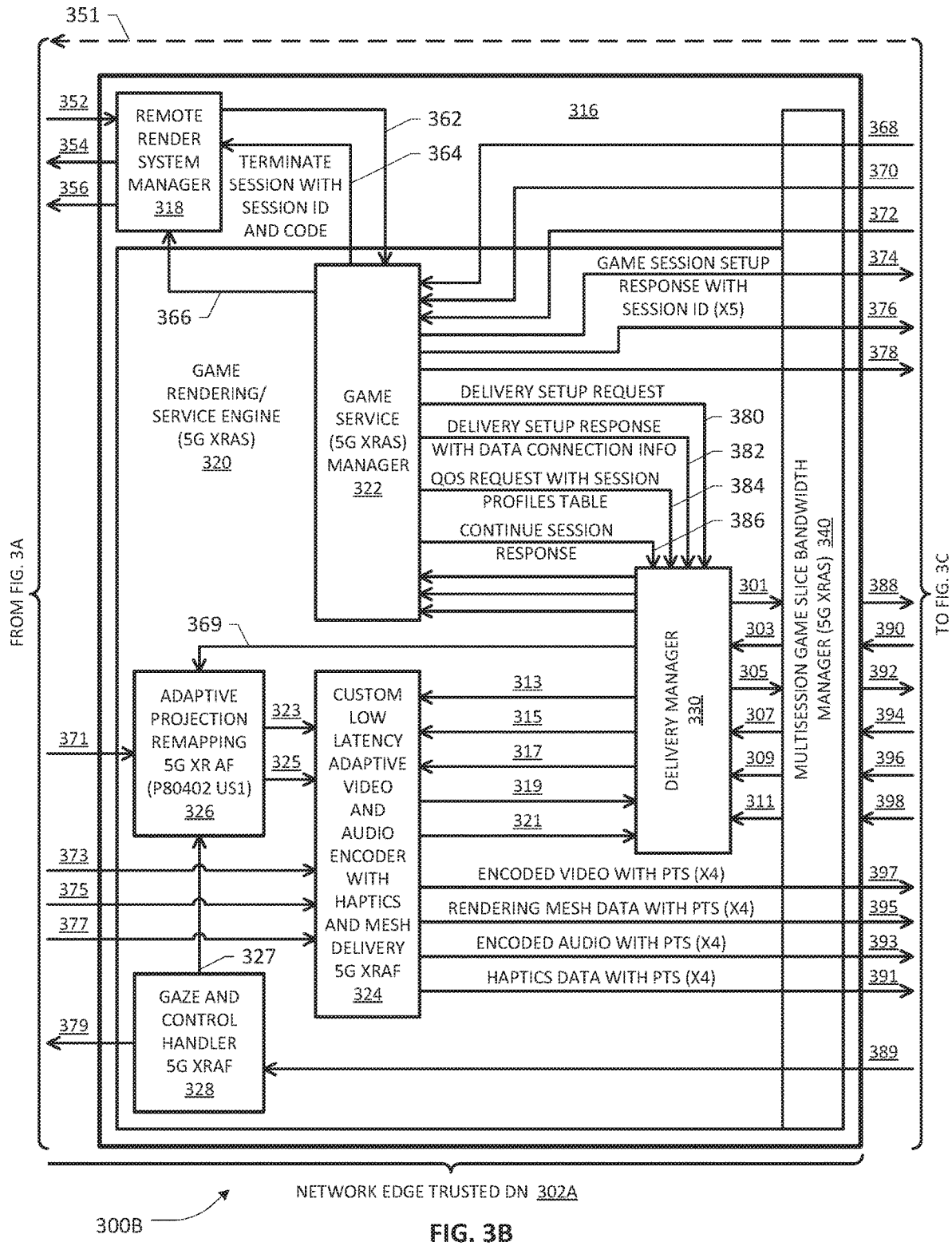
Figure 3C:
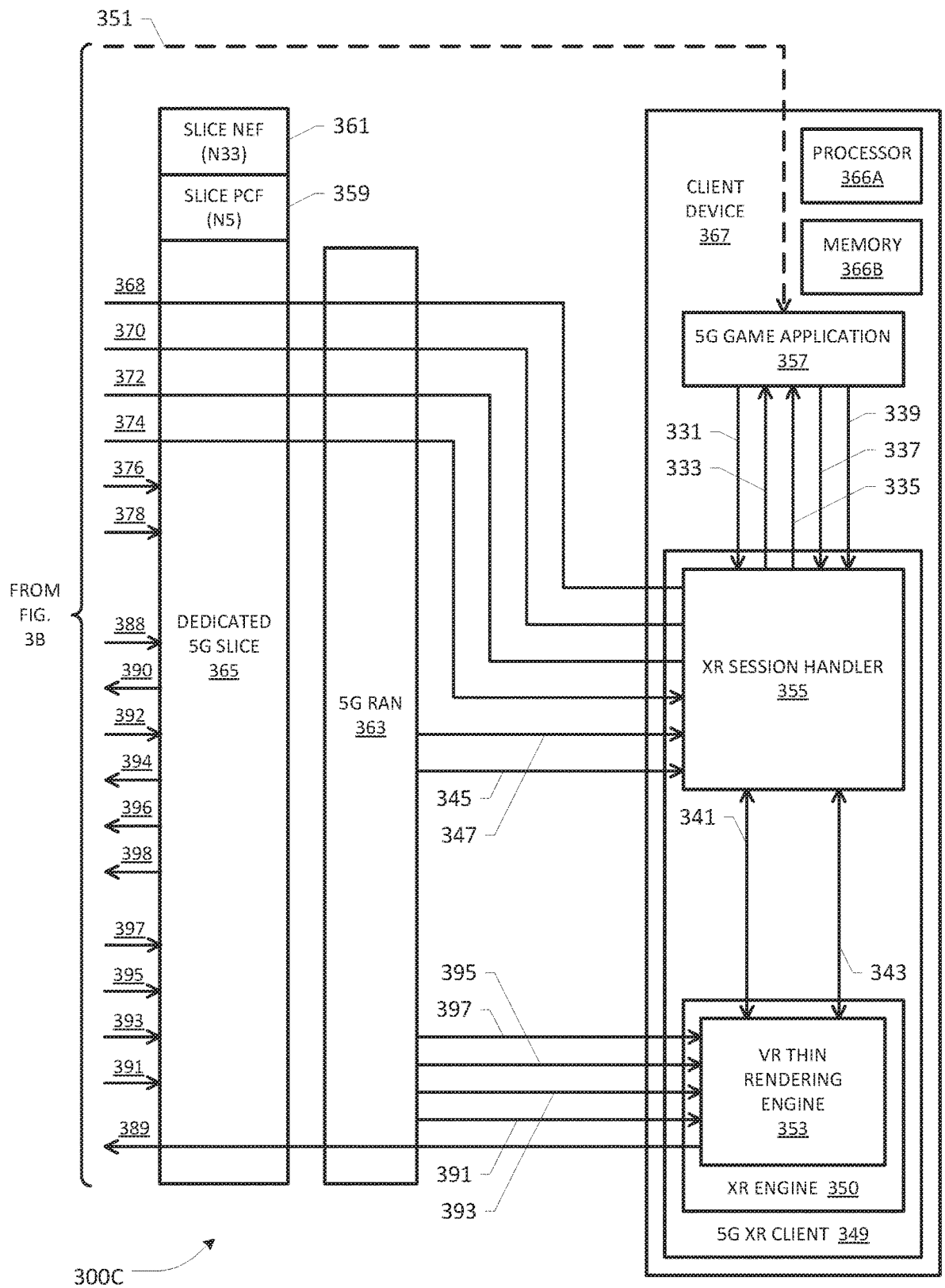

Turning attention to FIGS. 3A-3C, shown therein is a multisession remote game rendering network 300, comprising portions 300A-300C, according to an embodiment of the present disclosure that is configured to correspond with the foregoing 5G-compliant distributed network architecture of FIG. 2, wherein a single instance of a remote gaming service provided at a trusted operator network is illustrated in detail. In one arrangement, various subsystems, components, modules and functionalities provided for facilitating an end-to-end multisession managed gaming service may be deployed at different levels within the distributed architecture of the network 300 such that standards-based interfacing described hereinabove may be advantageously leveraged in providing low latency gaming and bandwidth management. Some example embodiments herein are therefore directed to the allocation and provisioning of bandwidth and Key Performance Indicators (KPIs) such as, e.g., latency, inside a network slice dedicated for cloud remote rendered gaming (including XR/MR/VR and/or non-VR/XR game experiences) according to the teachings set forth in the present patent disclosure. In general, some example embodiments focus on a multisession game slice bandwidth manager having cloud gaming access exposure functionality, which may be configured to execute a bandwidth allocation method for management within the dedicated network slice and to provide appropriate interactions and messaging via 5G interfacing according to 3GPP TR 26.928 with respect to the delivery QoS parameters within a 5G-compliant network environment. More specifically, the following subsystems, entities, functionalities, modules or components are set forth in an example embodiment, wherein such subsystems, entities, functionalities, modules or components may be implemented or realized in hardware, software, firmware, and/or as suitable virtualized entities that may be integrated or distributed depending on deployment in a trusted operator edge data network, a trusted operator core or centralized data network, and/or in an external/global cloud data network: (i) an operator global edge routing application service, (ii) a custom low latency adaptive video and audio encoder with haptics and mesh delivery 5GXR AF, (iii) a game session 5GXR AS manager, (iv) a multisession game slice (MGS) bandwidth (BW) manager 5GXR AS, (v) a delivery manager, (vi) a remote render system manager, (vii) a gaming back office, and (viii) a gaze and control handler 5GXR AF. On the UE side of the example network architecture, appropriate remote gaming/rendering functionalities may be mapped to client-based XR session handler and XR engine components described above in reference to the 5G-compliant architecture 200 of FIG. 2. Overall functionality of the foregoing subsystems and respective message interfacing therebetween on the network side will be set forth below taking reference to FIGS. 3A-3C. Essentially, in one arrangement, a game session manager (also referred to as a game service manager) may be configured to define video quality and latency policies for game titles whereas an MGS bandwidth manager's 5G access exposure function(s) may be configured to define a dedicated amount of bandwidth for multisession gaming that is sized the same as the network slice. Further, the MGS bandwidth manager's access exposure function may also interface with the network slice's dedicated NEF and PCF APIs for slice size notifications, QoS reservation as well as latency and bandwidth reporting. Still further, the MGS bandwidth manager may be configured to execute a bandwidth allocation method optimized for remote game rendering in order to dynamically reallocate bandwidth when game session flows along with their respective policy definitions are added or removed from the dedicated network slice.

By way of illustration, network portion 300A/300B of FIG. 3A/3B includes a trusted edge data network 302A and a trusted centralized data network 302B, which together may be deployed as an operator's trusted network infrastructure that may be interfaced with one or more external data networks 304 operative to host a cloud-based application provider platform 306 including a remote gaming back office 308 and a global game content database 310. For purposes of the present patent application, a network edge may be defined as the location in the operator's network that may be configured to provide the delivery KPI/latency requirements in order to satisfy an acceptable VRnon-VR gaming QoE in the network environment. Also, the edge location may be configured to provide or otherwise support the bandwidth necessary without overloading the core network. In one arrangement, a content delivery/distribution network (CDN) 312 may be deployed as part of the external data network 304, which may be configured to provide or otherwise pre-provision game titles to a local game database 336 disposed in association with the operator's trusted edge data network 302A. A remote game rendering application service server 316 (also referred to as a remote game render system, platform, node, or network element) deployed in the edge data network 302A includes a remote render system manager 318 operative to support or instantiate one or more remote game rendering engines 320 (also referred to as a remote rendering subsystem or a game rendering application service) that may be coupled to respective game engines 334 provided as part of a game application provider 332, which may also be deployed at the edge data network 302A. Each game engine 334 may be interfaced with the local game database 336. In one arrangement, each example single instance of remote game rendering engine 320 may be deployed as a 5G XR AS entity that includes a game service/session manager 322 (configured as a 5G XR AS entity), a custom low latency adaptive video and audio encoder with haptics and mesh delivery module 324 (configured as a 5G XR AF entity), an adaptive projection (re)mapping module 326 (configured as a 5G XR AF entity), a gaze and control handler 328 (configured as a 5G XR AF entity), and a delivery manager 330. Further, each example single instance of remote game rendering engine 320 is interfaced an MGS bandwidth manager 340 disposed at the trusted edge data network 302A, which may also be configured as a 5G XR AS entity, for allocating and managing the bandwidth of a dedicated network slice 365 having PCF 359 and NEF 361, illustrated as part of network portion 300C of FIG. 3C. An access network portion 363 associated with the network slice 365 is operative to serve one or more UE devices operative as game client devices and associated game controllers, head-mounted displays as well as suitable game input/output components, depending on whether VR/non-VR or immersive gamespace environment is effectuated at a particular UE or gaming station. Depending on how elaborate a gaming station environment is at a customer premises, example UE device 367 may comprise a VR/MR/AR/XR headset, game console, computer, laptop, tablet, smartphone, or any other suitable client device for displaying and/or interacting with a game application and/or associated gamespace environment. Further, there may be a myriad sensory devices and components associated with or integrated into a gaming station such as, e.g., cameras, microphones, accelerometers, Global Positioning System (GPS) locators, touch sensors, mood sensors, temperature sensors, pressure sensors, gesture sensors/controllers, optical scanners, near-field communications (NFC) devices, head movement detectors, ocular movement trackers, and directional sensors such as solid-state compasses, etc., as well as wearable devices comprising health/exercise monitors operative in a gaming environment and biometric identification devices, and so on. Still further, a subset of sensors may be provided as part of an IoT environment associated with the gaming client device 367. In a typical gaming arrangement, for instance, a head-mounted display (HMD) may be included as part of the gaming client device 367, which may be paired with a helmet or a harness adjustable to the game player, and may employ sensors for six degrees-of-freedom (6DoF) monitoring that allows alignment of virtual information to the physical world perceived in a field of view (FOV) and adjust accordingly with the user's head and/or eye movements. An example gaming client device 367 may also be implemented as a device resembling eyewear or goggles that include cameras to intercept the real world view and redisplay its augmented view through an eye piece or as a projected view in front of the user. Such devices may include, but not limited to, smartglasses such as, e.g., Google Glass, Microsoft HoloLens, etc., as well as bionic/electronic contact lenses and virtual retinal displays. Additional gaming equipment may include digital gloves, interactive wearables/implantables, brain-machine interfaces, robotic prosthetics, haptic devices that allow users to touch, feel and manipulate 3D objects in virtual environments and tele-operated systems, etc.

Regardless of the particular gaming rig/station setup, UE device 367 may be configured to include/execute a game application 357 that interfaces with an XR game client 349 including an XR session handler 355 and an XR engine 350, which may be run on a suitable hardware/software platform comprising one or more processors 366A and memory with program code 366B, etc. In one arrangement, XR engine 350 may include a VR thin rendering engine 353 operative to interface with XR session handle 355.

As such, the multisession gaming network environment 300 may be configured to support various types of games having different delay/latency tolerances and perspectives, e.g., first person shooter (FPS) games, third person shooter (TPS) games or role playing games (RPG), real-time strategy (RTS) games, as well as other VR/non-VR games, any of which may include single-player or multi-player modes. For example, a multi-player game session may involve a video game in which more than one person is operative to play in the same game environment at the same time, either locally or online over the network. Some multi-player games may require players to share the resources of a single game system or use networked technology to play together over a distance, where players may compete against one or more human contestants, work cooperatively with a human partner to achieve a common goal, or supervise other players' activity. Thus, in some embodiments, multiple players may share the resources of a session (e.g., computing, bandwidth, etc.) or have dedicated sessions while playing in a multiplayer gaming environment.

Directing attention to the individual subsystems deployed in the network portion 300A of FIG. 3A, remote gaming back office 308 may be hosted on a variety of cloud-based platforms, including but not limited to, e.g., Microsoft Azure, Amazon Web Services (AWS), Google Cloud, etc. In some arrangements, an example remote gaming back office may not be implemented to be operator-specific, and may be configured to provide or otherwise support a variety of back office functions such as, e.g., game content/title cataloging, billing, game session setup and teardown, etc., relative to one or more game applications on a UE device, e.g., UE 367. Communications between the game application 357 running on UE client device 367 and remote gaming back office 308 may be facilitated via a standards-compliant interface 351 (e.g., X8 interface 230 as defined in the architecture 200 of FIG. 2), which may be termed a first interface. Further, an example implementation of remote gaming back office 308 may be configured to provide QoS/QoE profiles to the remote game render system AS 316 disposed in the trusted edge data network 302A, e.g., with respect to the QoE/QoS profile associated with a selected game requested by/from UE device 367. In one arrangement, the distribution of game content may be effectuated via CDN 312, wherein the game content may be pre-provisioned to the operator's network edge location due to the size of game titles. Skilled artisans will appreciate that such game content cannot be cached like video-on-demand (VOD) ABR content in some embodiments due to the low latency required at runtime of a game as well as potential bandwidth bottlenecks across the CDN 312.

An operator global edge routing application service subsystem 314 may be disposed as part of the operator's centralized trusted data network 302A, which may be configured to provide locator functionality used to identify a correct edge processing game engine that should be instantiated and executed based on the device/UE's connection location in the network environment 300. In some arrangements, an embodiment of the operator global edge routing application service subsystem 314 may be configured to provide the connection information to the remote game back office 308 for setting up a remote game rendering session at the correct/closest edge location in association with remote render system manager 318. In FIG. 3A, client RAN connection requests 358 and client edge connection responses 360 exemplify location-based interactions (e.g., collectively referred to or effectuated via a third interface) between operator global edge routing application service subsystem 314 and the remote game back office 308. Depending on the operator policy, the interfacing between the edge routing application service subsystem 314 and the remote game back office 308 may be standards-based, proprietary, or otherwise, such that other external applications may also utilize the routing functionality depending on the services supported by the operator network.

Remote render system (RRS) manager subsystem 318 is operative to manage one or more game sessions running at the respective edge locations, preferably selected based on the UE client location information. In one arrangement, RRS manager subsystem 318 is operative to start a game service instance for each new user session, e.g., illustratively shown as game rendering/service engine 320, as part of the remote game rendering application server 316. As noted previously, example game rendering/service engine 320 may be configured as a 5GXR AS entity. RRS manager subsystem 318 is further operative to provide the gaming back office 308 with a session ID for the instantiated remote gaming session. In one arrangement, communications between RRS manager subsystem 318 and remote gaming back office (RGBO) 308, including game session setup requests, game session setup responses, session termination messages, etc., may be effectuated via messaging through one or more X2 interfaces as defined in the architecture of FIG. 2. By way of illustration, a selected game session setup request with QoE/QoS requirement 352, a selected game session setup response with game service manager information and session ID information 354, and a terminate game session with ID (i.e., a session termination message) 356, potentially including appropriate reason code information, are exemplified in FIG. 3A, which may be collectively termed as a second interface relative to the gaming back office 308.

Game service/session manager subsystem 322, configured as a 5G XR AS entity, is operative to manage a remote gaming session for the selected game. In one arrangement, example game service/session manager (GSM) subsystem 322 may be configured to start the selected game engine (e.g., at an optimized edge location based on the client device location in the access network) for executing or running with the selected game. Game service/session manager subsystem 322 is also operative to start delivery manager 330, adaptive projection remapping module 326, custom low latency adaptive A/V encoder with haptics and mesh delivery module 324, and gaze and control handler module 328, which may be provided as part of the instantiated game rendering application service 320. Game service manager subsystem 322 is operative to communicate with XR session handler 355 running on UE client device 367 via the X5 interface as defined in the architecture 200 of FIG. 2. In a session setup for a selected game title, game service manager subsystem 322 may receive the client device's profile including UE device capabilities, e.g., codec capabilities, screen resolution and refresh rate from the UE's XR session handler 355. In one arrangement, game service manager subsystem 322 may be operative to filter the game QoS/QoE encoding profile (i.e., a quality profile) associated with the selected game title to match the device capabilities. Responsive thereto, game service manager subsystem 322 is operative to configure one or more of the remote game session's subsystems (e.g., delivery manager, adaptive projection remapping module, low latency adaptive video/audio (V/A) encoder with haptics and mesh delivery module, and/or gaze and controller data handler module) based on the filtered QoS/QoE profile in some embodiments. Termination of a game session from the UE client's XR session handler 355 may also be handled by the game service manager subsystem 322. In some implementations, reasons for termination may be provided in a customized manner, e.g., the player exited the session in a normal exit, or the termination could be a result of poor QoE conditions. In some additional or alternative embodiments, the user/player may choose to continue playing the game even in poor conditions. If the user/player chooses to continue to play the game, a credit or lower cost adjustment could be made for billing in some embodiments depending on SLAs. Skilled artisans will recognize that the foregoing scenarios are simply illustrative of various non-limiting examples of how this information could be used by game service manager subsystem 322 of a multisession remote gaming implementation according to the teachings herein. Further, how a player's override request of a poor quality indication is treated may also affect bandwidth allocation/management in some example embodiments as will be set forth in detail further below.

In one arrangement, a respective game engine 334 with each game title may be pre-provisioned over the CDN 312. In one arrangement, the selected game engine 334 may be executed in the same container/virtual machine running the remaining subsystems/modules of the instantiated game rendering application service 320, namely, game service manager subsystem 322, delivery manager/service 330, adaptive projection remapping module 326, custom low latency adaptive A/V encoder with haptics and mesh delivery module 324, and gaze and control handler module 328. Depending on whether VR or non-VR gaming is being provided in the session, different messages may flow between game engine 334 and corresponding game rendering application service 320. In one arrangement, game engine 334 may be configured to send raw video, audio delivery resolution and haptics data using one or more standardized interfaces, e.g. the X1 interfaces as defined in the architecture 200 of FIG. 2. Where VR gaming is involved, the raw video data (including immersive or partially immersive video data) is transmitted first to the adaptive projection remapping module 326, as exemplified by X1 interface 371. In an embodiment where non-VR gaming is involved, the functionality of an adaptive projection remapping module is not needed, and the video data may be directly provided to the custom low latency adaptive A/V encoder with haptics and mesh delivery module 324. Raw audio, haptics data and delivery resolution data may be provided to the custom low latency adaptive A/V encoder with haptics and mesh delivery module 324 via X1 interfaces 373, 375, 377, respectively. In the case of VR gaming, the adaptive projection remapping module 326, described further below, provides a mapped immersive video data stream and rendering mesh data stream to the custom low latency adaptive A/V encoder with haptics and mesh delivery module 324 via respective X1 interfaces 323, 325. Selected game engine 334 is further operative to receive the in-game control information from the gaze and control handler module 328 via a X1 interface 379 propagated via a device X4 interface 389 from the UE device 367. As shown in FIG. 3A, the in-game control information may also be provided to the adaptive projection remapping module 326 via another X4 interface 327 from the gaze and control handler module 328. Because the foregoing constituent subsystems of the remote game rendering engine 320 may be instantiated in and executed on the same VM/container, the delivery of raw video and audio, haptics and delivery resolution is not over a network communications channel. It should be appreciated that sending raw video over a network connection would consume too much bandwidth, causing various quality/experience issues, especially in game scenarios requiring low latency such as FPS games as noted elsewhere the present patent application. To overcome this deficiency, accordingly, the embodiments herein leverage the split architecture to provide an implementation where the data delivery between the edge-optimized game engine 334 and the custom low latency adaptive A/V encoder with haptics and mesh delivery module 324 as well as the gaze control handler 328 is effectuated through respective internal VM pipelines adapted over the standardized X1 and X4 interfaces provided as the internal VM data communications channels.

Adaptive projection (re)mapping module 326, which may be deployed as a 5G XR AF subsystem, may be configured to process the raw video from game engine 334 to obtain projection-mapped video for transmission to the custom low latency adaptive AN encoder with haptics and mesh delivery module 324 via X1 interface 323. Responsive to session latency and bandwidth data 369 from delivery manager 330 and headset orientation and control data (e.g., based on in-game gaze vector information) from gaze and control handler module 328, example adaptive projection remapping subsystem 326 is operative to adjust the view of a projection map, causing the highest density of pixels to be positioned inside the viewport of a headset or other display device used by the game player operating UE device 367. In example embodiments, therefore, an implementation of the adaptive projection remapping subsystem 326 may be configured to adapt the pixel density to be more concentrated in the headset view to optimize the quality based on a given bandwidth and latency responsive to the user gaze orientation (which may be provided in angular measurements relative to a 3D gamespace environment according to some embodiments). Based on changes in bandwidth and latency data received from delivery manager 330 via path 369, the pixel density may be expanded beyond the viewport of the headset in some embodiments. As latencies increase, adaptive projection remapping subsystem 326 may expand the higher density of pixels farther out from viewport. In addition, depending on the device metrics and capabilities, as bitrate increases, encoding bitrate, resolution and frames per second (fps) can be increased, thereby enabling an expanded high-quality area of the gamespace for presentation to example UE device 367. Additional details regarding an embodiment of the adaptive projection remapping module 326 may be found in the following commonly-owned patent application entitled "5G Optimized Game Rendering", Appl. No. PCT/IB2020/056798, filed Jul. 20, 2020, hereinafter referred to as the "Optimized Game Rendering" patent application, which is hereby incorporated by reference herein.

Gaze and control handler subsystem 328 is operative to provide an interface for receiving in-game control and headset orientation/pose data from UE device 367. As noted above, the control data may be forwarded to the instantiated game engine 334 via interface 379 and the headset orientation/pose data may be forwarded to the adaptive projection remapping subsystem 326 via interface 327. In one arrangement, the in-game control and orientation/pose data may be received from VR thin rendering engine 353 executing as part of XR engine 350 at UE device 367 via X4 interface 389, consistent with the 5G-compliant split architecture shown in FIG. 2.

Example custom low latency adaptive A/V encoder with haptics and mesh delivery subsystem 324 is operative to perform all video and audio encoding and transport of the encoded video and audio, haptics and dynamic mesh data to UE device 367. In one arrangement, subsystem 324 may be configured to receive the streaming network information (e.g., address:ports) for stream delivery from the delivery manager 330 via message path/interface 313. Subsystem 324 also receives all encoding parameters from the delivery manager 330 via paths/interfaces 315 and 317. Calculations and computations for mesh and haptics data may be executed by the encoder subsystem 324 and transmitted to the instantiated delivery manager 330 as indicated by data paths/interfaces 319, 321 for use in determining audio and video encoding bitrates based on current bandwidth conditions. In some arrangements, haptics and mesh data may not be compressed, which may pose a requirement that encoding bitrates be adjusted so to allow for the mesh and haptics data to fit into the allocated bandwidth of a session. Where the haptics and mesh data are compressed, however, different encoding bitrate adjustments may be imposed to optimize the bandwidth allocation.

Custom low latency adaptive A/V encoder with haptics and mesh delivery subsystem 324 is further operative to provide various pieces of gamespace data to the dedicated network slice 365 (shown in FIG. 3C), including, e.g., encoded video with a presentation timestamp (PTS), rendering mesh data with PTS, encoded audio with PTS, and haptics data with PTS, via respective X4 interfaces 397, 395, 393, 391.

Delivery manager 330 of the instantiated game rendering engine 320 may be configured to handle the setup of communications and facilitate bandwidth management/negotiation for the transport of the video, audio, haptics and dynamic mesh data. In one arrangement, delivery manager 330 is operative to interface MGS bandwidth manager 340 for receiving initial session connection information (address:port). It also receives the initial bandwidth and latency information as well as notifications of dynamic changes in bandwidth and latency conditions for the instantiated game session. In one arrangement, responsive to changes in bandwidth, delivery manager 330 uses a filtered game QoS/QoE profile to determine the audio and video encode settings and dynamically send the custom low latency adaptive video and audio encoder with haptics and mesh delivery module 324 new encoding parameters based on the dynamically changing network conditions. Example delivery manager 330 is further operative to provide game session/service manager 322 with notifications for high latency and low bandwidth conditions based on the game session's QoE/QoS profile.

Example interactions between delivery manager 330 and MGS bandwidth manager 340 are illustrated in FIG. 3B as follows: connection session setup request 301, session setup response with connection information and delivery session ID 303, QoS request with floor, ceiling and tier level as well as connection information and delivery session ID 305, QoS response with bandwidth and latency information 307, session bandwidth change notification 309 and session latency change notification 311. As will be seen in detail further below, at least a portion of the foregoing pieces of information may be used in one or more bandwidth (re)allocation processes executed by MGS bandwidth manager 340 in some embodiments of the present patent disclosure.

Example interactions between delivery manager 330 and game session/service manager 322 are illustrated in FIG. 3A as follows: delivery setup request 380, delivery setup response with data connection information 382, and QoS request with session profiles table 384 and continue session response 386.

Example interactions between game session/service manager 322 and XR session handler 355 of UE 367 with respect to a game session may be effectuated via respective X5 interfaces and are illustrated in FIGS. 3B and 3C as follows: continue game session with session ID 368, terminate game session with session ID 370, game session setup request with session ID and UE device capabilities 372, and game session setup response with session ID 374. Example interactions between game session/service manager 322 and the dedicated network slice 365 may also be effectuated via respective X5 interfaces and are illustrated in FIGS. 3B and 3C as follows: latency high notification 376 and bandwidth low notification 378.

In one arrangement, MGS bandwidth manager 340 may be deployed as a 5G XR AS subsystem, which may be configured to manage multiple sessions and dynamically allocate the slice bandwidth for each remote VRnon-VR game session as they are instantiated based on the respective game engine and rendering engine combination corresponding thereto.

Preferably, MGS bandwidth manager 340 is operative to interface with PCF 359 and NEF 361 of the dedicated game slice 365 via standardized interfacing with respect to QoS reservations and notifications. For example, QoS reservations pertaining to bandwidth and latency may be effectuated via the N5 interface to the slice's PCF 359. Notifications for low bandwidth and high latency may be received via RESTful API callback functions via the N33 interface from the slice's NEF 361. In some arrangements, the dedicated network slice 365 is further operative to provide MGS bandwidth manager 340 with the connection information (e.g., connection:ports) for all session communications via the N33 interface. It should be appreciated that in the example embodiment of FIGS. 3A-3C, MGS bandwidth manager 340 is deployed as a common 5G XRAS service that may be shared across all remote rendered gaming sessions sharing the dedicated slice 365. In further embodiments, MGS bandwidth manager 340 may be executed on a separate platform from the remote game instances, which are typically executed in separate VF/containers respectively corresponding to the instantiated game instances.

Example interactions between MGS bandwidth manager 340 and the dedicated game slice 365 are illustrated in FIGS. 3B and 3C as follows: bandwidth and latency reservation via N5 interface 388, bandwidth and latency reservation response via N5 interface 390, communication channel request via N33 interface 392, communication channel response via N33 interface 394, latency reporting via N33 interface 396, and bandwidth reporting via N33 interface 398.

In view of the foregoing distributed architecture, it will be realized that the various subsystems and components of an example implementation of the multisession remote gaming network 300 may be configured to interoperate with one another using standards-based interfaces in order to facilitate bandwidth and latency reporting with minimal delay to the computationally intensive portions of game rendering, e.g., the adaptive projection remapping module 326 and the custom low latency adaptive video and audio encoder with haptics and mesh delivery module 324. Additionally, the disclosed architecture is well suited for providing pose/head and gaze orientation data as well as control data from various gaming equipment and accessories to gaze and control handier 328 with low latency because of the edge deployment, thereby facilitating fast response times required in various games. For example, in some embodiments involving FPS/TPS games as well as other VR games such as racing, the disclosed game engine and rendering engine combination is operative to render the video covering up to 360° in an immersive gamespace without the deficiencies and shortcomings of the existing technologies as noted elsewhere in the present disclosure. It will be appreciated that an advantage of delivering the video up to the full 360-degree panorama removes the processing and network latency to meet the ~20 ms end-to-end latency for the motion-to-photon requirement to avoid motion sickness. The video beyond the viewport up to 360 degree video may be sent to a requesting UE client device as encoded video, where may be decoded and rendered locally. As such, sending the full 360 video requires more bandwidth, and to reduce the bandwidth requirement for the full 360-degree video, particular embodiments use foveated rendering with custom projection mapping to provide a higher density of pixels to a client device for pixels inside the user field of view, wherein the density of pixels outside of the user field of view may be lowered. Based on changing latencies and bandwidth, the disclosed remapping subsystem adapts and increases the area of higher concentration of pixels beyond the user field of view such that the user's experience is modulated when making rapid point of view movements and leaving the higher density area in a gamespace.

Figure 4:
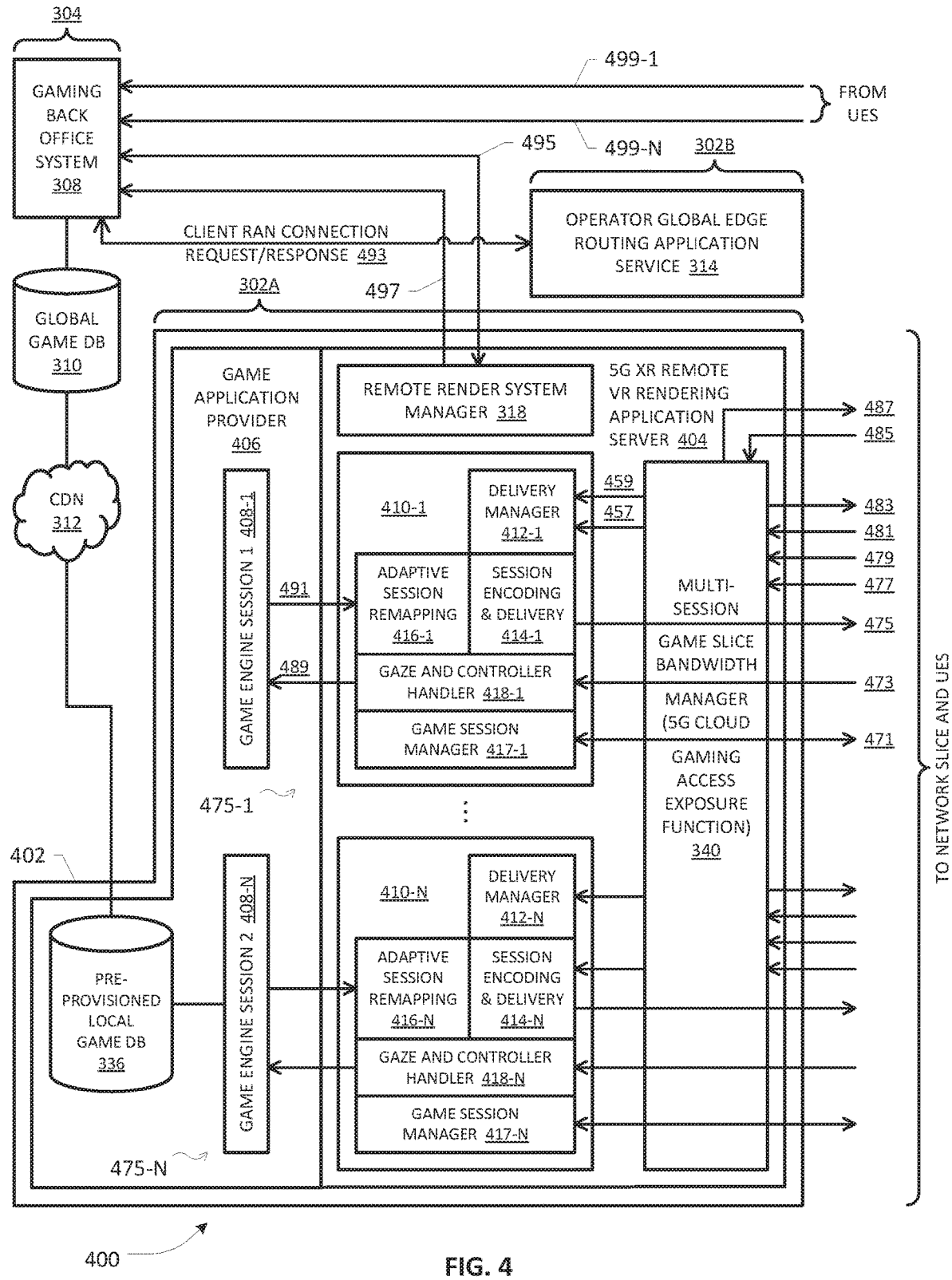
FIG. 4 depicts a generalized multisession remote game rendering network portion of FIGS. 3A-3C that illustrates multiple remote gaming service instances corresponding to a plurality of gaming sessions supported by a dedicated network slice according to an embodiment.

FIG. 4 depicts a generalized multisession remote game rendering network portion of FIGS. 3A-3C that illustrates multiple remote gaming service instances corresponding to a plurality of gaming sessions supported by a dedicated network slice according to an embodiment. Skilled artisans will recognize that example network portion 400 is illustrative of the network-side architecture of the network portion 300A/B depicted in FIGS. 3A/3B, wherein the operator's trusted edge data network 302A is exemplified in this embodiment with an edge-optimized remote gaming infrastructure portion 402 that comprises a remote game rendering application service or support node 404 (similar to the application service entity 316 of FIG. 3A) including a plurality of game render subsystems or engines 410-1 to 410-N (each corresponding to a specific instance of 5GXR AS entity 320 of FIG. 3A) operative to interface with a corresponding plurality of game engines 408-1 to 408-N, wherein each game engine is instantiated to support a particular respective gaming session of N gaming sessions managed by MGS bandwidth manager 340. As can be appreciated, entities 404 and 406 may be realized in any hardware/software platforms having one or more processors, memory with executable code and suitable network interfaces, wherein one or more VMs/containers and/or virtual network functions (VNFs) using any level of virtualization may be dynamically generated, i.e., instantiated, and terminated as needed. Accordingly, the arrangement shown in FIG. 4 can be implemented for supporting multiple gaming sessions at a local edge location, wherein the initial session setup and bandwidth adjustment on a per-session basis may be provided as set forth above in reference to the description of a single session architecture. Further, each game engine (and the corresponding rendering engine) may be executed in it own respective virtual machine container. In one arrangement, the plurality of virtual machines may be configured to share graphics processing unit (GPU) and other hardware resources, e.g., adaptive GPU/resource scheduling. Additionally or alternatively, the virtual machine deployment may involve a bare metal passthrough to a physical GPU. In one arrangement, the MGS bandwidth manager 340 may be provided as a single entity, module or function for managing the bandwidth for all gaming sessions sharing the same network slice. Due to the size of the game data, the game data may be pre-provisioned over CDN 312 to the edge locations, as previously described. It should be noted that in some arrangements, the game data cannot be cached as a result of the first UE playing a game since the game data must be loaded in very low latency and must be local for gameplay.

As will be described in detail further below, MGS bandwidth manager 340 is operative to dynamically allocate/reallocate bandwidth based on the size of the dedicated network slice, e.g., slice 365, and the number of sessions along with each session's tier, floor and ceiling bandwidths. The embodiment shown in FIG. 4 exemplifies an architectural implementation involving multiple VMs/containers executing corresponding game sessions, with the MGS bandwidth manager 340 operating to allocate/manage bandwidth across the game sessions. In one arrangement, when a new session is started with tier, floor and ceiling information, the bandwidth is (re)calculated across all sessions within the dedicated network slice based on each session's tier to fit in the new session. After the bandwidth has been (re)calculated, and responsive thereto, MGS bandwidth manager 340 is operative to generate requests to the each session's delivery manager to change the delivery/encoding bitrates based on the new allocation for each session. Responsive to the delivery bitrate changes (e.g., they have been reduced), MGS bandwidth manager 340 is operative to generate requests to the network slice's PCF via the N5 interface to readjust the bandwidth and latency reservation for each existing session based on the calculations with the new session along with each session's tier level. If a session is terminated, and responsive thereto. MGS bandwidth manager 340 may calculate a new session bandwidth for each session based on each session's tier and network slice size. Once the bandwidth for all existing sessions have been calculated, and responsive thereto, MGS bandwidth manager 340 is operative to generate bandwidth and latency reservations/requests to the network slice's PCF via the N5 interface for each of the existing sessions based on the new bandwidth allocation calculation. After the bandwidth has been reallocated, and responsive thereto, MGS bandwidth manager 340 is operative to send a new bandwidth and latency allocation to every existing session's delivery manager for increasing the encoding bitrates based on the new bandwidth calculation for the session. Additional details with respect to the foregoing aspects will be set forth in detail further below.

In arrangement, each game engine may be executed in the same container/virtual machine running the corresponding game render subsystem, thereby resulting in multiple VM/containers 475-1 to 475-N. Accordingly, VM/container 475-1 with respect to game session 1 may include an instance of game engine 408-1 as well as instances of the various modules of game render subsystem 410-1, namely, game service/session manager 417-1, gaze and control handler module 418-1, adaptive projection remapping module 416-1, session encoding and delivery (i.e., custom low latency adaptive A/V encoder with haptics and mesh delivery) module 414-1 and delivery manager 412-1. Likewise, VM/container 475-N with respect to game session N may include an instance of game engine 408-N as well as instances of the various modules of game render subsystem 410-N, namely, game service/session manager 417-N, gaze and control handler module 418-N, adaptive projection remapping module 416-N, session encoding and delivery (i.e., custom low latency adaptive A/V encoder with haptics and mesh delivery) module 414-N and delivery manager 412-N.

Various interactions, messages, requests/responses, etc. that may be implemented in example multisession remote gaming architecture 400 are set forth as follows, wherein the interactions with respect to Session-1 are illustrated in particular detail. Game session setup request/response mechanisms 499-1 to 499-N may be executed between UEs. UE-1 to UE-N, (not shown in this FIG.) and the gaming back office system 308 via respective X8 interfaces as described above in reference to FIGS. 3A/3C. Client RAN connection request/response mechanisms may be executed between the edge routing application service 314 and the gaming back office system 308 with respect to each UE, wherein the routing application service provides locator functionality that may be used to identify the correct edge processing game engines that should be instantiated and run based on the respective locations of the UEs in the network. A remote render system manager startup request/response mechanism 495 may be executed between RRS manager 318 and the remote gaming back office system via the X2 interface. Also, where appropriate, a terminate session with session ID message 497 may be provided by RRS manager 318 via the X2 interface to the remote gaming back office system 308.

With respect to slice management, a slice size request 487 may be generated by MGS bandwidth manager 340 to the network slice via the N5 interface. Responsive thereto, a slice size notification 485 (e.g., in [S] Mbs) may be received from the network slice via a RESTful API using the N33 interface as previously described. A game connection request/response mechanism 471 may be executed between UE-1 and game session/service manager 417-1 with respect to a gaming session, i.e., Session-1. A bandwidth and QoS latency requirement request 483 with respect to Session-1 is generated by MGS bandwidth manager 340 to the network slice via the N5 interface. Responsive thereto, a bandwidth and latency reservation response 481 for Session-1 is received from the network slice via the N5 interface. Also, latency and bandwidth reporting 477, 479 with respect to Session-1 may be received by MGS bandwidth manager 340 from the network slice using the RESTful APIs via the N33 interface.

MGS bandwidth manager 340 provides bandwidth allocation information 457 and latency information 459 pertaining to Session-1 to the instantiated delivery manager 412-1 of game rendering engine 410-1. Game controller and headset/gaze orientation data 473 for Session-1 is received from UE-1 by gaze/controller handler module 418-1 via the X4 interface, which is propagated to game engine 408-1 via the X1 interface 489. Raw render data 491 for session-1 is received from game engine 408-1 by adaptive projection mapping module 416-1 via the X1 interface 491. Game render data 475 for Session-1 may be transmitted to UE-1 by the session encoding/delivery module 414-1 of the game rendering engine 410-1 via X4 interface for decoding and rendering thereat.

Skilled artisans will recognize that the functionality of each of the various subsystems, components, modules, databases, etc. deployed as part of an operator's trusted data network (e.g., either at an edge location and/or a centralized core) or at an external data network, and described above in reference to the embodiments of FIGS. 3A/3C and FIG. 4, can be performed by one or more components of the respective networks or network portions thereof. In other words, the functionalities of the various subsystems, components, modules, databases, etc. may be performed by different functional/logical blocks and there is no structural or functional limitation that each of the described components must exist separately (e.g., in software or hardware) and perform exactly the steps, acts and functions attributed to it. Furthermore, some of the 5GXR AF and 5GXR AS entities of an instantiated game rendering engine (e.g., game rendering engine 320 in FIG. 3A) may be configured to communicate with each other via an M3 interface similar to the architecture 200 shown in FIG. 2. For example, delivery manager 330 may be use an M3 interface for internal communications with game service manager 322, adaptive projection remapping module 326, custom latency adaptive A/V encoder 324 and/or MGS bandwidth manager 340. In general, inter-component communications between AS-AF entities internal to an instantiated game rendering engine at the trusted edge DN location may be effectuated over M3 interfaces in a 5G-compliant distributed architecture implementation according to the teachings herein.

Figure 5:
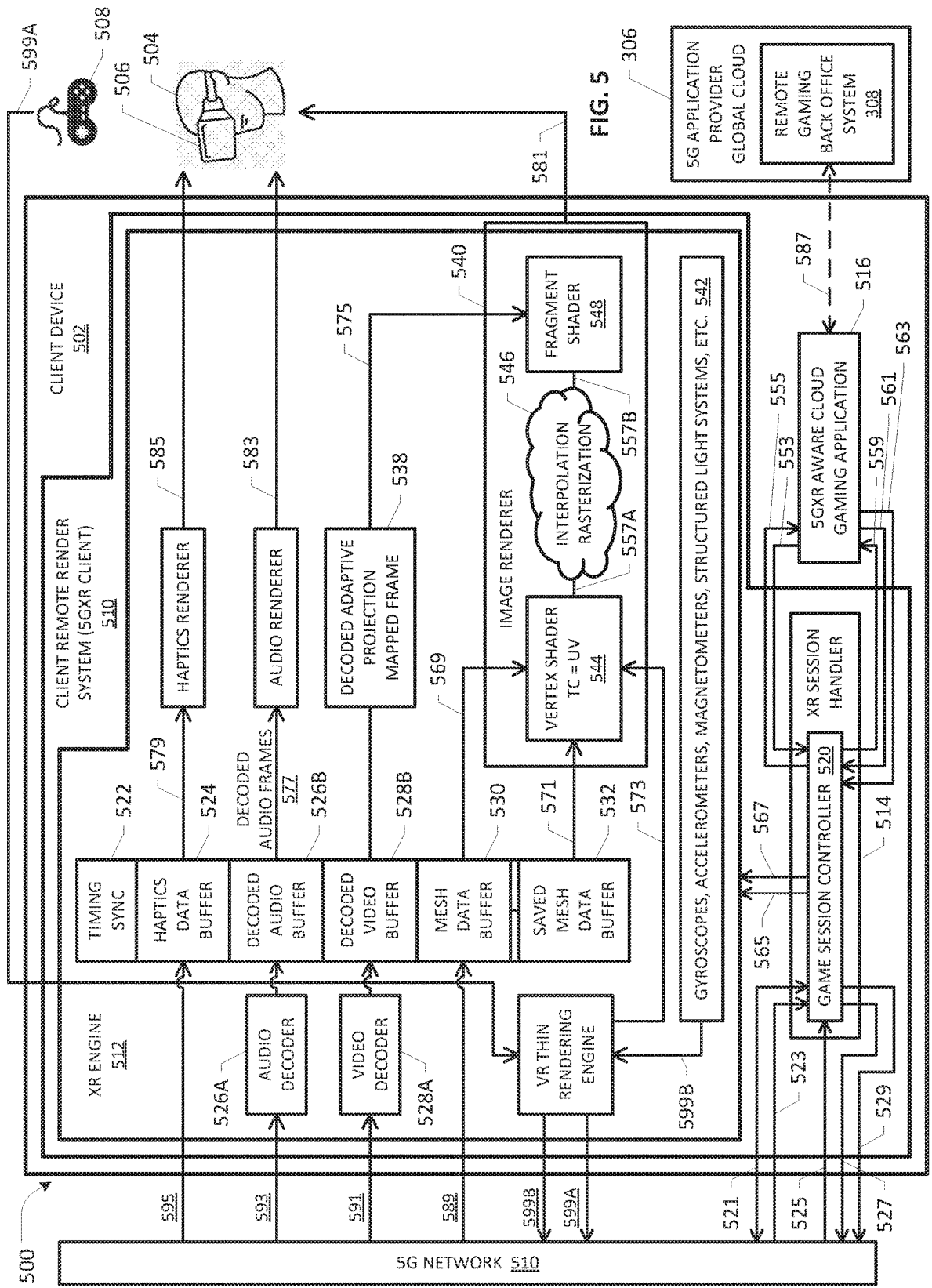
FIG. 5 depicts a block diagram of a gaming client device operative in a multisession remote game rendering network according to an embodiment.

FIG. 5 depicts a network portion 500 wherein a block diagram of a gaming client device 502 operative according to an embodiment is shown in detail. As noted previously, example gaming client device 502 may be configured to include, execute or otherwise provide various components required to operate in a 5G-compliant architecture for consuming a remote gaming service via a 5G network 510 hosted by an external cloud-based application provider platform, e.g., platform 306 including the remote gaming back office 308, described above. In one arrangement, accordingly, a 5G XR client application operative as a client remote render game system 510 is provided as part of UE/client device 502 that includes an XR session handler 514 and an XR Engine 512. As depicted, XR session handler 514 includes a game session controller 520 that interacts with a cloud-aware 5G XR game session application 516 operative to communicate with the 5G application provider's gaming service that provides a catalog of games for the user, e.g., game player 504 having appropriate gaming equipment such as HMD 506 and game controller 508, to choose from and select a game to play. In one arrangement, game session application 516 may be configured to interface with the application provider platform 306 including the remote gaming back office 308 via an X8 interface 587 for effectuating a session request/response mechanism. Once a game is selected, game play client functionality may be handed off to the client remote game render system 510 configured as a 5GXR client. When a user selects to play a game, the game session application 516 generates a game session setup request for the selected game title to the remote back office system 308 via the X8 interface 587, wherein the session setup request may include device information such as network information, the local RAN edge where the device is connected, device's processing capabilities, viewing device resolution, field of vision in degrees and codecs supported, etc. In some embodiments, the session setup request may also contain a requested bandwidth and latency. Responsive thereto, a session setup response may be received by the game session application 516, wherein the response may contain a game session ID as well as the information for the cloud remote gaming rendering service. Upon receipt of the information and responsive thereto, the game session application 516 is operative to provide the session ID and connection information to the game session controller 520, which may be provided as part of XR session handler 514 in some embodiments. Responsive thereto, XR session handler 514 is operative to generate a message to a game service/session manager disposed as a 5G XR AS entity in the operator network (e.g., game service/session manager 322 in FIG. 3A) including a game setup request and session ID via X5 interface. A game engine for the game session will have been instantiated at the correct/closest edge location based on the client device's location as noted previously in respect of the embodiments depicted in FIGS. 3A-3C and FIG. 4, described above. The game session/service manager is operative to respond with a session setup response containing the connection information for registering, for low bandwidth and high latency notifications, as well as the connection information for sending the headset orientation/pose and controller input data via appropriate interfaces. In one embodiment, the response from the game session/service manager may also include the network connection information for receiving the encoded video and audio streams and the dynamic mesh and haptics data. Upon receipt of the response from the game session/service manager, XR session handler 514 is operative to register via the RESTful API for receiving low bandwidth and high latency notifications. XR session handler 514 is further operative to send the server connection information, which is the network connection information for receiving the encoded video and audio and the dynamic mesh and haptics data, to the XR engine's VR thin rendering engine 550. Responsive thereto, VR thin rendering engine 550 is operative to connect/join the streams being sent to the address(s):port(s) defined in the received connection information. Preferably, the game data streams are received over one or more X4 interfaces by appropriate entities provided as part the XR engine 512 once the game session is executing on the client device 502. Likewise, the control and headset orientation/pose data, game controller data as well as other kinetic motion data or data descriptive of rigid body motion in 6DoF, etc., may be transmitted by VR thin rendering engine 550 over respective X4 interfaces pursuant to the game session. Skilled artisans will recognize that such data may be generated by and received from game controller 508, eye/motion detectors associated with HMD 506 as well as any assortment of gaming equipment operative to generate data relative to player movement/placement in a gamespace, e.g., via respective X4 interfaces 599A/B. Such data may also be processed via various subsystems, sensors, etc. provided as part of XR engine 512, e.g., gyroscopes, magnetometers, accelerometers, structured light systems, etc., cumulatively shown at reference numeral 542, that may combine and process the eye/head tracker data and provide to VR thin rendering engine 550, e.g., via interface 599B.

If XR session handler 514 receives a low bandwidth or high latency notification (e.g., via X5 interfaces), the 5GXR gaming application 516 may be notified via X6 interfaces by XR session handler 514 of the poor QoS situation. As noted earlier, based on network conditions, the requested bandwidth and latency might not be met in some scenarios. However, the response can contain what resources are available in some embodiments. Depending on implementation, a game application developer could choose to not allow the session due to a poor QoE or an option could be to allow the user choose to continue with the game with information of what the experience might be. In some implementations, suitable SLAs may be provided such that there could be adjustments in the price/cost of the game charged to the player based on the user experience. Other mechanisms for handling and responding to the indications of suboptimal QoE/KPIs may be provided in still further embodiments.

Example messages between XR session handler/game session controller 514/520 and the network 510 via X5 interfaces are: game session connection request/response mechanism 521, low bandwidth notification 523, high latency notification 525, terminate session request with session ID 527, and continue session notification with session ID. Corresponding example messages between XR session handler/game session controller 514/520 and the 5GXR gaming application 516 via X6 interfaces are: game session connection information 553, low bandwidth notification 555, high latency notification 559, continue game session 561, and terminate session 563.

Various blocks, modules and components, which may be separate or integrated, may be provided as part of XR engine 512 for handling/processing the gaming data in one implementation. By way of example, following modules are illustrated in FIG. 5 according to an embodiment: audio decoder 526A, video decoder 528A, timing synchronization (sync) module 522, haptics data buffer 524, decoded audio buffer 526B, decoded video buffer 528B, mesh data buffer 530, saved mesh data buffer 532, haptics renderer 534, audio renderer 536, and image renderer 540 including a vertex shader 544, interpolation rasterization module 546 and fragment shader 548 operative to process a decoded adaptive projection mapped frame 538 received via video data path 577. When the remote VR game session is running, the incoming encoded audio data 593 via X4 interface is decoded, and the raw audio with time windows is sent to the timing sync block 522 with the timing information and stored in decoded audio buffer 526B. The incoming encoded video 591 via X4 interface is decoded, and the raw video with timing windows is sent to the timing sync block 522 and stored in decoded video buffer 528B. X4 interfacing with the network 510 is also used for receiving incoming haptics data with timing windows 595, which is stored in haptics data buffer 524, and the render mesh data with timing windows 589 that is stored in render mesh data buffer 530. In one example, the time windows may comprise or use PTS information. Other timing could also be used such as Epoch time in some example embodiments. The rendering mesh data may comprise both spatial coordinates (e.g., x, y, z coordinates) as well as 2D or 3D texture coordinates (e.g., u, v coordinates or u, v, w coordinates). In one implementation, the video and audio may be temporally behind the mesh data and haptics data due to the delay introduced by the projection remapping and encoding of the video and audio. Accordingly, the haptics and mesh data may arrive at the client device 502 faster/earlier, wherein more presentation windows may be buffered for that data. As soon as all data for rendering video (which includes decoded picture and rendering mesh data, audio data and haptics data) arrives for a time window (e.g., PTS in the example embodiment), the audio, video with mesh data and haptics may be provided to respective renderer functions. The decoded audio data 579 is sent to audio renderer 536, decoded video and mesh data are sent to video image renderer 540, and haptics data 579 is sent to haptics renderer 534.

In one arrangement, VR thin rendering Engine 550, which is part of XR engine 512, may be configured as a thin client operative to generate model view projection data 573 that is used by vertex shader 544 in image renderer 540 to properly render the correct visual information in the headset or on a monitor within a gamespace (e.g., immersive or partially immersive 3D-space) based on where the viewport is pointing. Typically, a game rendering engine may only output the viewport view and may perform this functionality internally. As stated earlier, if this is done for remote rendering, the latency must be less than 20 ms or the user may experience motion sickness. Example embodiments disclosed herein eliminate the less than 20 ms roundtrip latency requirement by delivering the full 360 video from the gaming engine to the client device and performing the model view projection locally vs. on the remote game engine. Because this is executed locally and the video is sent as 360 degree video from the remote game engine to the client device, the less than 20 ms motion-to-photon requirement only exists locally on the client device.

There may be cases where the client device may not meet the less than 20 ms requirement. For example, processing power limitations on the client device may not be able to run the requisite processes for a particular remote game session. Typical limitations may be resolution, framerate and the type of video encoding used. Low end devices may not have the processing to decode 8K high framerate video or run advance codecs such as Versatile Video Coding (VVC). In example embodiments, an implementation of the remote game rendering system executing at the trusted edge data network receives the device capabilities and the instantiated game session is provisioned (albeit based on filtering) to ensure the encoded video will be playable on the device.

In addition to generating model view projection data 573, thin rendering engine 550 is also operative to provide gaze/headset orientation/pose data and game controller data via X4 interfaces 599A/B to the remote game rendering system's gaze and control handler functionality, as noted previously. In example embodiments herein, game pose/orientation data is forwarded to the adaptive projection mapping functionality executing at the remote game rendering system to rotate the custom projection map to offer the highest pixel density to the area where the headset viewport is looking (e.g., defined by a gaze vector) in the immersive space, as noted previously in reference to the commonly-owned "Optimized Game Rendering" patent application, incorporated by reference hereinabove.

Some examples of headset orientation data representations may comprise quaternions, orientation matrices, or other data structures operative to describe rigid-body motion/placement in a 3D space. However, particular embodiments are not limited to such data representations. In general, headset orientation may be referred to in any suitable data representation as the data being transmitted from the client to the remote game rendering system with respect to the viewport.

Vertex shader 544 is operative to process dynamic mesh data (e.g., x, y, z spatial coordinates and u, v, w texture coordinates) 569, 571 and model view projection data 573 to generate vertex texture coordinate data 557A that is provided to interpolation rasterization 546. Responsive thereto, interpolated texture coordinate data 557B is generated and provided to fragment shader 548. Using the decoded adaptive projection mapped frame 538 and interpolated texture coordinate data 557B, fragment shader 548 is operative to generate image data 581, which may be provided to a suitable display device, e.g., such as a monitor or HMD, as viewport pixel data. Because example embodiments use a custom projection map for foveated rendering, the frame must be rendered properly in the display. Mesh data 569/571 may be used by vertex shader 544 for the proper headset or monitor rendering facilitated in the display device. Further, rendered haptics output 585 by haptics renderer 534 and decoded rendered audio frames 583 from audio renderer 536 are provided to appropriate components/devices of the user's gaming rig or equipment.

In addition to bandwidth savings by using the custom projection mapping, the foveated rendering enables a higher quality of video to be displayed in the headset on lower end devices. Rather than sending the pixels evenly packed across the entire immersive field, e.g., 360 degree space, the pixel density is highest in the headset point of view, offering a higher quality of experience to the user. This is done by eliminating the device computing required to decode the full 360 degree video at the higher resolutions but giving a similar quality as if the full 360 degree video was encoded at the higher resolution.

Figure 6:
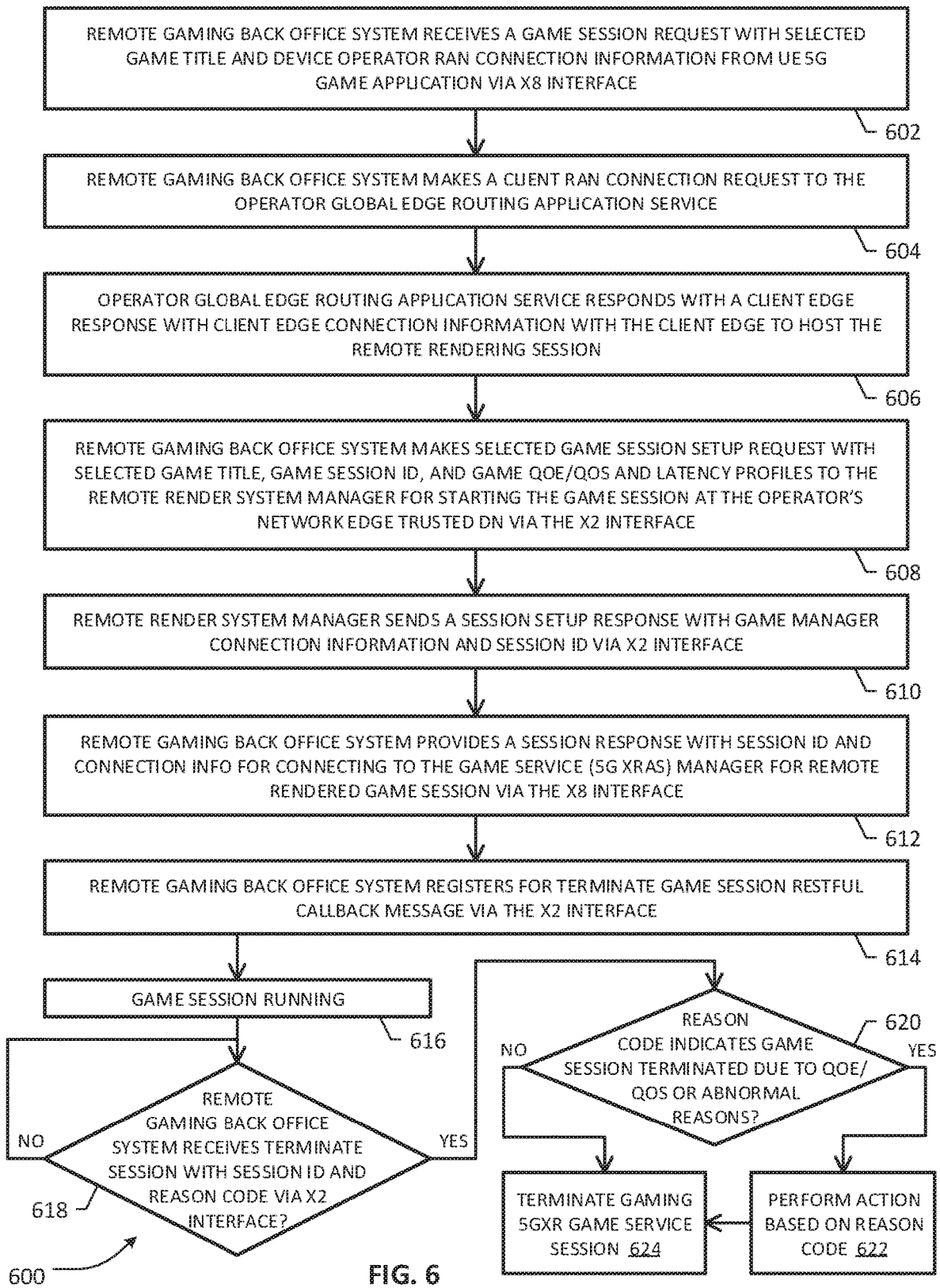
FIG. 6 is a flowchart of various blocks, steps and/or acts associated with a remote gaming back office process that may be (re)combined in one or more arrangements with additional flowcharts of the present disclosure according to some embodiments.

FIG. 6 is a flowchart of various blocks, steps and/or acts associated with a remote gaming back office process 600 according to an example embodiment for handling one or more gaming sessions/requests on behalf of a plurality of clients. At block 602, example remote gaming back office (RGBO) system, subsystem, platform, node, or apparatus disposed in an external network (e.g., RGBO 308) receives from a client device a game session request for setting up a gaming session with a selected game title. In example embodiments, the game session request may be generated from a 5G game application executing on the client device, and received via an X8 interface, and may include various pieces of data or information, e.g., device operator RAN connection information. QoE/QoS requirements, etc., as noted elsewhere in the present patent disclosure. Responsive thereto, example RGBO subsystem may engage in a query/response interrogation mechanism with a routing application that may be hosted by one or more operator networks. As illustrated, RGBO subsystem may be configured to generate a client RAN connection request to an operator global edge routing application service that may be disposed in an operator's trusted centralized data network (block 604). Responsive thereto, the operator global edge routing application service is operative to generate a client edge response including client edge connection information identifying an appropriate client edge infrastructure entity at a location of the operator network (e.g., based on device location in the RAN, cost metrics, routing optimization, network quality metrics, availability of gaming content, etc.) to host a remote rendering session with respect to the requested gaming session (block 606). Responsive to the information obtained/received in the client edge response, RGBO subsystem generates a game session setup request (e.g., via an X2 interface) to a remote render or rendering system (RRS) manager disposed in the selected/identified edge network having a trusted data network infrastructure, wherein the setup request may include the selected game title, QoS/QoE and latency profiles associated with the game title, etc. as set forth at block 608. In response. RRS manager is operative to generate a session setup response to, and received by, the RGBO subsystem identifying a game service/session manager instantiated at the trusted edge data network location (e.g., game service/session manager 322 configured as a 5G XR AS entity) and a session ID, as set forth at block 610. Responsive thereto, RGBO subsystem provides a session response to the client device, wherein the response includes the session ID as well as connection information for connecting to the game service manager (block 612). At block 614, RGBO subsystem may register with the RRS manager for receiving RESTful messages (e.g., callback messages, session termination messages, etc.). At block 616, a game session state is illustrated indicating that the game session is established and running, including remote game rendering, for delivery of encoded gaming content to the client device with respect to the requested game title. In one embodiment, the game session state may be maintained until a session termination message is received. For example, a determination is made at block 618 as to whether a terminate session message with session ID and a reason code for termination is received at RGBO subsystem, e.g., propagated from the RRS manager. If so, a further determination may be made at block 620 if the reason code indicates a cause (e.g., termination due to quality reasons or for other reasons). Depending on the operator network policy, game application provider policy, etc., an action may be performed based on the reason code (e.g., a diagnostic action, a corrective action, etc.), as indicated at block 622. In one embodiment, irrespective of whether a reason code is provided and/or an action is performed, the game session may be discontinued, stopped and the service instance may be terminated accordingly (block 624). In some embodiments, policy-based price compensation, refund, coupon, or credit, etc., may be may be provided to the player for continuing to play in poor quality conditions, depending on service agreements, which may involve a management entity associated with, e.g., RGBO system 308 and/or trusted operator network OSS/BSS entities.

It will be apparent to one skilled in the art upon reference hereto that the various blocks, steps, functions and/or acts set forth in respect of process 600 of FIG. 6 may be (re)combined in one or more arrangements with additional flowcharts of the present patent disclosure for purposes of some embodiments, as will be seen from further sections below.

Figure 7:
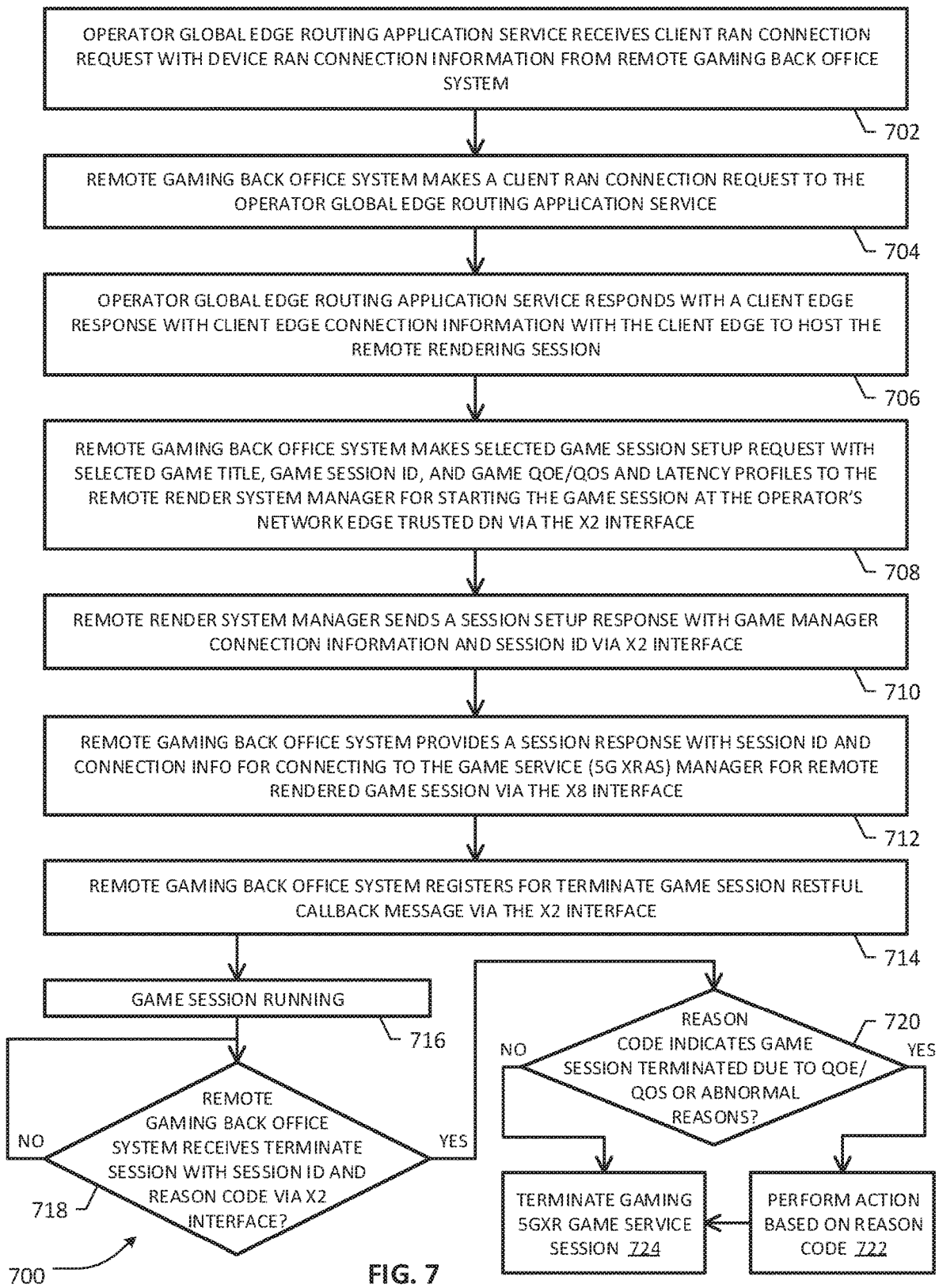
FIG. 7 is a flowchart of various blocks, steps and/or acts associated with a remote game session setup and gameplay process according to an example embodiment.

FIG. 7 is a flowchart of various blocks, steps and/or acts associated with a remote game session setup and gameplay process 700 from the perspective of an operator global edge routing application service receiving a client RAN connection request from an RGBO subsystem as set forth at block 702. It will be seen that process 700 includes steps 704-724 that are substantially identical to steps 604-624 set forth above, whose description is equally applicable here, mutatis mutandis. Accordingly, further description relative to steps 704-724 will not be repeated in respect of the flowchart of FIG. 7.

Figure 8:
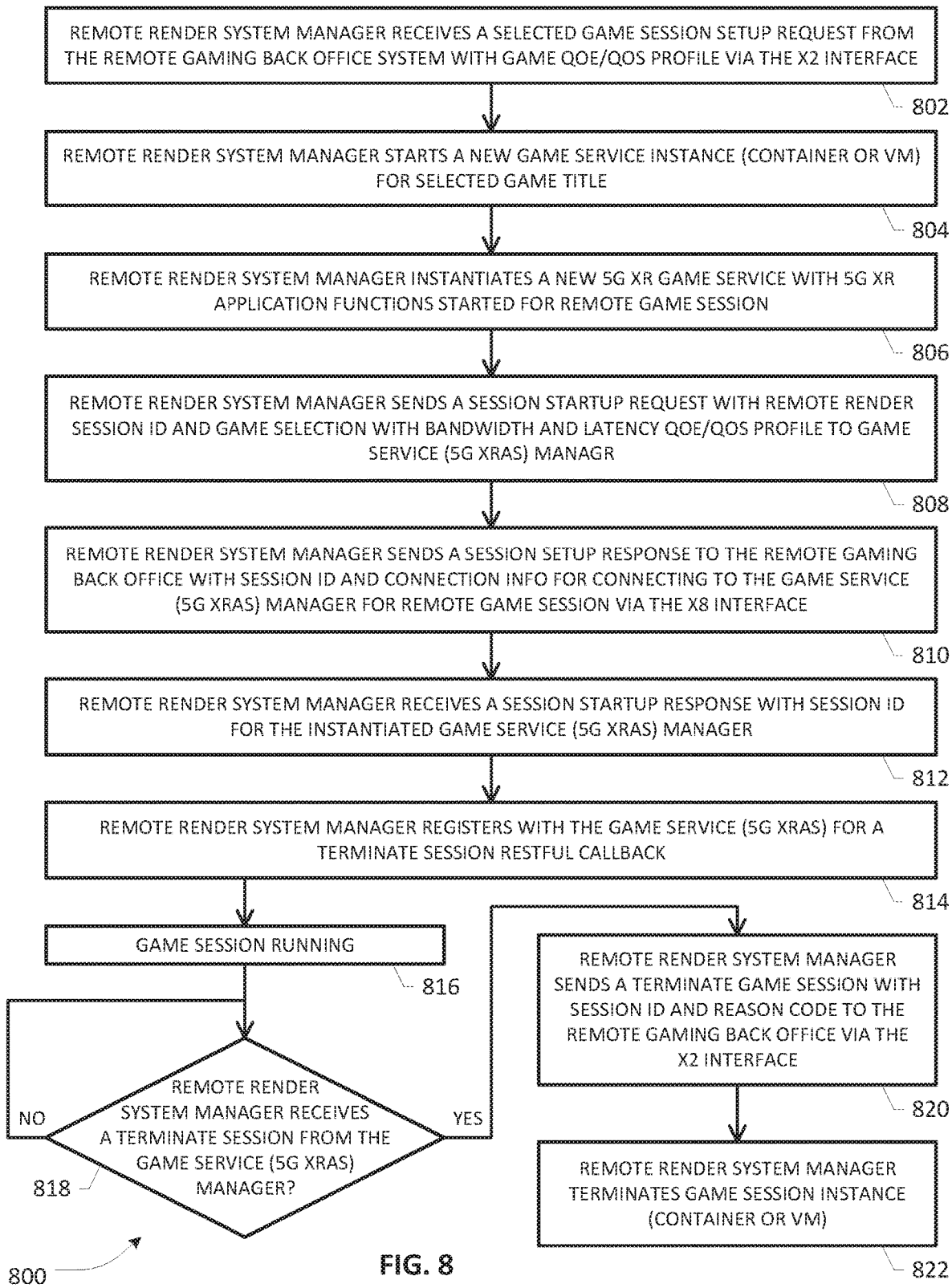
FIG. 8 is a flowchart of various blocks, steps and/or acts associated with a remote render system management process for managing multiple game session instances at an operator network according to an example embodiment.
Figure 9A:
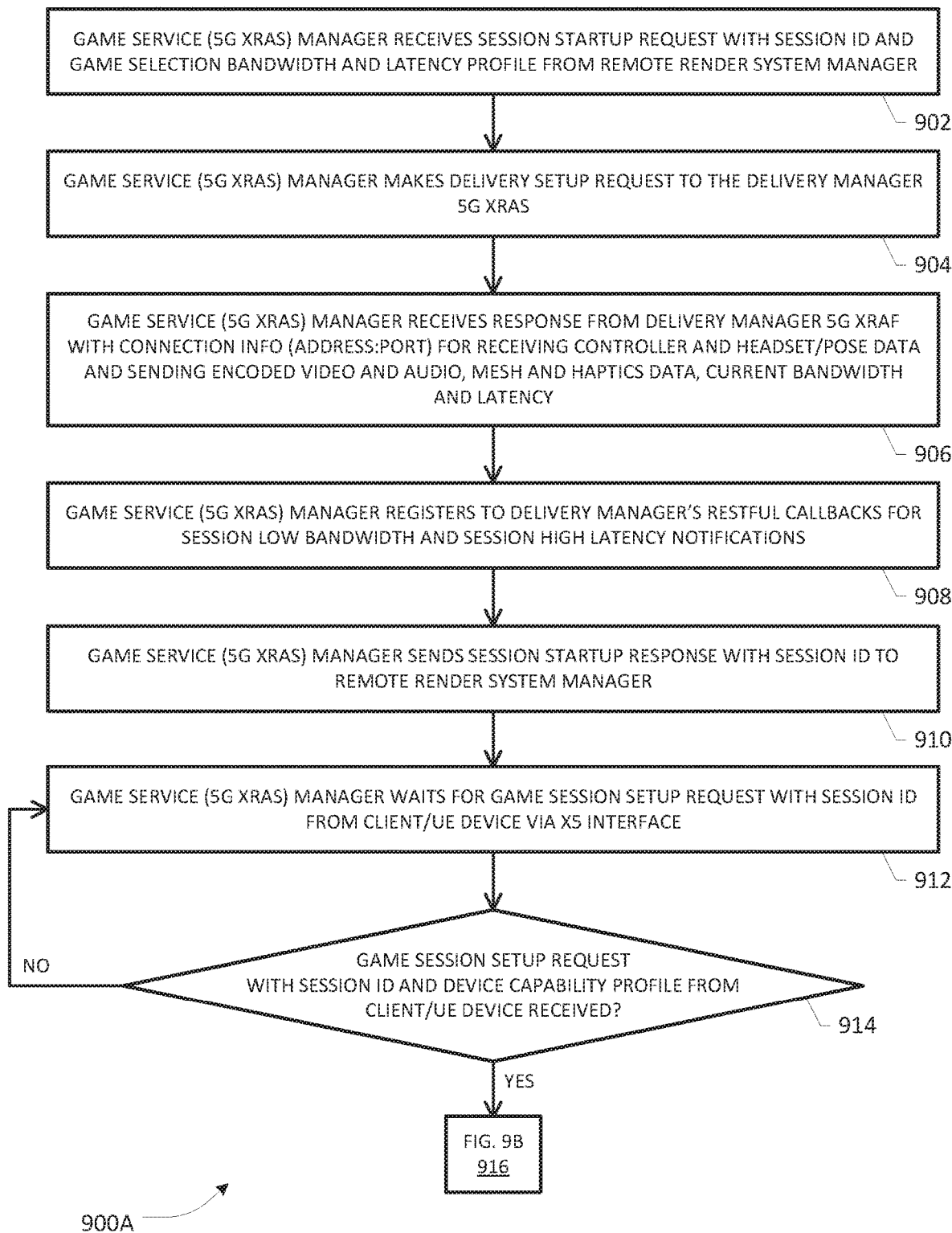
Figure 9B:
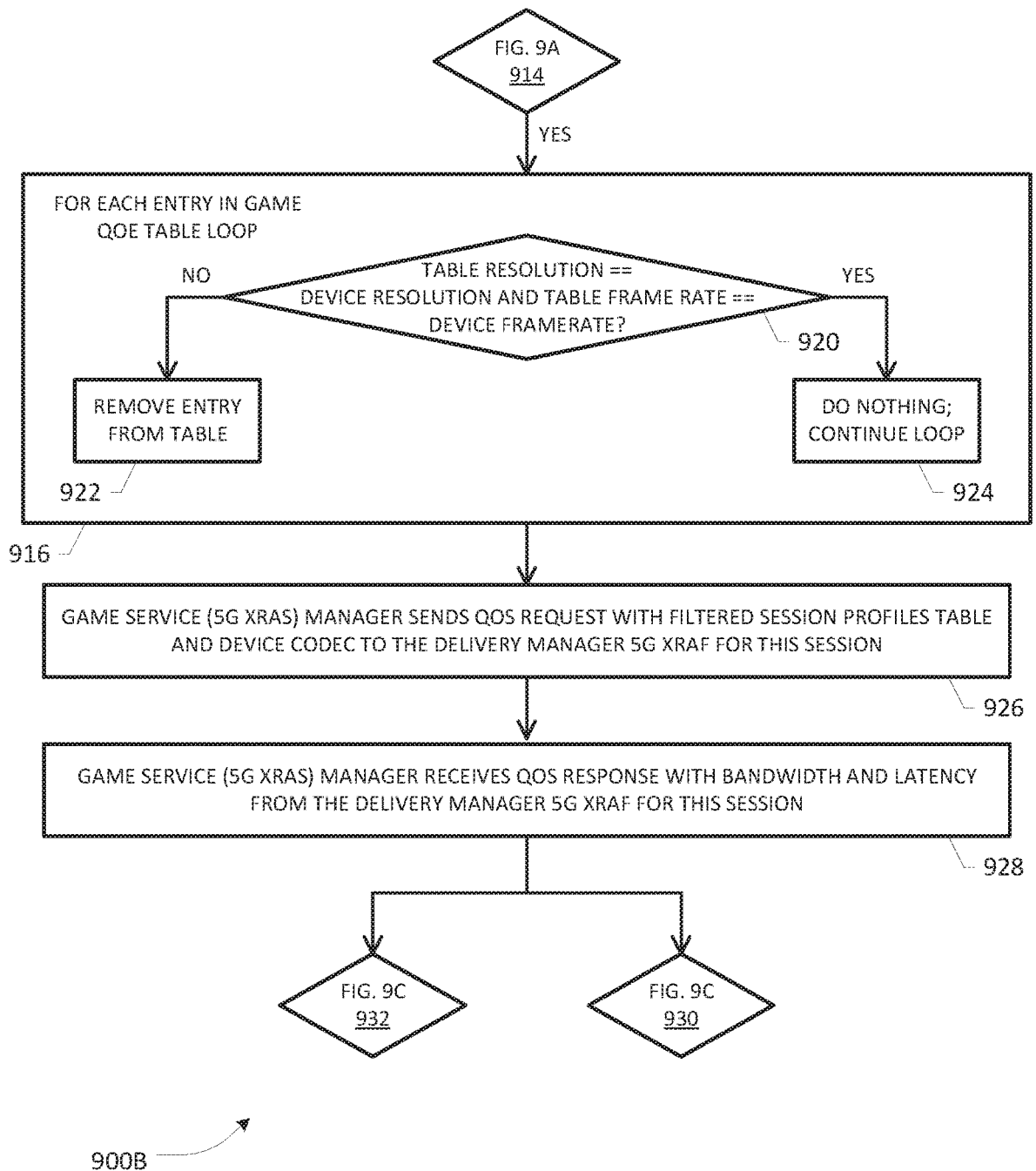
Figure 9D:
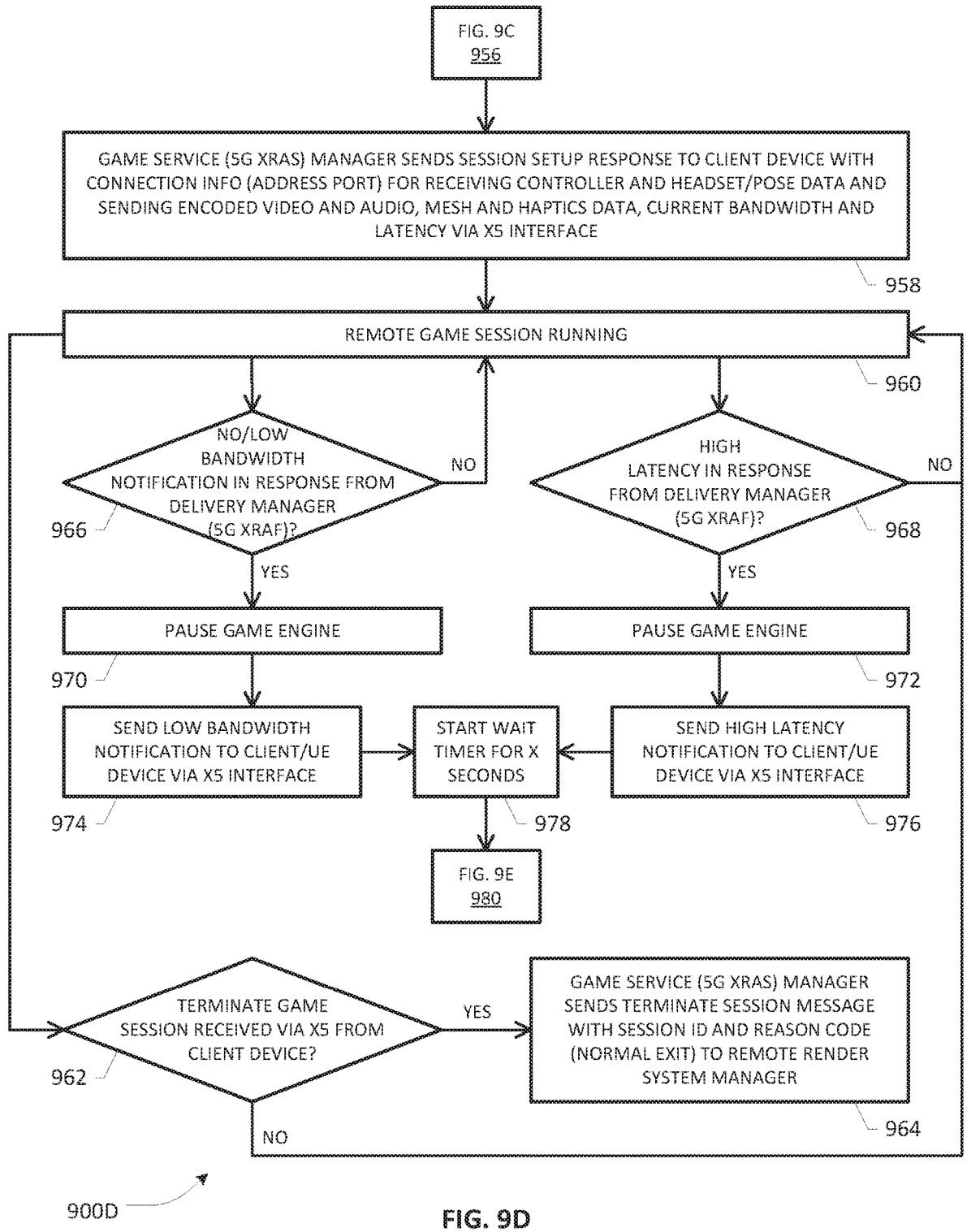
Figure 9E:
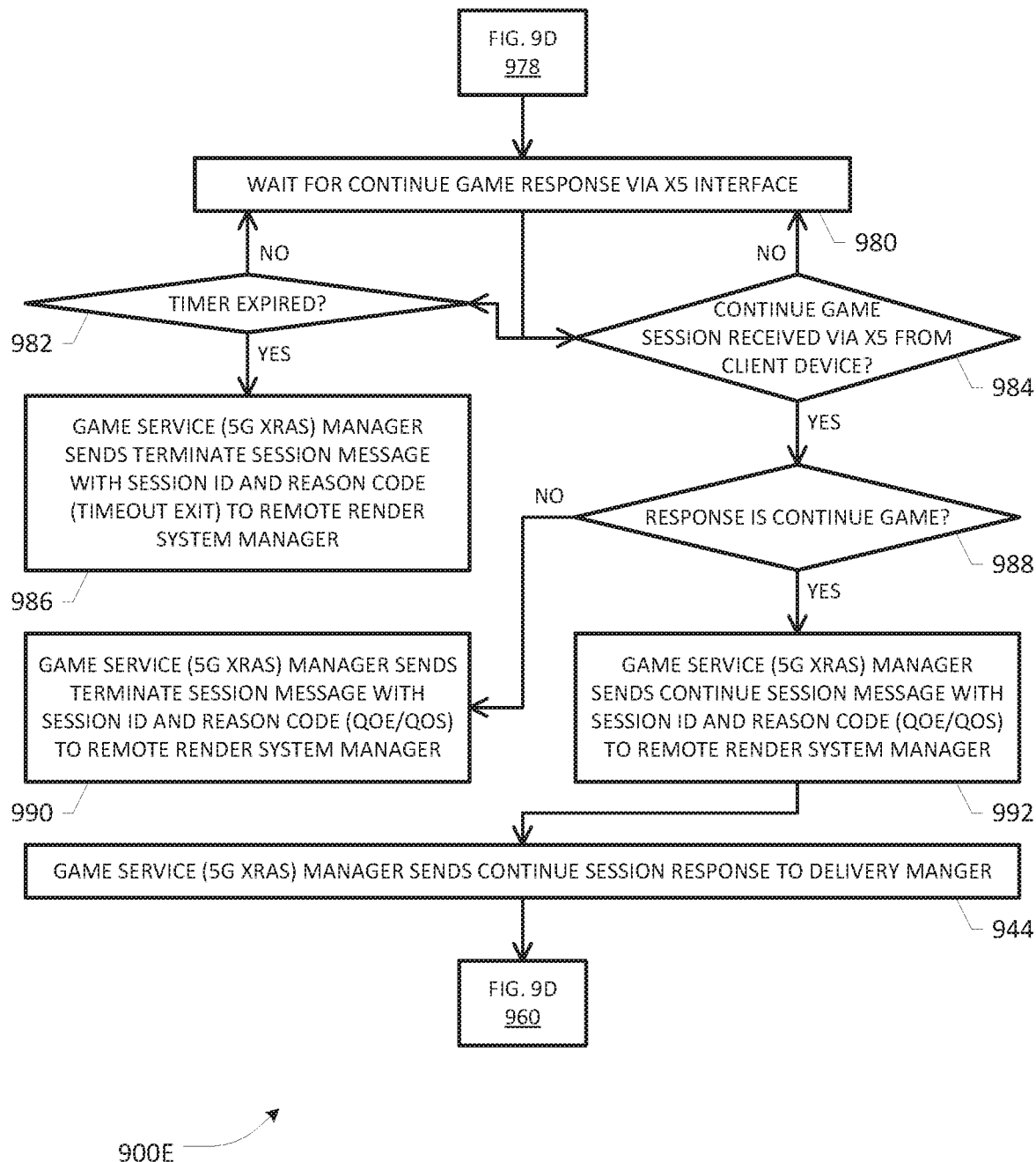
Figure 10A:
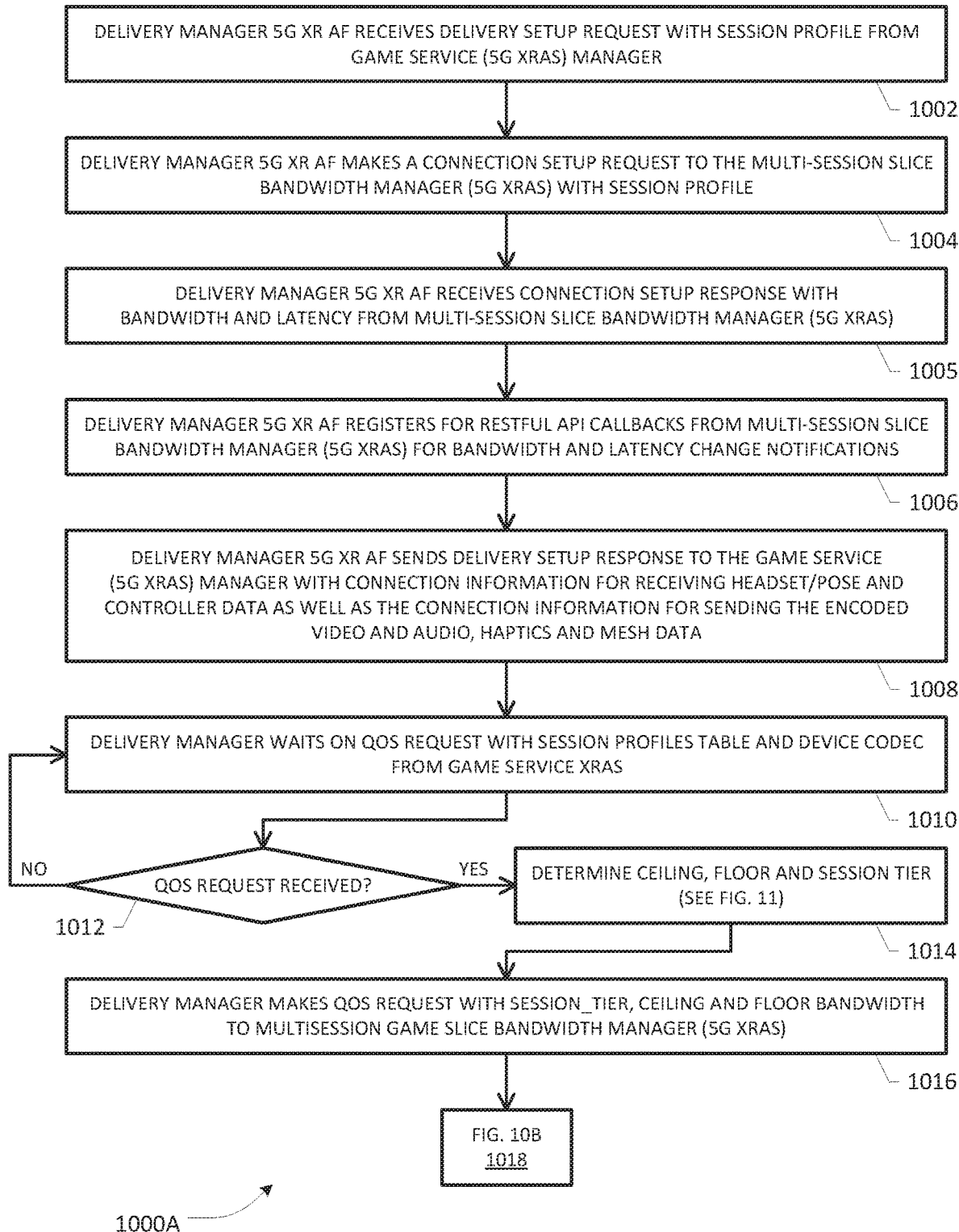
FIGS. 10A-10D depict a flowchart of various blocks, steps and/or acts associated with a delivery management process for facilitating session setup at an operator network according to an example embodiment.
Figure 10B:
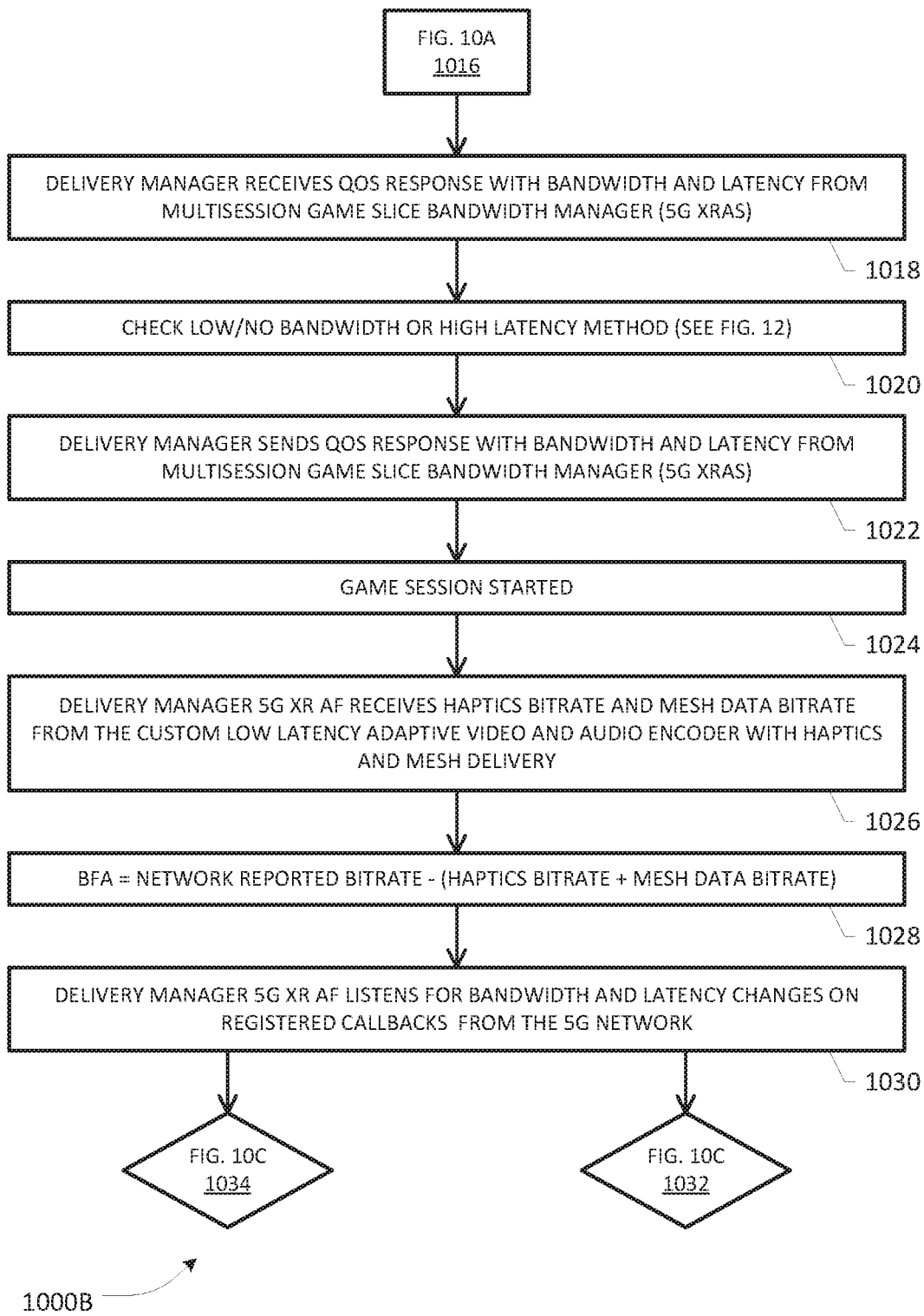
Figure 10C:
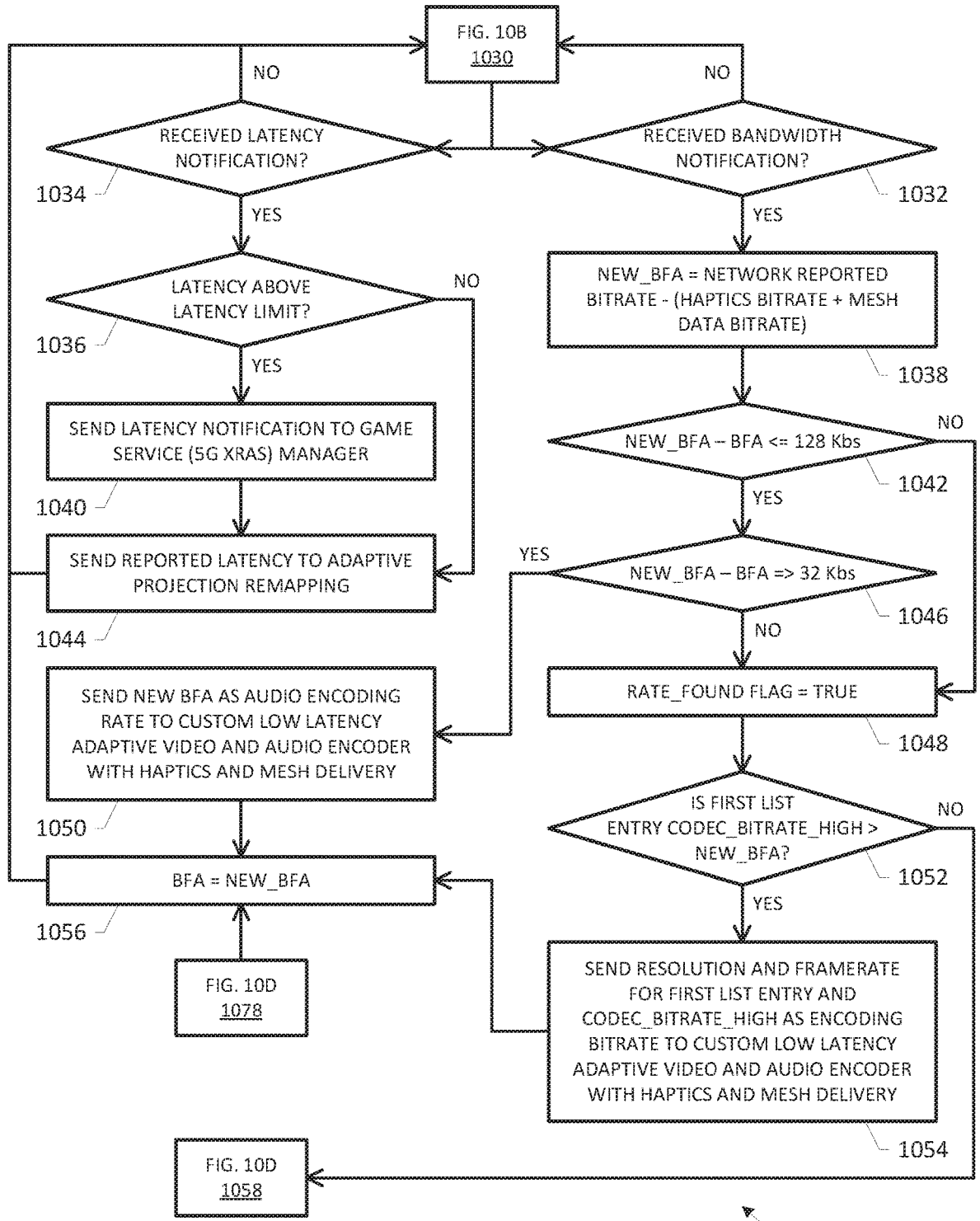
Figure 10D:
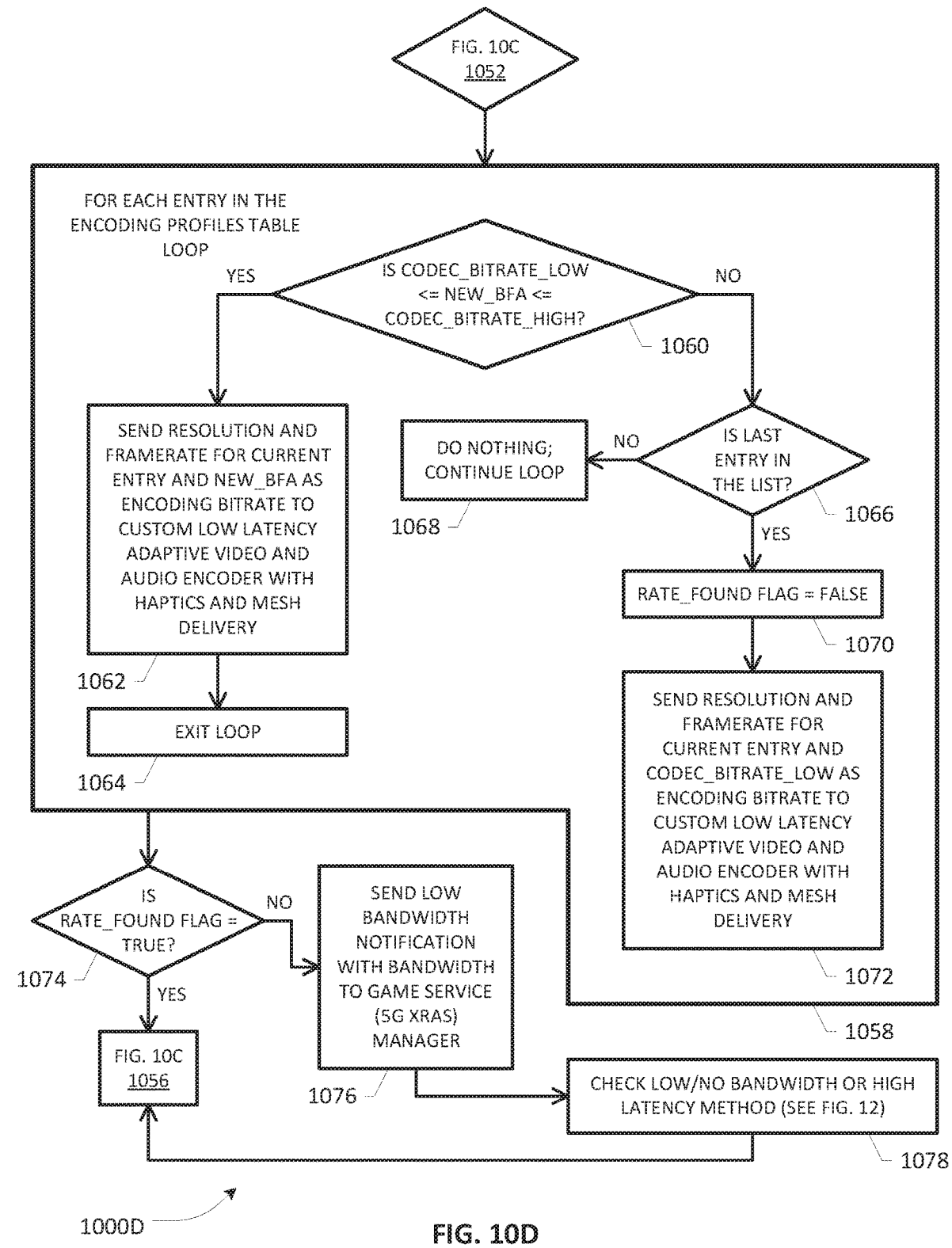

An example multisession remote game render management method 800 for managing a plurality of remote game session instances at an operator's edge data network by an RRS manager is illustrated in FIG. 8. At block 802, example RRS manager receives a game session setup request with respect to a selected game corresponding to a respective session of a plurality of sessions, wherein the setup requests may be generated by and received from one or more RGBO subsystems depending on whether multiple external data networks are involved. As noted previously, a setup request from the RGBO subsystem may include a quality/encoding profile with respect to a game title requested from a game client. Responsive thereto, RRS manager starts a new game service instance corresponding to the respective game session setup request for the selected game title (block 804). As previously described, such game service instances may be referred to as game render subsystems or engines that may be run in respective VMs/containers or in a shared/partitioned VM architecture (e.g., game render/rendering subsystems 410-1 to 410-N shown in FIG. 4, each being a specific or particularized instance of 5GXR AS entity 320 of FIG. 3A). At block 806, RRS manager further instantiates a respective new game service manager that includes various subsystems configured as XR AF entities for facilitating the remote rendering via respective sessions launched at the local edge as described in detail hereinabove with respect to FIGS. 3A-3C and 4.

At block 808, RRS manager transmits, for each game session instance, a session startup request with a session ID for remote rendering and game selection that may include bandwidth/latency and quality profile to the corresponding game service/session manager instantiated as part of the respective game render subsystem. Connection information regarding the game service/session manager and remote render session ID for each respective session instance are provided to the RGBO subsystem(s) via respective session setup responses (block 810). Upon receiving a session startup response for each game session instance (block 812), RRS manager registers with respective game service instances for RESTful API messaging (block 814). A game session state is established with respect to a particular respective session (block 816), wherein gaming content is delivered to the respective game client, which may be maintained until RRS manager receives a session termination message from a particular respective game service manager, as set forth at block 818. When a session termination message is received with respect to a particular game session. RRS manager may propagate a corresponding message including session ID and one or more reason codes, if any to the RGBO subsystem, cease or discontinue the session and terminate the corresponding game session/service instance (i.e., the VM/container instantiated for the requested game title is k deleted, deactivated or de-instantiated). These acts are set forth at blocks 820 and 822.

Table 1 below is a nonlimiting small-scale example of a database of gaming profiles for game titles that may be provided at different locations of a distributed network architecture configured for facilitating multisession remote game rendering. Depending on implementation, game title profiles may be deployed in association with, e.g., global/external network/databases, operator's trusted network/databases, edge network infrastructure elements or nodes, etc. In one arrangement, accordingly, data from such profile databases may be used by or in an RGBO platform to send a set of requirements to the RRS manager for the initial startup of a game session for the selected game title, wherein the game requirements of the session profile with respect to the requested game title may be sent to the instantiated game service/session manger.

TABLE 1

| Resolution | Frame Rate | Games List |
| --- | --- | --- |
| 8k | 120 Hz | Raw Data, Battle Field 10, Call of Duty MW 14, Roller Coaster Battle 3, Mortal Combat 14 |
| 8k | 90 Hz | Raw Data, Battle Field 10, Call of Duty MW 14, Roller Coaster Battle 3, Mortal Combat 14 |
| 8k | 60 Hz | Raw Data, Battle Field 10, Call of Duty MW 14, Roller Coaster Battle 3, Mortal Combat 14 |
| 8k | 30 Hz | Roller Coaster Battle 3, Mortal Combat 14 |
| 4k | 120 Hz | Raw Data, Battle Field 10, Call of Duty MW 14, Roller Coaster Battle 3 |
| 4k | 90 Hz | Raw Data, Battle Field 10, Call of Duty MW 14, Roller Coaster Battle 3 |
| 4k | 60 Hz | Raw Data, Battle Field 10, Call of Duty MW 14, Roller Coaster Battle 3 |
| 4k | 30 Hz | Roller Coaster Battle 3, Mortal Combat 14 |
| 1080p | 120 Hz | Mortal Combat 11, Battle Field 2, Battle Field 1, Call of Duty WWII, Roller Coaster Battle 3, Mortal Combat 14 |
| 1080p | 90 Hz | Mortal Combat 11, Battle Field 2, Battle Field 1, Call of Duty WWII, Roller Coaster Battle 3, Mortal Combat 14 |
| 1080p | 60 Hz | Mortal Combat 11, Battle Field 2, Battle Field 1, Call of Duty WWII, Roller Coaster Battle 3, Mortal Combat 14 |
| 1080p | 30 Hz | Mortal Combat 11, Battle Field 2, Battle Field 1, Call of Duty WWII, Roller Coaster Battle 3, Mortal Combat 14 |
| 720p | 120 Hz | Mortal Combat 11, Battle Field 2, Battle Field 1, Call of Duty WWII |
| 720p | 90 Hz | Mortal Combat 11, Battle Field 2, Battle Field 1, Call of Duty WWII |
| 720p | 60 Hz | Mortal Combat 11, Battle Field 2, Battle Field 1, Call of Duty WWII |
| 720p | 30 Hz | Mortal Combat 11, Battle Field 2, Battle Field 1, Call of Duty WWII |

Table 2 below is a nonlimiting small-scale example of a database of latency limits that may be provisioned with respect to game title requirements. Similar to Table 1, one or more latency databases may be provided at different locations of a distributed network architecture configured for facilitating multisession remote game rendering, e.g., associated with global/external network/databases, operator's trusted network/databases, edge network infrastructure elements or nodes, etc. In one arrangement, accordingly, data from such latency databases may be used by or in an RGBO platform to send a set of requirements to the RRS manager for the initial startup of a game session for the selected game title, wherein the session profile for the game may be sent to sent to the instantiated game service/session manger and on to the associated delivery manager for managing the encoder based on changes in bandwidth as will be described further below.

TABLE 2

| High Latency Limit | Games List |
| --- | --- |
| 10 ms | Raw Data, Battle Field 10, Call of Duty MW 14, Roller Coaster Battle 3, Mortal Combat 10, Mortal Combat 14 |
| 20 ms | Mario Brothers, Mario World 2, Kings Quest 3, Kings Quest 4, Donkey Kong Country, Battle Royal, God of War IV |
| 25 ms | Rainbow Six Siege, Grand Theft Auto V. Fortnite, Minecraft, World of Warcraft |
| 30 ms | Madden NFL, NBA 2K16, Sports Champions, Silent Hunter |
| 40 ms | Flight Simulator 6, Demon Hunter |
| 50 ms | Shadow of Chernobyl, Nier Automata, Horizon Zero Dawn, Wasteland 2 |
| 60 ms | Alpha Protocol, Fallout 2, Mass Effect, System Shock 2 |

FIGS. 9A-9E depict a flowchart of various blocks, steps and/or acts associated with a game service management process 900 comprising flow portions 900A-900E that may be executed as part of a single game session instance for facilitating session startup and gameplay with respect to a client device serviced by an operator network according to an example embodiment. At block 902 of process flow portion 900A of FIG. 9A, example game service manager receives a session startup request with a session ID, game/title selection, bandwidth and latency profile from an RRS manager. At block 904, the game service manager generates a delivery setup request to a delivery manager instantiated as a 5G XR AF as set forth above. At block 906, the game service manager receives a response from the delivery manager with connection information (e.g., address:port information) for receiving controller and headset/pose orientation data and for sending encoded video/audio, mesh and haptics data as well as current bandwidth/latency information. At block 908, the game service manager registers with respect to the delivery manager's callback messages via a RESTful API for low bandwidth and/or high latency notifications corresponding to the particular session managed by the game service manager. At block 910, the game service manager transmits a session startup response with session ID to the RRS manager. In one example embodiment, the game service manager waits for a game session setup request with session ID, capability information, profile information, etc. from the client device via an X5 interface, as shown at blocks 912 and 914. Upon receipt of the game session setup request with appropriate pieces of device data, an iterative loop process 916 may be executed for each entry in a game title QoE profile (e.g., as illustrated in one or more example tables set forth herein). In one arrangement, Boolean comparisons may be performed (block 920) for the resolution and frame rate parameters associated with each entry of the profile table, whereby non-matching entries are removed (block 922). In other words, for example, if a game title QoE profile includes a resolution that is not equal to or within the device resolution capability, that resolution version of the game title may be removed. A filtered list of remaining profile entries may therefore be obtained (block 924) upon completion of the loop process 916.

At block 926, the game service manager sends a QoS request with filtered profile entries as well as device codec capabilities to the delivery manager instantiated for the particular current session. At block 928, the game service manager receives a QoS response with the bandwidth/latency from the instantiated delivery manager. Respective determinations regarding bandwidth being low and/or latency being high may be made based on corresponding notifications from the delivery manager as exemplified at blocks 932 and 930. If either condition is valid, appropriate notifications indicating a low bandwidth and/or a high latency may be provided to the client device via an X5 interface, as illustrated at blocks 934 and 936, respectively. A configurable waiting period, e.g., a timer for a predetermined amount of time, may be set (block 938) until a continue game session is received (block 942) or the timer has expired (block 944). In one embodiment, if the timer has expired, a session termination message including a reason code (e.g., timeout exit) may be generated by the game session manager as set forth at block 946, whereupon the process may exit without starting a game session. On the other hand, if a continue game session message is received with a response to continue to start the game is received from the client device (blocks 942, 948), the game service manager sends a corresponding session continue message with a reason code (indicating QoE/QoS) to the RRS manager (block 952) to commence the game session. The game service manager also sends the continue session response to the delivery manager (block 954). If the response is to not continue the game, a session termination message with QoE/QoS-based reason code may be generated by the game service manager to the RRS manager, whereupon the process may exit without starting the game session (block 950).

If either of low bandwidth or high latency notifications was not received at blocks 932, 930, respectively, or if a continue session response has been received and communicated to the delivery manager (block 954), the process may flow to block 956 wherein the game session manager starts a game engine with respect to the selected game title. At block 958, the game service manager sends a session setup response to the client device with the connection information (e.g., address:port information) for receiving controller and headset/pose data and sending encoded video/audio, mesh and haptics data, current bandwidth and latency. Based thereon, the game session is established to begin the delivery of the game content data and receipt of the player/controller input, as set forth at block 960. In one arrangement, the game session state/status may continue to be monitored after the game session is established to check if any session termination message is received, e.g., due to a normal exit by the user/player, which causes appropriate messaging (including reason codes, if any) to be propagated between the game service manager and the RRS manager, as set forth at block 962 and 964. In similar fashion, the game session state/status may also be monitored with respect to any KPI-related notifications relating to the network and/or the client gaming equipment/environment, e.g., no or low bandwidth conditions, high latency conditions, as exemplified at blocks 966, 968. If a KPI-related notification is received from the delivery manager, the instantiated game engine may be paused, with corresponding notifications made to the client device, as set forth at blocks 970/974 and 972/9760 respectively.

In one example embodiment, a waiting process based on a configurable timer mechanism may be executed similar to the process commencing at blocks 938 and 940 described above, whose description is applicable here with respect to blocks 978-994. Accordingly, the game service manager process may terminate or continue to be executed with appropriate reason codes as noted previously.

Table 3 below is a nonlimiting example of an encoding bitrate range table that may be used by a delivery manager process based on game render resolutions and frame rates. By way of illustration, Table 3 exemplifies two codecs, namely. HEVC and VVC, although it should be apparent that other codecs, including legacy codecs such as h.264, current codecs such as VP9 as well as future codecs can also be supported in additional or alternative embodiments.

TABLE 3

| Resolution | Frame Rate | HEVC Bitrate Low Mbs | HEVC Bitrate High Mbs | VVC Bitrate Low Mbs | VVC Bitrate High Mbs |
|---|---|---|---|---|---|
| 8k | 120 Hz | 230 | 270 | 115 | 135 |
| 8k | 90 Hz | 180 | 230 | 90 | 115 |
| 8k | 60 Hz | 145 | 180 | 72.5 | 90 |
| 8k | 30 Hz | 115 | 145 | 57.5 | 72.5 |
| 4k | 120 Hz | 120 | 150 | 63 | 78.5 |
| 4k | 90 Hz | 90 | 120 | 47.25 | 63 |
| 4k | 60 Hz | 55 | 90 | 28.8 | 47.25 |
| 4k | 30 Hz | 35 | 55 | 18.375 | 28 |
| 1080p | 120 Hz | 60 | 75 | 33 | 41.25 |
| 1080p | 90 Hz | 35 | 60 | 19.25 | 33 |
| 1080p | 60 Hz | 16 | 35 | 8.8 | 19.25 |
| 1080p | 30 Hz | 8 | 16 | 4.4 | 8.8 |
| 720p | 120 Hz | 13 | 16 | 7.8 | 9.6 |
| 720p | 90 Hz | 10 | 13 | 6 | 7.8 |
| 720p | 60 Hz | 7 | 10 | 4.2 | 6 |
| 720p | 30 Hz | 4 | 7 | 2.4 | 4.2 |

Table 4 below is a nonlimiting example of a list of tier assignments that may be used by a delivery manager process based on a delivery bitrate as may be defined in an example encoding profile table using the highest bitrate encoding required by the QoE for the selected game in an example embodiment. In one arrangement, the tiers may be based on the game title and its defined QoE profiles for different resolutions and frame rates, client device/decode capabilities such as codec support, screen resolution and refresh rate, etc. In general, the higher the tier, the more bandwidth may be allocated to a session using example bandwidth allocation embodiments that will be set forth further below.

TABLE 4

| Bitrate, Mbs | Tier |
|---|---|
| 180 | 5 |
| 120 | 4 |
| 80 | 3 |
| 36 | 2 |
| 2.4 | 1 |

Turning to FIGS. 10A-10D, depicted therein a flowchart of various blocks, steps and/or acts associated with a delivery manager/management process 1000 comprising flow portions 1000A-1000D that may be executed as part of a game session instance for facilitating delivery setup and gameplay with respect to a client device serviced by an operator network according to an example embodiment. At block 1002, example delivery manager, instantiated to operate as a 5G XR AF entity in one arrangement, receives a delivery setup request including a session profile from a game service manager operative with respect to a particular session corresponding to the client device. At block 1004, the delivery manager generates a connection setup request to a multisession game slice (MGS) bandwidth manager disposed as part of the operator network infrastructure for managing the dedicated bandwidth of a slice provisioned for remote gaming services, wherein the connection request includes the session profile. Responsive thereto, the delivery manager receives a connection setup response including bandwidth and latency information from the MGS bandwidth manager (block 1005). In one arrangement, the delivery manager may register with appropriate edge network entities (e.g., the MGS bandwidth manager) for receiving RESTful API messages (e.g., callback messages) with respect to any KPI-bases notifications such as bandwidth/latency change notifications (block 1006). The delivery manager returns a delivery setup response to the game service manager with connection information for receiving headset/pose orientation and associated game controller data as well as connection information for sending encoded game content video/audio and haptics and mesh data (block 1008). Thereafter, the delivery manager may wait for a configurable period of time to receive from the game service manager a QoS request with session profile data (e.g., resolution data, frame rate data, latency profile data, etc.) as well as client device capabilities and available codecs, as set forth at blocks 1010 and 1012.

At block 1014, responsive to receiving the QoS request, a determination process for various session parametrics may be made, e.g., with respect to a bandwidth ceiling or cap, a bandwidth floor, and a session tier or a rank (which may be policy-based relative to a weight or priority level related to a bandwidth limit or bitrate encoding required for the requested QoE in some embodiments), etc. An example parametric determination process will be set forth in additional detail further below in reference to FIG. 11. At block 1016, the delivery manager generates a QoS request with session tier, ceiling and floor information to the MGS bandwidth manager. Responsive thereto, the delivery manager receives a QoS response with bandwidth/latency data from the MGS bandwidth manager (block 1018). At block 1020, a limit checking process with respect to the bandwidth and/or latency may be executed, which will be further described below in reference to FIG. 12.

At block 1022, the delivery manager sends a QoS response including the bandwidth/latency data received from the MGS bandwidth manager to the game service manager, whereupon the game session with the client device is commenced with respect to the requested game content (block 1024). At block 1016, the delivery manager receives haptics bitrate and mesh data bitrate from a custom low latency adaptive V/A encoder with haptics and mesh delivery module instantiated as part of the game service instance as described previously. At block 1028, a bitrate for audio (BFA) parameter may be determined as a difference between a network-reported bandwidth and a sum of haptics bitrate and mesh data bitrate. At block 1030, the delivery manager monitors for bandwidth/latency notifications on registered API callbacks from the network entities. Depending on which notification(s) is/are received and/or in what sequence, separate sub-processes may take place in substantially sequential and/or substantially parallel manner. Responsive to determining that a latency notification is received (block 1034), a further determination may be made if the latency is above an upper threshold (block 1036). If so, a latency change notification may be made to the game service manager (block 1040). Following reporting of the latency change notification to the game service manager, or after determining that the latency is not above the threshold, process flow proceeds to block 1044 where the reported latency is transmitted to an adaptive projection (re)mapping module instantiated as part of the current game service instance. Thereafter, the process flow returns to block 1030 wherein the delivery manager continues to monitor for bandwidth/latency notifications.

Responsive to determining that a bandwidth notification is received (block 1032), a new BFA value is determined at block 1038 as a difference between the new network-reported bitrate and a sum of haptics bitrate and mesh data bitrate. Upper and lower threshold limits are checked for the difference between the new BFA (determined at block 1038) and the previous BFA (determined at block 1028), as exemplified at blocks 1042 and 1046 that illustrate an upper limit of 128 Kbs and a lower limit of 32 Kbs, respectively, that ensure a certain quality of audio is maintained for the current game session in one example embodiment. If the difference between the new BFA and the previous BFA is within a preconfigured range as determined by blocks 1042, 1046, the new BFA is transmitted to the custom low latency adaptive V/A encoder with haptics and mesh delivery module to be used as the audio encoding rate (block 1050), whereupon the BFA value is reset with the new BFA (block 1056) and the process flow returns to block 1030 for continued monitoring by the delivery manager.

When either of the threshold conditions of blocks 1042, 1046 is not met, a bitrate-based flag is set true (block 1048). Thereafter, a codec bitrate limit (e.g., a high threshold) set forth for the session encoding profile entries is checked against the new BFA (block 1052). If there is a entry with the codec bitrate limit greater than the new BFA (e.g., the first entry satisfying this condition), the resolution and frame rate associated with that entry as well as the codec bitrate high limit set as the encoding bitrate are sent to the custom low latency adaptive V/A encoder with haptics and mesh delivery module (block 1054). At block 1056, the BFA value is reset with the new BFA and the process flow returns to block 1030 for continued monitoring by the delivery manager.

If there is no profile entry satisfying the condition at block 1052 is found, an iterative loop 1058 may be executed for the entries of the encoding profile table. At block 1060, a determination is made if the new BFA is between a low value and a high value set forth for the codec bitrate of a particular profile entry. If so, the resolution and frame rate associated with that particular entry as well as the new BFA as the encoding bitrate are sent to the custom low latency adaptive V/A encoder with haptics and mesh delivery module (block 1062) and the loop is exited (block 1064). If the new BFA is not between a low value and a high value of the codec bitrates of the entries of the encoding profile table and if the entry is not the last entry of the profile, as determined by blocks 1060 and 1066, no further processing is done with respect to the entry and the loop may continue (block 1068). If the last entry is reached (block 1066) and no entry has been found having a codec bitrate range that satisfies the conditionality against the new BFA (at block 1060), bitrate-based flag is set false (block 1070). At block 1072, the resolution and frame rate associated with the current entry as well as the codec bitrate low limit set as the encoding bitrate are sent to the custom low latency adaptive V/A encoder with haptics and mesh delivery module.

Upon exiting loop 1058, a determination is made whether the bitrate-based flag is still true (block 1074). If so, the BFA is reset at block 1056 and the process flow returns to block 1030 for further monitoring of change notifications by the delivery manager. Otherwise, a low bandwidth notification is provided to the game service manager (block 1076), which may be followed by a limit checking process with respect to the bandwidth and/or latency may be executed (similar to block 1020 described above).

In an example embodiment of the foregoing process, HEVC encoding or VVC encoding may be provided for supporting various frame rates (e.g., frame rates of up to 300 frames per second (fps)), resolutions (e.g., up to 8142×4320 pixels or more), and frame refresh rates of up to 120 Hz. Further, an example embodiment may implement a BFA threshold range between 32 Kbs and 128 Kbs in an arrangement based on High Efficiency Advanced Audio Coding (HE-AAC). Skilled artisans will recognize that additional video/audio encoding schemes with different parameters may be used in additional or alternative embodiments.

Figure 11:
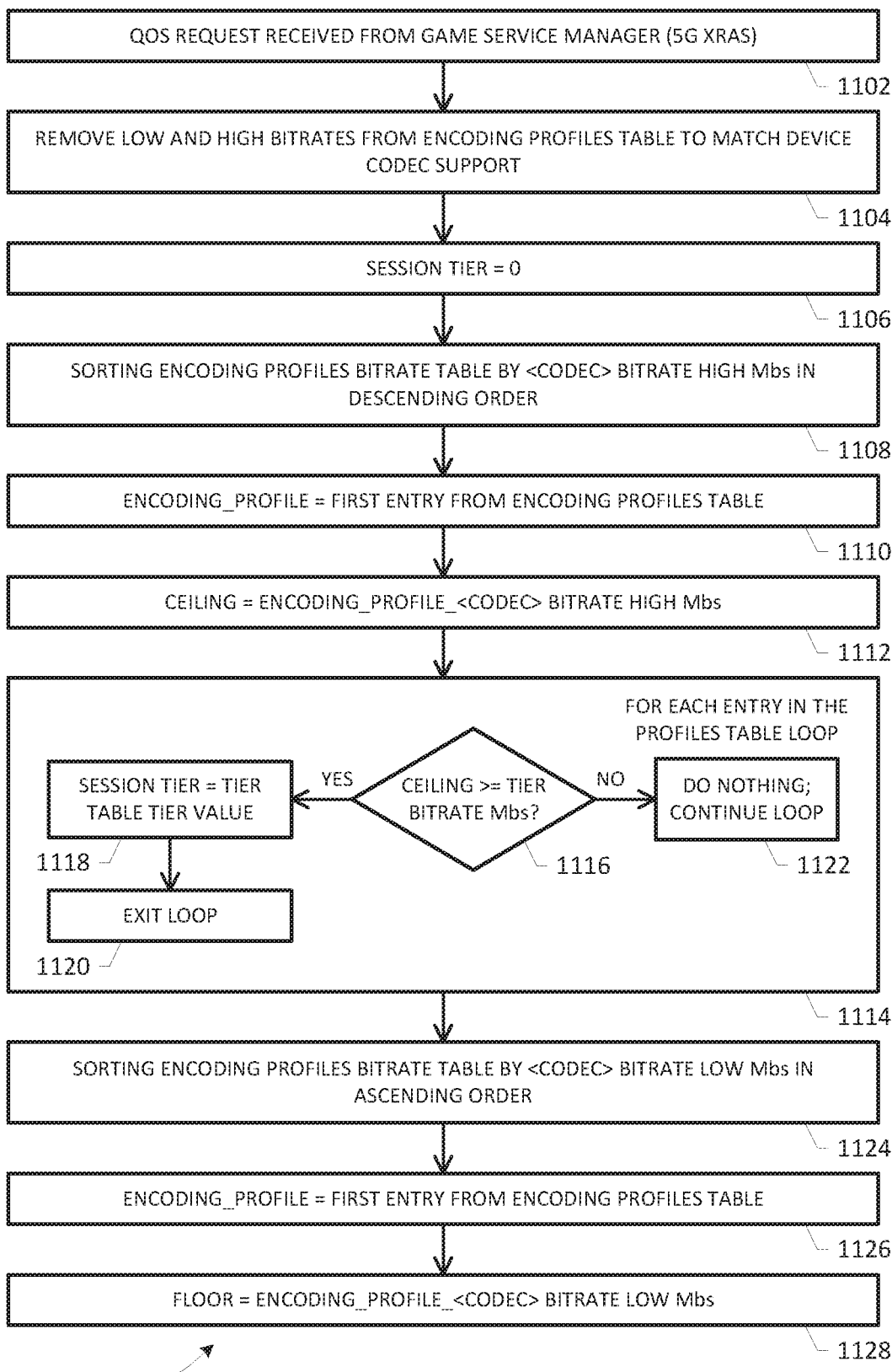
FIG. 11 depicts a flowchart of various blocks, steps and/or acts associated with a process for determining and providing delivery parametrics associated with a game session to multisession game slice bandwidth manager disposed at an operator edge network according to an example embodiment.

FIG. 11 depicts a flowchart of various blocks, steps and/or acts associated with a process 1100 for determining and providing delivery parametrics associated with a game session to an MGS bandwidth manager with respect to a bandwidth allocation scheme according to an example embodiment. At block 1102, a QoS request is received from the game service manager as noted previously. At block 1104, low and high bitrates may be removed from an encoding profile bitrate table associated with the requested game title, for example, in order to match and/or support the device codec capabilities. At block 1106, a session tier is initialized to an initial value, e.g., 0. At block 1108, the encoding profile bitrate table may be sorted in a descending order based on the bitrates. At block 1110, a first encoding_profile parameter is set to a first entry from the descend-sorted encoding profile bitrate table. At block 1112, a ceiling parameter is set based on the codec's high bitrate value. For each entry in the profile bitrate table, a loop process 1114 is executed, which commences by determining if the ceiling parameter is greater than or equal to the tier bitrate (block 1116). If the ceiling is not greater than or equal to the tier bitrate, the loop may continue (block 1122). Otherwise, session tier is set to a tier value from the table's tier value (block 1118). The iterative loop 1114 may continue until it is exited (block 1120). At block 1124, the encoding profile bitrate table is sorted in an ascending order based on the codec's low bitrates. At block 1126, a second encoding_profile parameter is set to a first entry from the ascend-sorted encoding profile bitrate table. At block 1128, a floor parameter is set based on the codec's low bitrate value. As described above with respect to the flowchart of FIGS. 10A-10D, the delivery manager is operative to send the session tier, ceiling and floor bitrate/bandwidth parameters to the MGS bandwidth manager determined in accordance herewith.

Figure 12:
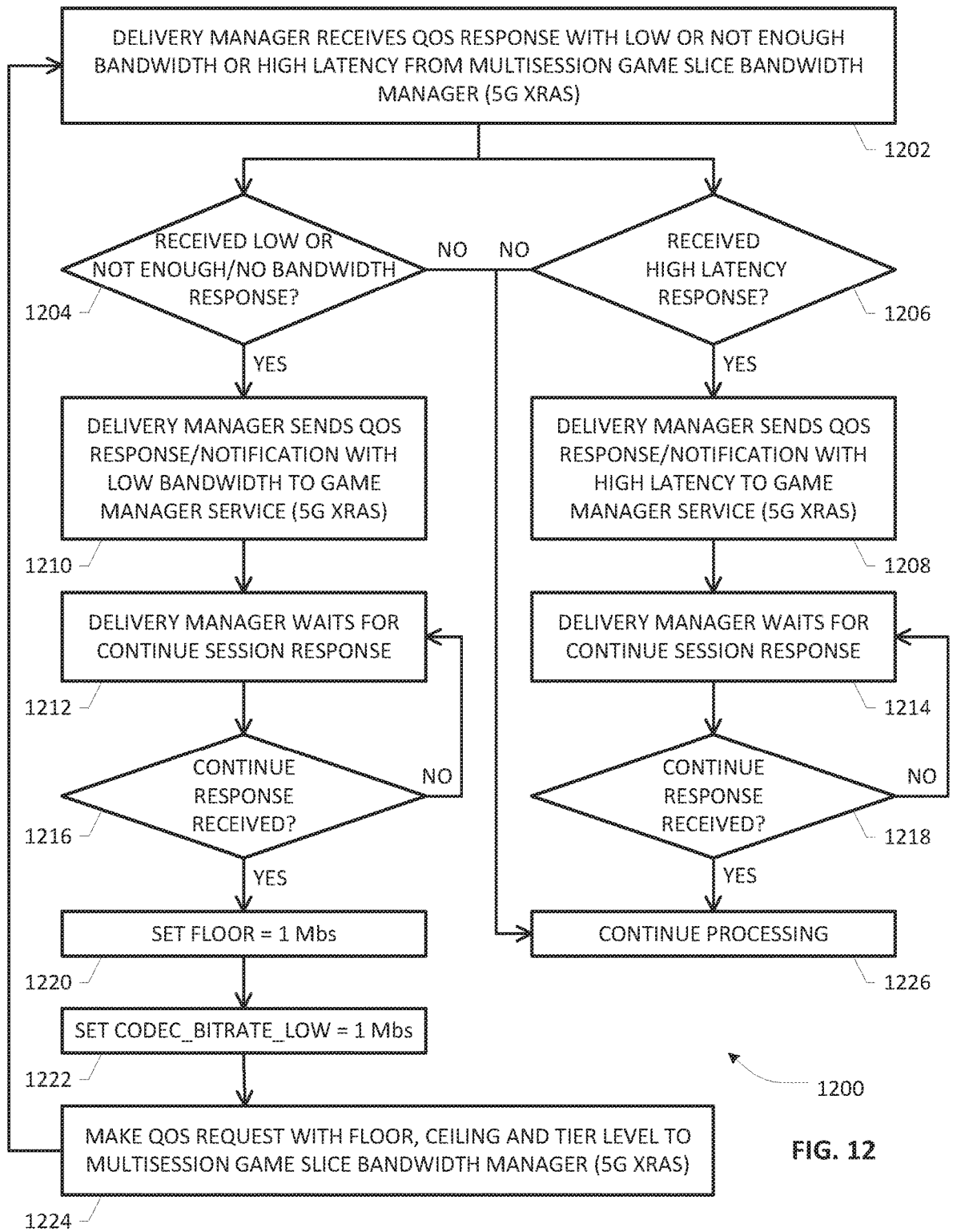
FIG. 12 depicts a flowchart of various blocks, steps and/or acts associated with a process for determining low bandwidth or high latency in delivery management according to an example embodiment.

FIG. 12 depicts a flowchart of various blocks, steps and/or acts associated with a limit checking process 1200 with respect to the bandwidth and/or latency that may be used in an embodiment of the delivery management process described above. In one implementation, example process 1200 may be configured to handle the reporting of low or no bandwidth as well as high latency. Example process 1200 may wait for a response from a game service manager to continue or not in some arrangements. In a scenario of continuing a session with a low or no bandwidth condition, an implementation may provide an adjustment for an override where there is insufficient bandwidth by reducing a floor value to a preconfigured value (e.g., a minimum) and the lowest encoding rate for the game session encoding to a value corresponding thereto. Accordingly, in one implementation, the floor may be reduced to approximately 1.0 Mbs and the lowest encoding rate may be set at approximately 1.0 Mbs in such a scenario. At block 1202, the delivery manager receives a QoS response from the MGS bandwidth manager, the QoS response including a low or not enough bandwidth and/or a high latency condition. Depending on when the conditions, and their order, substantially parallel or substantially sequential sub-processes may be executed. At block 1204, a determination is made if the received bandwidth condition is a low or enough bandwidth condition. In similar fashion, at block 1206, a determination is made if the received latency condition is a high latency condition. If either of these conditions is not met, example process 1200 proceeds to a next stage in the delivery management process, as exemplified at block 1226.

If the received bandwidth condition is a low or enough bandwidth condition (block 1204), the delivery manager sends a QoS response with suitable notification to the game service manager (block 1210). Upon receiving a response to continue the session from the game service manager, the bandwidth floor is set to 1.0 Mbs, as exemplified by blocks 1210, 1212, 1216, 1220. At block 1222, the codec_bitrate_low is set to 1.0 Mbs corresponding to the reduced bandwidth floor. A QoS request including the adjusted delivery parametrics may be made to the MGS bandwidth manager (block 1224), whereupon the process flow returns to block 1202.

If the received condition is a high latency condition (block 1206), the delivery manager sends a QoS response with suitable notification to the game service manager (block 1208). Upon receiving a response to continue the session from the game service manager, the process flow proceeds to a next stage in the delivery management process, as exemplified at blocks 1214, 1218, 1226.

As previously described, example embodiments of a multisession remote game rendering application service advantageously involve the instantiation of a custom low latency adaptive video and audio encoder with haptics and mesh delivery subsystem during a virtual environment session that is operative with a dynamic adaptive projection (re)mapping subsystem on a session by session basis. In general, an embodiment of the low latency adaptive video and audio encoder with haptics and mesh delivery subsystem is operative to adapt audio, video, haptics data, and/or mesh data bitrates for delivery during gameplay. In one example implementation of virtualization, a virtualized game engine instance may be running inside the same container/VM as the custom low latency adaptive video and audio encoder with haptics and mesh delivery subsystem along with the adaptive projection (re)mapping subsystem in addition to other subsystems described above in detail. As such, an example implementation of the multisession remote game rendering application service may involve sending and receiving raw uncompressed data via standardized internal interfaces (e.g., 5G XR compliant X1 interfaces) instantiated on the same VM/container as the game engine for the specific gaming instance.

An example embodiment of a gaming client device (e.g., UE/client device 502) may be configured with an XR session handler and associated XR engine as described previously in reference to FIG. 5, wherein the intra-device communications as well as device-to-gaming application service over the network may be effectuated via various 5G XR compliant interfaces. Additional details regarding an example client device method and example methods associated with a custom low latency adaptive video and audio encoder with haptics and mesh delivery subsystem as well as associated adaptive projection (re)mapping subsystem may be found in the commonly-owned "Optimized Game Rendering" patent application, incorporated by reference hereinabove, which may be equally applied to the embodiments herein, mutatis mutandis.

Figure 13:
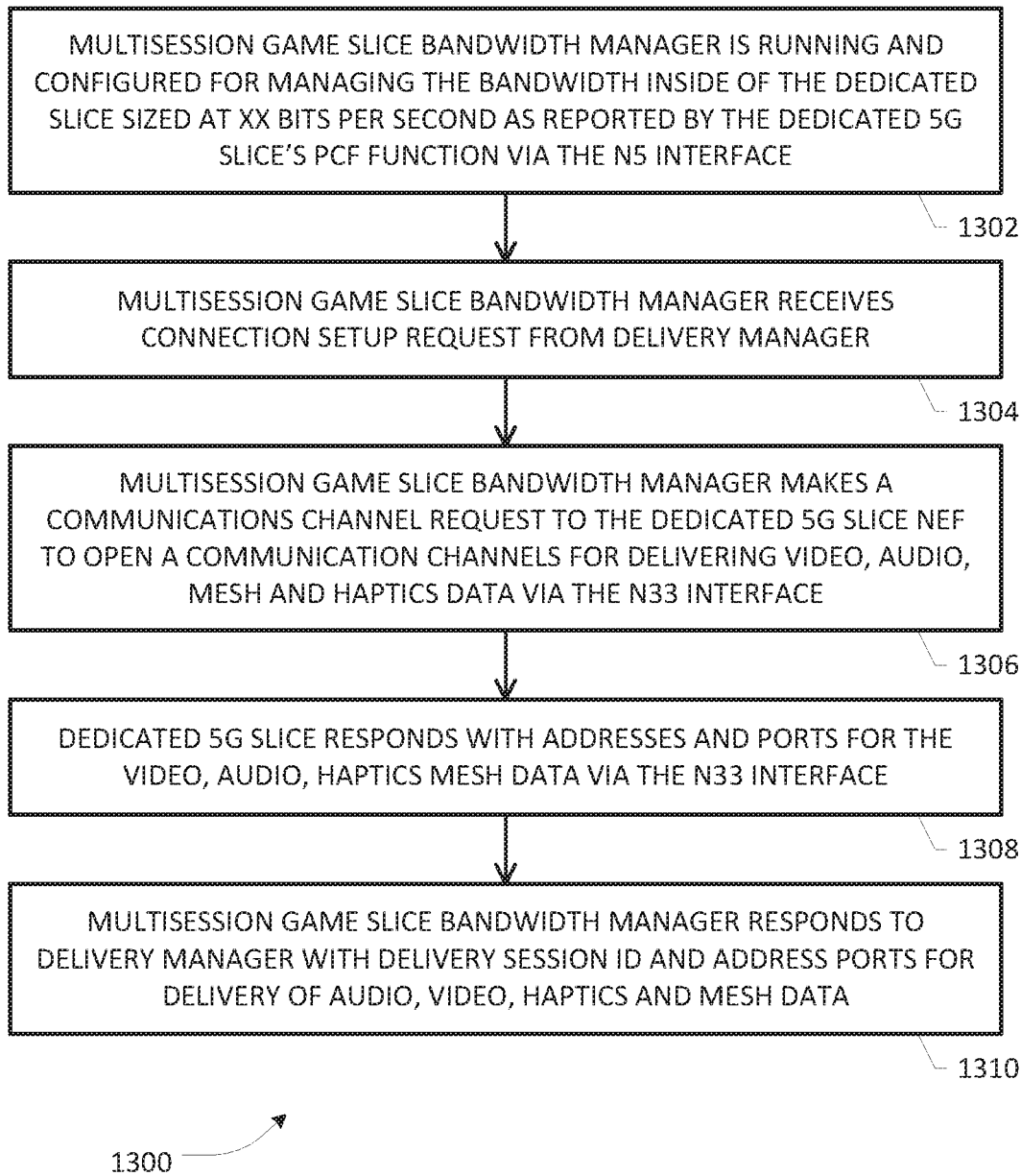
FIG. 13 depicts a flowchart of various blocks, steps and/or acts associated with a multisession game slice bandwidth management process for facilitating game session setup according to an example embodiment.

Example processes and methods relating to a multisession game slice bandwidth management system operative at an operator edge network for facilitating game session setup and slice bandwidth allocation are set forth immediately below, wherein one or more flowcharts having various blocks, steps and/or acts may be (re)combined in one or more arrangements with or without additional flowcharts of the present disclosure according to some embodiments. Turning to FIG. 13, a delivery setup method 1300 is illustrated that may be executed by an MGS bandwidth manager (e.g., MGS bandwidth manager 340 of FIGS. 3A-3C and FIG. 4) for establishing a new game delivery session inside a dedicated network slice associated with or provisioned for a multisession game rendering application service at an operator network. At block 1302, example MGS bandwidth manager is operative and configured for managing the bandwidth of a dedicated network slice (e.g., XX Mbs, YY Gbs, etc.), as reported by the network slice's PCF entity (e.g., via the N5 interface in a 5G-based implementation). At block 1304. MGS bandwidth manager receives a connection setup request from a delivery manager instantiated for facilitating delivery of gaming content pursuant to commencing/establishing a new remote game rendering session for a gaming client as described previously. At block 1306, MGS bandwidth manager generates a communication channel request to the network slice's NEF entity via the N33 interface to open communication channels for delivering video, audio, mesh and haptics data. At block 1308, the network slice responds with, and MGS bandwidth manager receives, addresses and ports for the video, audio, mesh and haptics data. At block 1310, example MGS bandwidth manager generates a response to the instantiated delivery manager with a delivery session ID as well as address:ports data for establishing network pathways and facilitating transport of the gaming content to the gaming client.

Figure 14A:
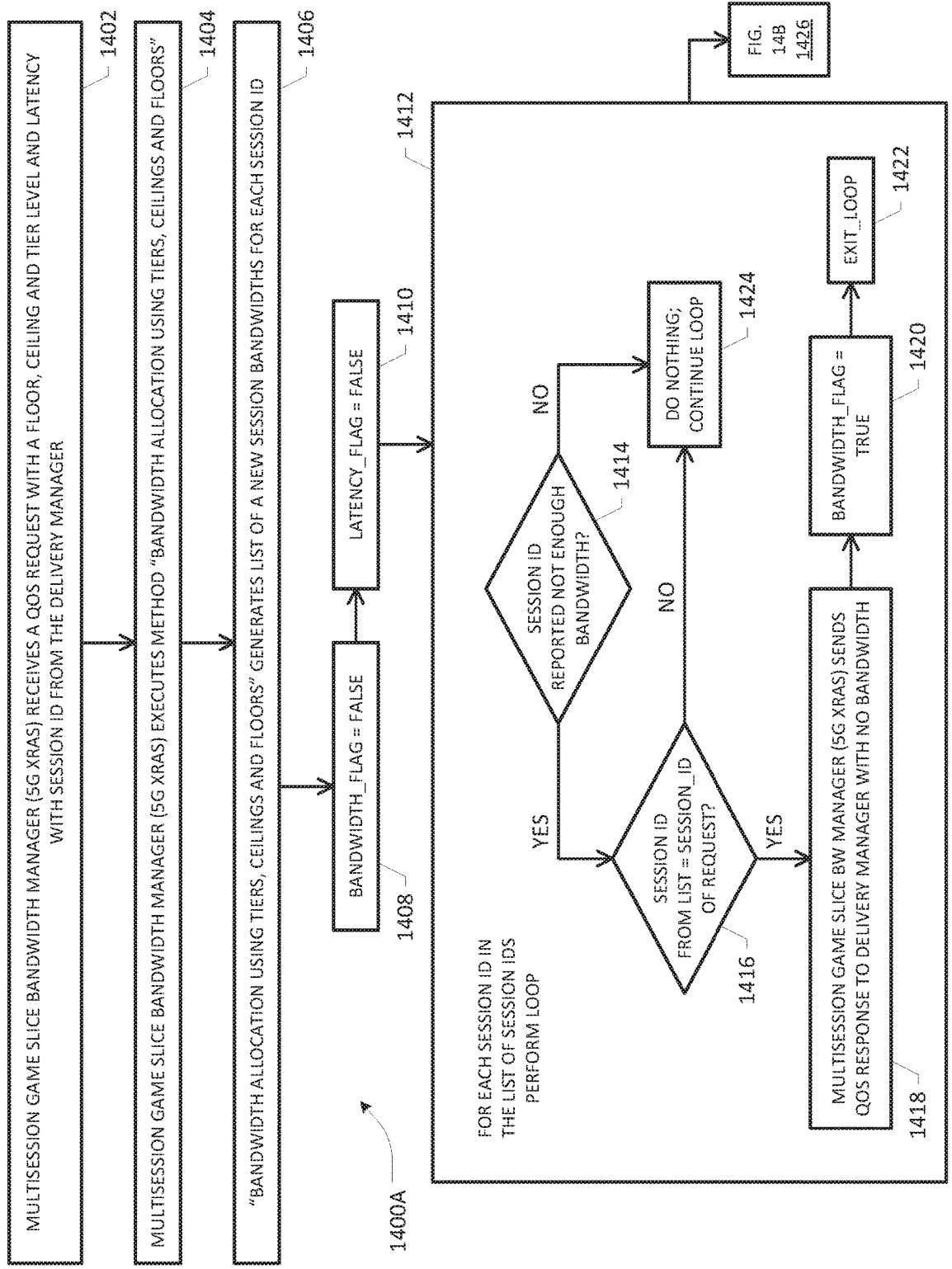
FIGS. 14A-14B depict a flowchart of various blocks, steps and/or acts associated with a QoS request process operative in multisession game slice bandwidth management according to an example embodiment.
Figure 14B:
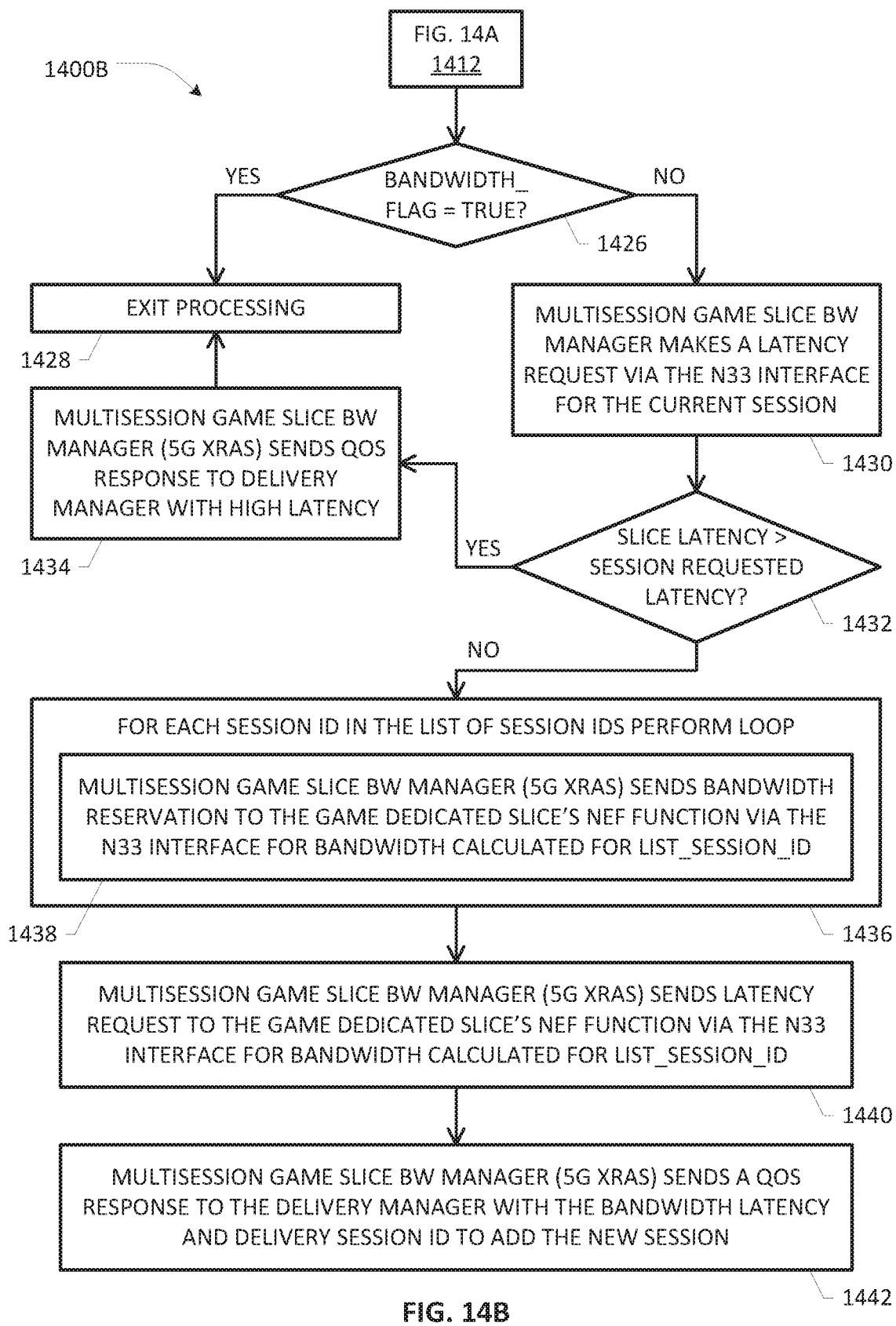

FIGS. 14A-14B depict a flowchart of various blocks, steps and/or acts associated with a QoS request process 1400, comprising flow portions 1400A-1400B, operative pursuant to or as part of an overall multisession game slice bandwidth management scheme, wherein a new game session may be added according to some embodiments of the present patent disclosure. Flow portion 1400A commences with example MGS bandwidth manager receiving a QoS request from the instantiated delivery manager for a session having a session ID, wherein the QoS request may include various delivery/quality parametrics, e.g., floor, ceiling and tier/rank, as well as latency, associated with the session ID, as set forth at block 1402. A bandwidth allocation process using tiers, ceilings and floors may be executed as a sub-process (block 1404), which will be described further below, for generating a list of sessions identifying new bandwidths for each session ID, including the new session, as set forth at block 1406. At blocks 1408, 14018, flags relating to quality parameters may be initialized, e.g., a bandwidth_flag is set to false and a latency_flag is set to false, respectively. An iterative loop 1412 may be executed with respect to the session IDs in the list of sessions, commencing with a determination as to whether a session ID does not have enough bandwidth (which may be indicated by a floor violation, policy violation, etc.), as exemplified at block 1414. If there is no bandwidth violation (i.e., there is sufficient bandwidth), the loop process continues (block 1424). Otherwise, a further determination may be made whether the session ID is the requested session's ID (block

1416). If so, there is not enough bandwidth for the requested session ID, and the MGS bandwidth manager generates a QoS response to the instantiated delivery manager indicating that there is no bandwidth (block 1418). Thereafter, the bandwidth_flag is set to true (block 1420). The foregoing acts may continue until the loop is exited (block 1422).

Upon exiting loop 1412, a determination may be made if the bandwidth_flag is true, i.e., there has been a determination of a bandwidth violation (block 1426). If there is no bandwidth violation, the MGS bandwidth manager generates a latency request via the N33 interface for the current session (block 1430). If the slice latency is not greater than the session's requested latency (block 1432), it means that the requested QoS for the game session can be met and the MGS bandwidth manager sends a bandwidth reservation for each respective session in the list of sessions to the dedicated network slice's NEF entity via the N33 interface, wherein the bandwidth reservation is the bandwidth calculated for the session IDs of the list, as set forth at block 1438 as part of loop 1436. The MGS bandwidth manager also sends a latency request to the dedicated network slice's NEF entity via the N33 interface, wherein the latency request is for satisfying the bandwidth calculated for the requesting session ID (block 1440). Thereafter, the MGS bandwidth manager sends a QoS response to the instantiated delivery manager corresponding to the new/requesting session, wherein the response includes the bandwidth and latency along with the delivery session ID therefor (block 1442), whereby the new session is added to the managed list of sessions.

If the bandwidth_flag is true at block 1426, process 1400 may be exited (block 1428), which may indicate that the requested session may not be added, subject to further determinations based on policy rules in some allocation processes as will be set forth below. In similar fashion, if the slice latency is greater than the requested session's latency requirement (as determined at block 1432), the MGS bandwidth manager may send a QoS response to the delivery manager with a high latency indication (block 1434), whereupon the process may be exited subject to further determinations (block 1428).

Figure 15:
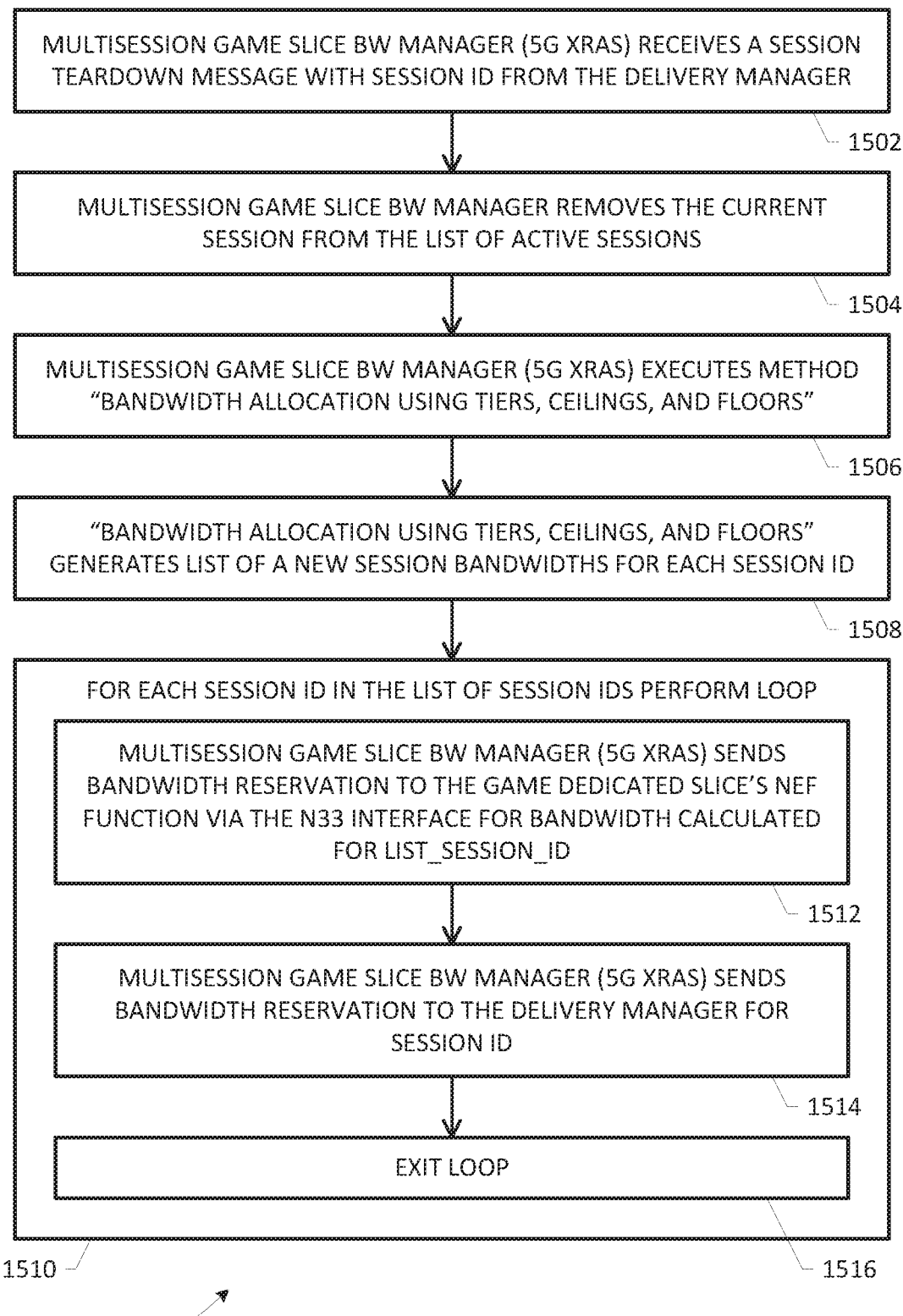
FIG. 15 depicts a flowchart of various blocks, steps and/or acts associated with a session teardown process according to an example embodiment.

FIG. 15 is a flowchart of an example session teardown process 1500 for a gaming delivery session according to an embodiment of the present patent disclosure. In one arrangement, process 1500 may include a method for reallocating bandwidth upon tearing down a current gaming session, which will be described further below. At block 1502, example MGS bandwidth manager receives a session teardown message with a session ID from the instantiated delivery manager that has been established for a current remote gaming session. At block 1504, MGS bandwidth manager removes the identified session (i.e., the current session having the session ID) from the list of active sessions. At block 1506, MGS bandwidth manager is operative to execute a bandwidth (re)allocation process using tiers, ceilings and floors, similar to the bandwidth allocation process referenced hereinabove with respect to FIGS. 14A-14C at blocks 1404, 1406. At block 1508, the bandwidth (re)allocation process generates/obtains and returns a list of new bandwidths for the remaining sessions. An iterative loop process 1510 is executed for each entry of the list of remaining sessions. At block 1512, the MGS bandwidth manager generates a bandwidth reservation request to the dedicated network slice's NEF entity via the N33 interface for the bandwidth calculated for each respective session. At block 1514, a bandwidth notification with the reserved bandwidth is provided to each respective delivery manager managing the delivery of gaming data with respect to the corresponding gaming session. Upon completion of the bandwidth reservation and notification for all remaining sessions, the iterative loop is exited (block 1516).

Figure 16:
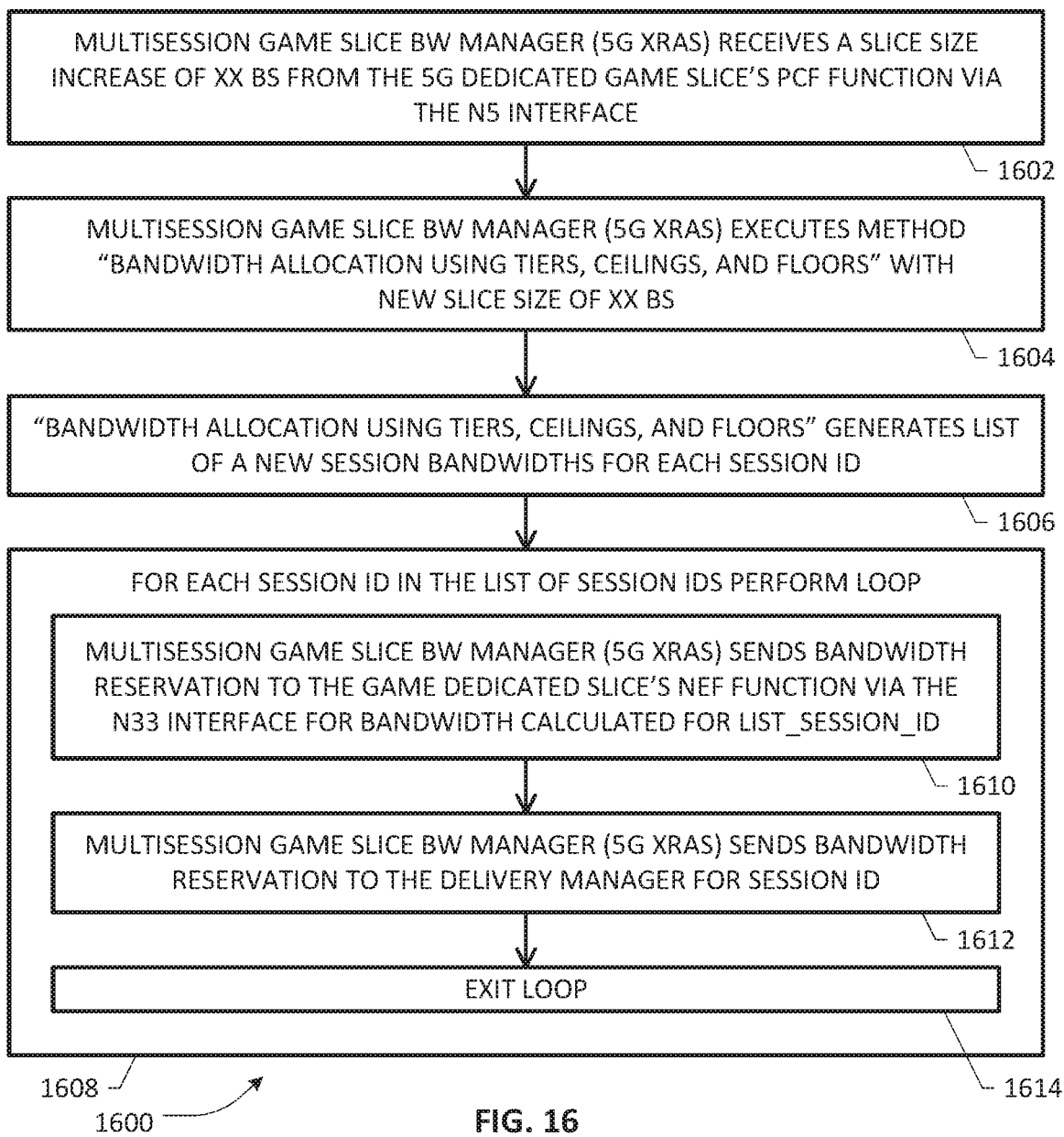
FIG. 16 depicts a flowchart of various blocks, steps and/or acts associated with a slice size increment and notification process operative in multisession game slice bandwidth management according to an example embodiment.

In an example implementation of a multisession remote gaming/rendering application service, the bandwidth of a dedicated network slice may be dynamically adjusted, which may impact bandwidth allocations for ongoing sessions, thereby affecting the overall QoE/QoS of respective gameplays. An example network slice size increase method 1600 is illustrated in FIG. 16, which may commence with an MGS bandwidth manager receiving a slice size increase notification from the dedicated network slice's PCF entity via the N5 interface. At block 1604, the MGS bandwidth manager is operative to execute a bandwidth (re)allocation process using tiers, ceilings and floors, similar to the bandwidth allocation process referenced elsewhere in this patent application. At block 1606, the bandwidth (re)allocation process generates and returns a list of new bandwidths for the ongoing sessions. An iterative loop process 1608 is executed for each entry of the list of sessions. At block 1610, the MGS bandwidth manager generates a bandwidth reservation request to the dedicated network slice's NEF entity via the N33 interface for the bandwidth calculated for each respective session. At block 1612, a bandwidth notification with the reserved bandwidth is provided to each respective delivery manager managing the delivery of gaming data with respect to the corresponding gaming session. Upon completion of the bandwidth reservation and notification for all the sessions in the list, the iterative loop is exited (block 1614).

Figure 17:
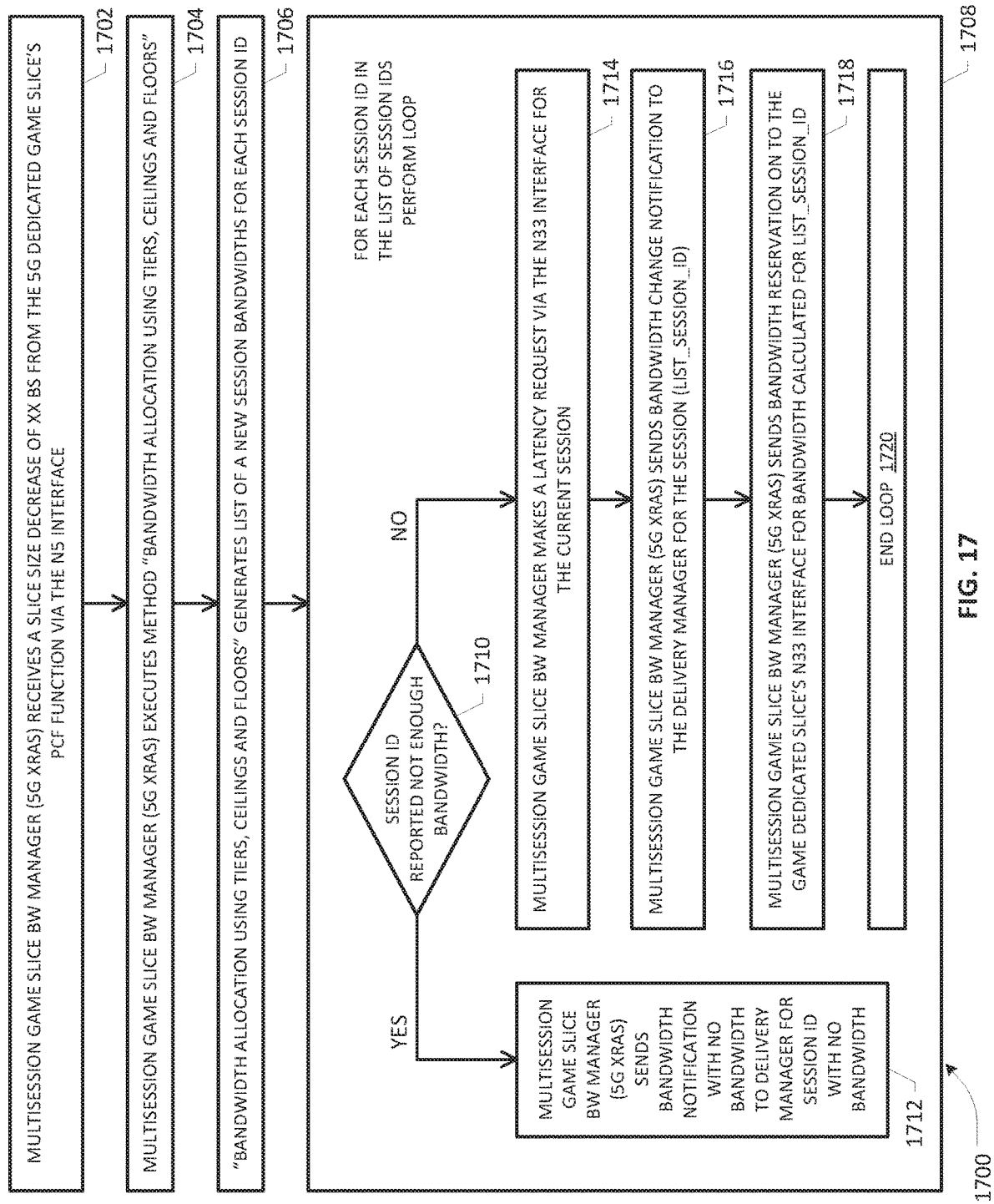
FIG. 17 depicts a flowchart of various blocks, steps and/or acts associated with a slice size reduction and notification process operative in multisession game slice bandwidth management according to an example embodiment.

In similar fashion, an example implementation of a multisession remote gaming/rendering application service may involve decreasing the bandwidth of a dedicated network slice provisioned for remote gaming in an operator network. An example network slice size decrease method 1700 is illustrated in FIG. 17, which may commence with an MGS bandwidth manager receiving a slice size decrease notification from the dedicated network slice's PCF entity via the N5 interface. Similar to some of the processes set forth above, a bandwidth (re)allocation process using tiers, ceilings and floors may be executed in response thereto, which generates and returns a list of new bandwidths for the ongoing sessions, as exemplified at blocks 1704, 1706. An iterative loop process 1708 is executed for each entry of the list of sessions, which commences with a determination as to whether there is not enough bandwidth for a session (block 1710). If so, the MGS bandwidth manager reports a "no bandwidth" notification to the delivery manager corresponding to that session (block 1712), whereupon the loop continues with the next session of the list. If there is enough bandwidth for a session as calculated by the bandwidth (re)allocation process, a latency request is made by the MGS bandwidth manager 1714 via the N33 session for that session (block 1714). Appropriate bandwidth notification and reservation processes may be executed for that session, as set forth at blocks 1716, 1718, similar to the processes set forth above, involving the delivery manager instantiated for the session and the slice's NEF entity, respectively. Upon completion of the bandwidth reservation and notification for all the sessions in the list, the iterative loop is exited (block 1720).

Figure 18:
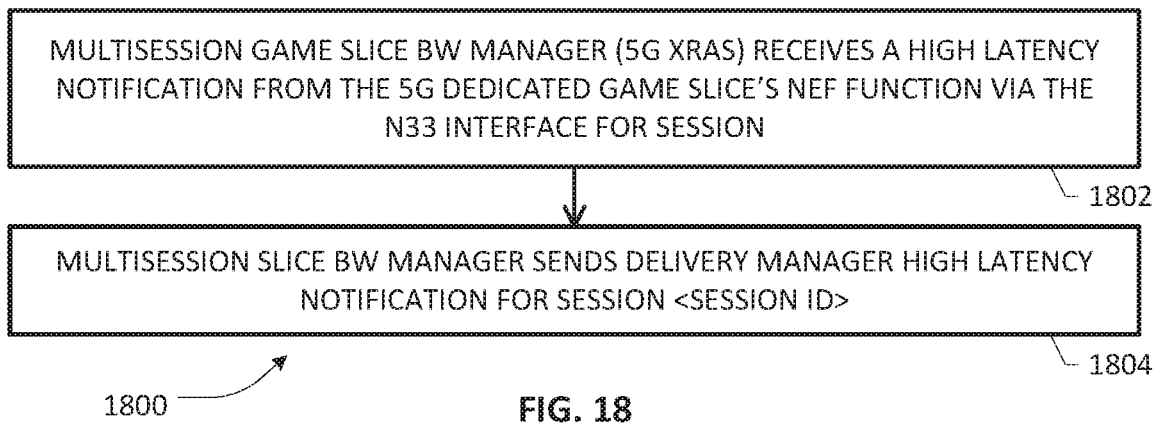
FIG. 18 depicts a flowchart of various blocks, steps and/or acts associated with a high latency notification process operative in delivery management according to an example embodiment.

In an example implementation of a multisession remote gaming/rendering application service, a latency notification may be processed relative to ongoing sessions. Example latency notification process 1800 depicted in FIG. 18 may commence with an MGS bandwidth manager receiving a high latency notification from the dedicated network slice's NEF entity via the N33 interface (at block 1802) with respect to a session. Responsive thereto, the MGS bandwidth manager is operative to generate a corresponding high latency notification to the delivery manager managing that session, as set forth at block 1804.

Skilled artisan will recognize that in an example implementation of a multisession remote gaming/rendering application service, bandwidths allocated to multiple gaming sessions may be dynamically changed, adjusted, altered or modified, responsive to various events that may trigger a bandwidth (re)allocation process executed by the MGS bandwidth manager as set forth above. Example triggering events may include, addition of a new session, deletion/termination/teardown of a session, increase or decrease in the dedicated network slice's bandwidth, etc., among others. Set forth below is an example bandwidth allocation (or roughly synonymously (re)allocation) process using tiers, ceilings and floors that may be performed for purposes of some embodiments of the present patent disclosure.

even for a single session/stream. Example bandwidth allocation scenarios set forth further below assume a cap or ceiling with respect to one or more streams being managed according to the teachings herein.

A bandwidth allocation scheme in some embodiments may involve one or more rules, conditions, constraints, etc., which may be changed, modified or altered based on the requirements of an implementation, and may involve heuristic methodologies applicable in some situations. Accordingly, some of the rules, etc., may be ad hoc and policy-based as well as network performance dependent. By way of illustration, an example rule may be that when creating a new game stream, the scheme is not allowed to allocate bandwidth if it causes any stream in the session list to drop below its bandwidth floor, which may be coupled with other rules, contingencies, conditions, etc., as will be seen below. An illustrative session list with three game streams for bandwidth allocation is exemplified below:

| Stream | Tier | Floor Mbs | Cap Mbs | Allocation in 40 Mbs slice | Allocation in 50 Mbs slice | Allocation in 100 Mbs slice | Allocation in 140 Mbs slice | Allocation in 155 Mbs slice |
|---|---|---|---|---|---|---|---|---|
| Session A | 1 | 20 | 50 | 20 | 20 | 20 | 30 | 35 |
| Session B | 2 | 10 | 50 | 10 | 15 | 40 | 50 | 50 |
| Session C | 2 | 10 | 50 | 10 | 15 | 40 | 60 | 70 |

In one example arrangement, when game session requests are generated by respective gaming client devices, one or more server-related processes set forth in detail hereinabove may be executed with respect to generating or determining delivery parametrics such as bandwidth floors, bandwidth ceilings and tiers corresponding to the respective gaming sessions. A filtering process based on the requested game title's encoding profile, device codec capabilities, etc. may be performed to obtain low and high bitrates applicable for a given latency/QoS requirement with respect to a session, whereby a bandwidth floor and a bandwidth ceiling may be established. Based on the bandwidth ceiling, a rank or tier may be established (e.g., based on a table such as Table 4), which assigns tier values to respective ceilings. For instance, if the bandwidth ceiling of a session is 180 Mbs, a high tier value of 5 may be assigned to that session. On the other hand, if the bandwidth ceiling of a session s 2.4 Mbs, a low tier value of 1 may be assigned to that session.

As described previously, an example MGS bandwidth manager is operative to receive, retrieve, otherwise obtain various delivery parametrics with respect to each respective session from the instantiated delivery manager corresponding thereto, e.g., in accordance with an embodiment of process 1100 set forth in FIG. 11. Accordingly, the MGS bandwidth manager is operative in one arrangement to create, populate and/or otherwise maintain a remote game session list, wherein each remote game session may be identified in the remote game session list with a session ID along with its delivery parametrics, such as a bandwidth ceiling, a bandwidth floor and a tier (sometimes also referred to as rank). Whereas a session or stream (sometimes also referred to as a flow) may thus have a tier and a bandwidth floor, the corresponding bandwidth cap or ceiling may be provided as an optional parameter in some example embodiments. It will be noted, however, that not having a ceiling for a session/stream may cause all bandwidth to be allocated, An example allocation scheme or mechanism may begin with assigning each stream a bandwidth that is equal to its respective floor, i.e., $b_i=f_i$, where b=bandwidth and f=floor. If the sum of the bandwidth floors exceeds the slice size, some streams may be "culled" and reevaluated in one example embodiment. Further, in a related embodiment, "culling" may involve generating and reporting low or insufficient bandwidth notifications to respective gaming clients and game session managers and receiving override requests, if any. Still further, a culling process may be based on policy-based disposability rules, e.g., streams with the largest floors are first to be culled upon sorting the streams. In some embodiments, sorting may be based on tiers, floors, etc., as well as any combination thereof, wherein appropriate disposability rules may be enforced for culling. Because of the possibility of override requests from the gaming clients that are notified of low/insufficient bandwidth in the initial assignment, which may keep such streams as potential candidates subject to bandwidth (re)allocation, the terms such as "culling", "culled" and the like do not necessarily mean that streams having low/insufficient bandwidth are deleted from the candidate session list. In addition to override requests, various policy-based rules may also be applied during and/or in association with a culling process depending on which sessions are reported as having low/insufficient bandwidth assignments and/or whether such sessions are ongoing sessions or new sessions to be added. For example, if joining a new session causes one or more other sessions already ongoing to have low/insufficient bandwidth notifications in the foregoing initial assignment process (which may also be referred to as a naive assignment process), that new session may not be allowed to join at all in an example embodiment. In another embodiment, if the new session to be added is the one with a low/insufficient bandwidth notification, an override from the corresponding gaming client device may allow that new session to be included in the potential candidate pool for further processing with respect to bandwidth allocation. Accordingly, it should be appreciated that in some arrangements culling may be performed optionally and/or in a piecemeal fashion based on a combination of rules depending on the particular implementation. Depending on whether culling is implemented, a list of remaining sessions, i.e., candidate sessions, may be obtained, which may be processed in an iterative loop for bandwidth allocation based on an adequacy measurement until all the bandwidth of the dedicated network slice is apportioned accordingly. In one embodiment, therefore, as many passes as necessary may be executed to allocate the remaining bandwidth of the network slice after the culling. An example process may commence with the application of following assignment rules: (i) ignore streams that are assigned their cap/ceiling already; (ii) if all streams have reached their cap/ceiling, then allocation is complete; and (iii) if the sum of the allocations fills the slice, then allocation is complete. For the remaining streams, the bandwidth allocation process calculates the adequacy for each stream $a_i = b_i/r_i$, where $b_i$ is the assigned bandwidth and $r_i$ is the stream's rank. There may be a minimum adequacy value across the streams and it is possible for multiple streams to have the same value of adequacy. This minimum adequacy value may be defined as $a_m = \min\{a_i\}$. A second-minimum adequacy, which is defined as the least adequacy value that is greater than the $a_m$ minimum, may also be determined for the streams. It is possible for several streams to have this second-minimum adequacy, $a_n$, and if all streams have the same adequacy, then the second-minimum adequacy may be defined as infinity in one example implementation.

The remaining bandwidth (x) of the slice may be determined as below:

$$x = \text{slice\_size} - \Sigma a_i$$

For only the streams at minimum adequacy, the process calculates a rank sum parameter as $d = \Sigma r_j$. Also, for only the streams at minimum adequacy, the process attempts to increase each stream's bandwidth to a value $b_j$ as set forth below for the subset of streams (j):

$$b_j = \min\{r_j a_n, b_j + r_j x/d, c_j\}$$

It should be appreciated that the foregoing incremental allocation enforces that a stream's bandwidth never exceeds its cap $c_j$. If there is bandwidth remaining in the slice, the iterative loop of the process may continue for another pass and/or until no more streams can be packed into the slice.

Figure 19:
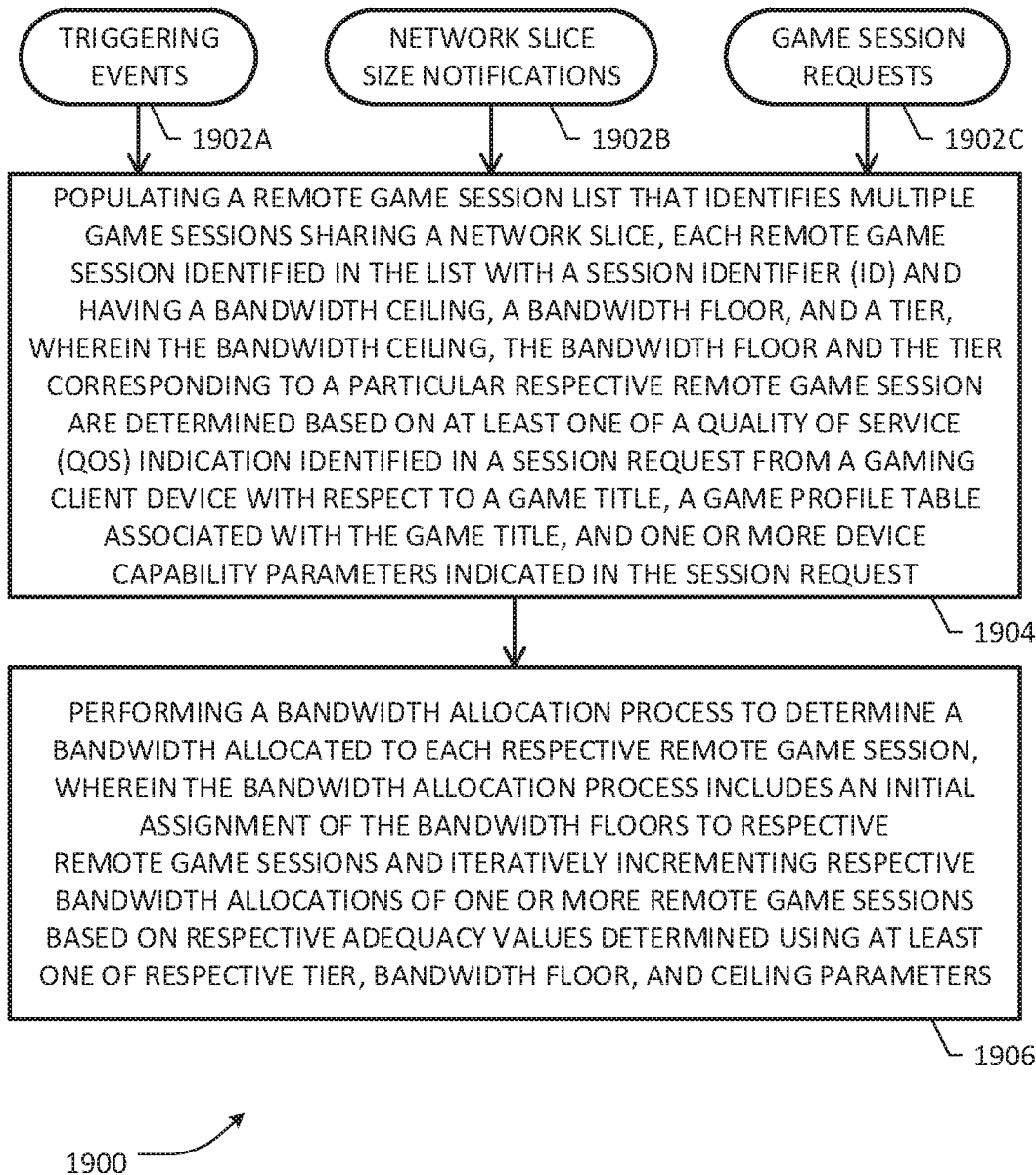
FIG. 19 depicts a flowchart of a bandwidth allocation scheme according to an embodiment of the present patent disclosure.

FIG. 19 depicts a flowchart of a bandwidth allocation scheme 1900 that captures the foregoing steps, acts, functions, etc., which may be (re)combined in one or more arrangements, with additional flowcharts of the present disclosure according to some embodiments. Blocks 1902A-1902C are exemplary of one or more inputs that may be used in the bandwidth allocation scheme 1900 by an MGS bandwidth manager at various stages of a multisession remote game application service depending on when conditions that may relate to one or more overlapping categories such as triggering events 1902A, network slice size notifications 1902B and/or game session requests 1902C are received and processed in an example implementation, wherein any of which may be operative as a triggering input. At block 1904, a remote game session list may be populated that identifies multiple remote game sessions sharing a network slice having a bandwidth size, wherein each remote game session is identified with a session identifier (ID) and includes a set of parameters of a bandwidth ceiling, a bandwidth floor, and a tier. As noted previously, the remote game session list may be dynamically populated and maintained by the MGS bandwidth manager, wherein the bandwidth ceiling, the bandwidth floor, and the tier corresponding to a particular respective remote game session are determined by an instantiated delivery manager based on at least one of a quality of service (QoS) indication identified in a session request from a gaming client device with respect to a game title, a game profile table associated with the game title, and one or more device capability parameters indicated in the session request. At block 1906, a bandwidth allocation process may be executed, e.g., responsive to a triggering event/input (e.g., including a slice size/change notification, a new game session request, a session termination, etc.) to determine a bandwidth allocated to each respective remote game session, wherein the bandwidth allocation process includes an initial assignment of the bandwidth floors to respective remote game sessions and iteratively incrementing respective bandwidth allocations of one or more remote game sessions based on respective adequacy values, as described in detail hereinabove. In additional or alternative embodiments, one or more optional culling operations/processes involving a subset of the remote game sessions may also be performed in response to determining that a sum of the bandwidth floors exceeds the slice bandwidth size.

Various nonlimiting example bandwidth (re)allocation scenarios that may be realized in accordance with the foregoing scheme are now set forth below.

One example scenario involves managing a 2.0 Gbs network slice for supporting nine game sessions as defined in a session list table below (Table 5):

TABLE 5

| Game Session | Tier | Floor B/W Mbs | Ceiling B/W Mbs |
| --- | --- | --- | --- |
| Raw_Data_Session_1 | 5 | 55 | 270 |
| Raw_Data_Session_2 | 4 | 55 | 120 |
| Raw_Data_Session_3 | 4 | 55 | 120 |
| BF 10 Session 4 | 4 | 55 | 120 |
| COD WWII Session 5 | 2 | 4 | 75 |
| BF1 Session 6 | 1 | 16 | 75 |
| MK14 Session 9 | 5 | 55 | 270 |
| MK 14 Session 10 | 5 | 13 | 270 |
| MK Session 11 | 2 | 2.4 | 41.25 |

In the foregoing example, respective ceiling bandwidths may be allocated to the corresponding sessions as the overall allocated bandwidth is less than the slice size (i.e., there is unused bandwidth). Ceiling bandwidth allocations for respective sessions may be based on their corresponding tier levels as determined by the game QoE profiles and potentially limited by the respective device's codec, resolution and framerate capabilities. Example MGS bandwidth manager obtains the slice size from the network slice's PCF entity, which is then apportioned and allocated to the sessions respectively. If the slice size is reduced to 1.0 Gbs, each session's bandwidth allocation may be reduced, thereby reducing the encoding bitrate accordingly for the respective sessions. Once the adjusted bandwidths are calculated, the MGS bandwidth manager is operative to report the adjusted bandwidths to the respective delivery managers in order to adjust the corresponding delivery accordingly.

In some example scenarios where there is a low bandwidth for a game session (i.e., the calculated bandwidth is less than the floor), a low bandwidth notification may be provided to the game client, which may choose to continue the game at a lower quality or discontinue the game session, as previously noted. If there is a termination of a session, the MGS bandwidth manager may commence a bandwidth reallocation process to redistribute the released bandwidth. Skilled artisans will recognize that the overall bandwidth of a network slice may therefore be allocated/reallocated dynamically in a variety of scenarios based on the type and/or timing of triggering events detected by the network.

Figure 20:
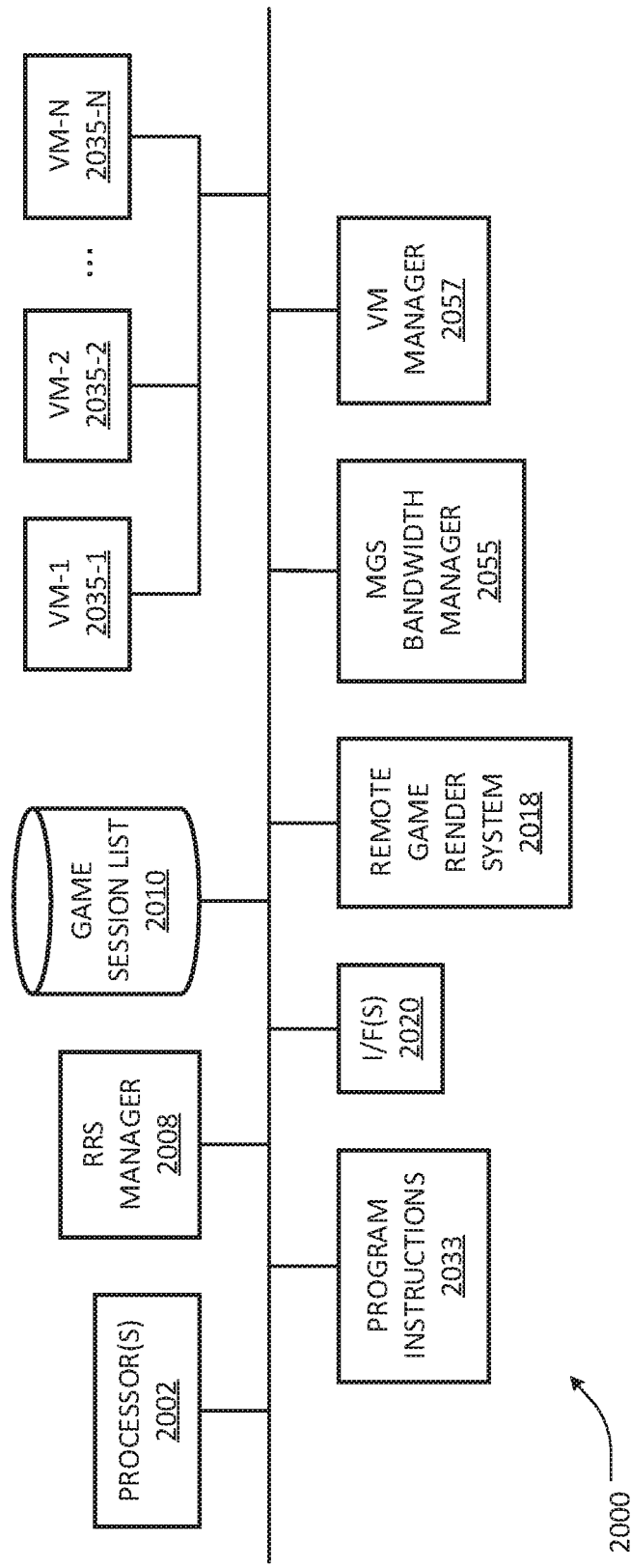
FIG. 20 depicts a block diagram of an apparatus, node, or network element configured to facilitate multisession remote game rendering in an example network environment according to an embodiment of the present disclosure.

Turning to FIG. 20, a block diagram of a computer-implemented apparatus 2000 is illustrated therein, which may be (re)configured and/or (re)arranged as a platform, (sub)system, server, node or element to effectuate an example trusted management network infrastructure portion and/or a remote back office system for facilitating multisession remote game rendering in an example network environment according to an embodiment of the present disclosure. It should be appreciated that apparatus 2000 may be implemented as a distributed network platform or as a standalone node in some arrangements. One or more processors 2002 may be operatively coupled to various modules that may be implemented in persistent memory for executing suitable program instructions or code portions (e.g., code portion 2033) with respect to effectuating any of the processes, methods and/or flowcharts set forth hereinabove in association with one or more modules, e.g., RRS manager 2008, remote game render application system or module 2018, MGS bandwidth manager 2055, as well as a VM monitor/manager 2057 according to the embodiments described herein. A game session list and/or game title profiles 2020 may be maintained as a standalone or distributed database associated with apparatus 2000 in some arrangements. VM manager 2057 is operative to facilitate and manage a plurality of VMs/containers 2035-1 to 2035-N configured to support various XR AS and XR AF entities for respective game sessions as described above in detail in reference to FIGS. 3A-3C and 4. Although not specifically shown herein, one or more Big Data analytics modules may also be interfaced with apparatus 2000 for providing predictive analytics with respect to gameplay behavior of respective game sessions. Depending on the implementation, appropriate "upstream" interfaces (I/F) and and/or "downstream" I/Fs, collectively I/F(s) 2020, may be provided for interfacing with various external/global networks, global/local game databases, game engines, slice management nodes (e.g., management and control loop framework nodes referred to Control, Orchestration, Management, Policy, and Analytics (COMPA) entities operative in association with a sliced network), as well as other components and network elements, including, e.g., routers, switches, bridges, brouters, terrestrial mobile communications infrastructure nodes/elements, NTN infrastructure nodes/elements, access network nodes, core network nodes, service provider network nodes, data center nodes, management nodes (e.g., business support system (BSS) nodes and/or other operations support system (OSS) components, etc.), wherein such interfaces may be referred to as a first interface, a second interface, and so on, depending on configuration, implementation and/or architectural design. In some deployment scenarios, the computer-implemented apparatus 2000, when suitably rearranged a specific system, may be representative of a remote game rendering support system or any associated subsystem, e.g., operative as an RRS management system, a game service management system, an MGS bandwidth management system, and/or other subsystems that may be configured operate with respective code portions or program instructions provided as separate entities or components.

In some arrangements of the computer-implemented apparatus 2000, various physical resources and services executing thereon may therefore be provided as virtual appliances wherein the resources and service functions are virtualized into suitable virtual network functions (VNFs) via a virtualization layer. Example resources may comprise compute resources, memory resources, and network interface resources, which may be virtualized into corresponding virtual resources, respectively, that may be managed by respective element management systems (EMS) via a virtualization layer (also sometimes referred to as virtual machine monitor (VMM) or "hypervisor").

It should be further appreciated that various types and/or levels of virtualization may be implemented in an example embodiment of apparatus 2000. For example, one embodiment may involve system-level virtualization, in which case the virtualization layer represents the kernel of an operating system (or a shim executing on a base operating system) that allows for the creation of multiple software containers that may each be used to execute a corresponding XR AS or XR AF application. In this embodiment, the multiple software containers (also called virtualization engines, virtual private servers, or jails) may each comprise respective virtual memory spaces that are isolated, unless explicitly allowed. Another embodiment may implement a full virtualization, in which case: (1) the virtualization layer represents a hypervisor/VMM or a hypervisor executing on top of a host operating system; and (2) the software containers each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

At least a portion of an example network architecture and associated remote game rendering systems disclosed herein may be virtualized as set forth above and architected in a cloud-computing environment comprising a shared pool of configurable virtual resources. Various pieces of hardware/software associated with remote game rendering and MGS bandwidth management, etc., may therefore be implemented in a service-oriented architecture, e.g., Software as a Service (SaaS), Platform as a Service (PaaS), Infrastructure as a Service (IaaS), Gaming as a Service (GaaS), etc., with multiple entities providing different features of an example embodiment of the present invention, wherein one or more layers of virtualized environments may be instantiated on commercial off-the-shelf (COTS) hardware. Skilled artisans will also appreciate that such a cloud-computing environment may comprise one or more of private clouds, public clouds, hybrid clouds, community clouds, distributed clouds, multiclouds and interclouds (e.g., "cloud of clouds"), and the like.

Based on the foregoing detailed description, advantages of example embodiments may be appreciated in view of the following discussion. Although a number of gaming providers are eager to offer remote gaming as a business, as noted previously, existing solutions attempt to adapt to changes in bandwidth over unmanaged networks, e.g., similar to adaptive video streaming over unmanaged networks. However, it should be recognized that the adaptation is different than adaptive bitrate (ABR) video streaming. In ABR video streaming, the content is encoded at multiple bitrates with a manifest generated representing the playlist of video segments across multiple bitrates. The client device typically buffers three segments of the manifest playlist. If the segments are ten seconds long each, then the client is provided with a 30-second buffer. As the client downloads a particular bitrate segment, the client measures the time for the download. If the download is within an upper threshold of the encoded bitrate, the client will drop in bitrate and quality for the segment or next segment to download. If the download is within a lower threshold of the encoded bitrate, the client will increase in bitrate and quality for the segment or next segment to download.

For remote gaming, typical ABR video streaming methods are not acceptable. First, the client device can only buffer a very small amount of video and audio data. Running with anything other than an extremely small buffer will cause the latency to be too high for gaming, making the game unplayable. Second, each gaming session must have its own encoding. Each session (e.g., user/player at a client device) in the game has its own game dynamics and the same encoded video and audio cannot be shared. This means each rendered game session must be encoded, delivered and decoded on a one-to-one basis. The adaptation in bandwidth is made by the server with the client attempting to get an estimate in bandwidth and dynamically adjust the encoded video, audio and haptics bitrate to fit inside of the estimated bandwidth allocation. To prevent imposing too much latency, the encoding must be extremely fast, the network latency must be low, and the client must run with an extremely small buffer. However, the existence of such conditions can be challenging to achieve, as explained in detail elsewhere in the present patent disclosure.

With the upcoming release and expansion of Fifth Generation (5G) mobile networks, there is a burgeoning interest in leveraging the higher bandwidth and lower latency of such networks to offer remote gaming services over the 5G mobile network. There currently exist certain challenges, however. For example, in a perfect network environment, remote gaming can offer an adequate Quality of Experience (QoE) to the user. Testing in less than perfect conditions with changes in bandwidth and latency, the gaming systems suffer significant reduction in the QoE and render the games practically unplayable. Because the client device runs with an extremely small buffer, sudden changes in bandwidth can cause the client device to deplete the buffer and the game becomes unplayable until the remote gaming system can adjust to compensate for the loss in bandwidth. In remote gaming, a side effect, for example, is that it may cause a player's character to suffer or die as a result of fighting enemies in the gameplay (e.g., in fighting games).

Another problem is when frames have to get retransmitted as a result of the client requesting a new Intra frame (also referred to as an "I frame"). Intra frames are extremely expensive to deliver in terms of bandwidth. When running at higher framerates such as 60 frames per second (fps) and a frame is dropped or assumed as dropped as a result in a sudden loss in bandwidth, the client requests an Intra frame to be generated. If the bitrate is too high to deliver the I frame in time, it can cause a compounding problem, making the game totally unplayable until the system can properly adjust to the new bandwidth.

High latency is yet another issue in remote rendering and cloud gaming. For non-virtual reality (non-VR) gaming, high latency can affect the overall QoE in remote game rendering. In a non-VR game rendering environment, high roundtrip latency can affect what the user sees on the screen in response to the movements made through the controller as well as, for example, the enemies the user is combating in a gameplay. If the latency is high, the gamer will suffer, for example, a loss or in-game death as a result of not seeing the opponent in time. Low latency is critical for gameplay when the game is rendered locally, and the user is playing against remote users. For remote rendering it is even more critical because all movements and in-game control must be sent from the local game controller to the network. The game engine processes the movements and actions, outputs the rendered video, audio and haptics, and encodes and transmits to the local device, which decodes and renders the video, audio and haptics locally.

For remote VR gaming, not only do the above problems remain but several other issues also arise. In a VR game setting, the user wears an immersive VR headset and where the user is looking in the headset is tracked. When the user moves their body or neck, the view inside of the headset (i.e., viewport) also changes correspondingly. For the user to feel they are in the proper presence, the game must achieve a low motion-to-photon latency. The human eye must perceive accurate and smooth movements with low motion-to-photon latency. Motion-to-photon latency is the lapse between the moment the head and body movement occurs and the video update corresponding to the new head movement. Based on multiple studies, it has been widely accepted in the industry that a target of motion-to-photon latency must be <20 ms to significantly reduce the probability of nausea or motion sickness in VR environments. In VR game setting, sensors detect where the user is looking and track head and body movements, which are then sent to the gaming engine, whereby the video rendered in the headset is adjusted to where the user is looking in the immersive VR space (e.g., up to 360-degree panorama). Typically, in local rendered video, high latencies for making these adjustments is caused by lack of processing power. As stated earlier for non-VR gaming, there are several areas that can affect latency, with a difference in VR gaming versus non-VR gaming being how the view into the immersive space is controlled. For non-VR gaming, this is controlled by the game controller. For personal computers (PCs), the game controller may be the mouse, keyboard, game pad/controller or joystick. For VR gaming, the view into the immersive space may be controlled by the sensors detecting where the user's head is looking and may be controlled by moving the head or body. This latency should be less than 20 ms from sensor detection sent to the remote gaming engine, the gaming engine adjusting for the new view, rendering the video, encoding, transmitting, and the client device decoding and rendering to avoid nausea/motion sickness. When bandwidth is low and/or latency is high, the user may experience problematic symptoms such as losing the video in the headset, slow updates of video inside of the headset, and stuttering video.

Example embodiments address these and other deficiencies by providing a managed gaming service with policy control for QoS/QoE wherein the bandwidth and latency issues are advantageously overcome while supporting high quality gaming, especially in a multisession remote gaming scenario. By leveraging a split network architecture to deploy edge-optimized infrastructure for handling computationally intensive game rendering that interoperates in concert with a cloud-hosted game application provider, multiple gaming sessions may be instantiated and bandwidth-managed in a dedicated network slice such that QoE/QoS requirements and KPIs can be met for various types of games, subscriber gaming rigs, environments, and equipment setup.

Although example embodiments and their advantages and benefits have been particularly set forth in reference to a 5G-compliant network architecture, skilled artisans will recognize that the teachings of the present disclosure are not necessarily limited thereto. Embodiments herein can therefore also be practiced in other network architectures (e.g., LTE/4G networks, 4.5G networks, 6G networks, Next Generation Networks, etc.) susceptible to supporting distributed computing topologies based on standards-based and/or proprietary interfacing for inter-component communications between the various subsystems disposed in different levels of a split architecture implementation.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices), computer programs comprising the instructions and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As pointed out previously, tangible, non-transitory computer-readable medium may include an electronic, magnetic, optical, electromagnetic, or semiconductor data storage system, apparatus, or device. More specific examples of the computer-readable medium would include the following: a portable computer diskette, a RAM circuit, a ROM circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Also, some blocks in the flowchart(s) can be optionally omitted. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Where the phrases such as "at least one of A and B" or phrases of similar import are recited or described, such a phrase should be understood to mean "only A, only B, or both A and B." Reference to an element in the singular is not intended to mean "one and only one" unless explicitly so stated, but rather "one or more." Reference to terms including one or more connecting underscores, dashes, or hyphens, etc. between constituent parts includes reference to equivalent terms without the underscore(s), dash(es) or hyphen(s). All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the scope of the claims appended below.

The invention claimed is:

1. A method for managing network slice bandwidth for remote game sessions, the method comprising:
    populating a remote game session list that identifies multiple remote game sessions sharing a network slice having a slice bandwidth size, each remote game session identified in the remote game session list with a session identifier (ID) and having a bandwidth ceiling, a bandwidth floor, and a tier, wherein the bandwidth ceiling, the bandwidth floor, and the tier corresponding to a particular respective remote game session are determined based on at least one of: a quality of service (QoS) indication identified in a session request from a gaming client device with respect to a game title, a game profile table associated with the game title, and one or more device capability parameters indicated in the session request; and
    responsive to detecting a triggering input, performing a bandwidth allocation process to determine a bandwidth allocated to each respective remote game session, wherein the bandwidth allocation process includes an initial assignment of the bandwidth floors to respective remote game sessions and iteratively incrementing respective bandwidth allocations to one or more remote game sessions based on respective adequacy values determined using at least one of respective tier, bandwidth floor and ceiling parameters.

2. The method of claim 1, further comprising performing a culling process on a subset of the remote game sessions, after the initial assignment, upon determining that a sum of the bandwidth floors exceeds the slice bandwidth size.

3. The method of claim 1, wherein the bandwidth ceiling, the bandwidth floor, and the tier corresponding to a particular respective remote game session are obtained from a delivery manager instantiated by a remote render system (RRS) manager with respect to the particular respective remote game session.

4. The method of claim 1, wherein the triggering input comprises at least one of: an increase in the slice bandwidth size, a decrease in the slice bandwidth size, an addition of a new remote game session to the network slice, a termination of an ongoing remote game session from the network slice, and a network quality change indication relative to the network slice.

5. The method of claim 4, further comprising:
    providing a notification to a gaming client device that a bandwidth allocated to a remote game session associated with the gaming client device with respect to a particular game title is less than the bandwidth floor of the associated remote game session; and
    performing one of: (i) terminating the associated remote game session; or (ii) responsive to receiving an override request from the gaming client device, continuing to maintain the associated remote game session as a low quality session.

6. The method of claim 5, further comprising, responsive to the override request from the gaming client device, providing a message to a management entity for facilitating a credit to be issued to a subscriber user of the gaming client device with respect to the particular game title.

7. The method of claim 6, wherein the associated remote game session is one of a new session to be added with respect to the particular game title or an ongoing session with respect to the particular game title.

8. The method of claim 1, wherein the step of iteratively incrementing respective bandwidth allocations is performed for a subset of remote game sessions having a minimum adequacy value.

9. The method of claim 8, wherein a bandwidth allocation of a candidate remote game session belonging to the subset is incremented subject to the bandwidth ceiling of the candidate remote game session.

10. A network slice bandwidth management system, comprising:
    one or more processors;
    a database containing a remote game session list that identifies multiple remote game sessions sharing a network slice having a slice bandwidth size, each remote game session identified in the remote game session list with a session identifier (ID) and having a bandwidth ceiling, a bandwidth floor, and a tier, wherein the bandwidth ceiling, the bandwidth floor, and the tier corresponding to a particular respective remote game session are determined based on at least one of: a quality of service (QoS) indication identified in a session request from a gaming client device with respect to a game title, a game profile table associated with the game title, and one or more device capability parameters indicated in the session request; and
    a persistent memory having program instructions stored thereon, the program instructions, when executed by the one or more processors, configured to:
    responsive to detecting a triggering input, perform a bandwidth allocation process to determine a bandwidth allocated to each respective remote game session, wherein the bandwidth allocation process includes an initial assignment of the bandwidth floors to respective remote game sessions and iteratively increment respective bandwidth allocations to one or more remote game sessions based on respective adequacy values determined using at least one of respective tier and ceiling parameters.

11. The system of claim 10, wherein the program instructions further comprise instructions for performing, after the initial assignment, a culling process on a subset of the remote game sessions, responsive to determining that a sum of the bandwidth floors exceeds the slice bandwidth size.

12. The system of claim 10, wherein the bandwidth ceiling, the bandwidth floor, and the tier corresponding to a particular respective remote game session are obtained from a delivery manager instantiated by a remote render system (RRS) manager with respect to the particular respective remote game session.

13. The system of claim 10, wherein the triggering input comprises at least one of: an increase in the slice bandwidth size, a decrease in the slice bandwidth size, an addition of a new remote game session to the network slice, a termination of an ongoing remote game session from the network slice, and a network quality change indication relative to the network slice.

14. The system of claim 13, wherein the program instructions further comprise instructions configured to:
    provide a notification to a gaming client device that a bandwidth allocated to a remote game session associated with the gaming client device with respect to a particular game title is less than the bandwidth floor of the associated remote game session; and perform one of: (i) terminating the associated remote game session; or (ii) responsive to receiving an override request from the gaming client device, continuing to maintain the associated remote game session as a low quality session.

15. The system of claim 14, wherein the program instructions further comprise instructions configured to, responsive to the override request from the gaming client device, provide a message to a management entity for facilitating a credit to be issued to a subscriber user of the gaming client device with respect to the particular game title.

16. The system of claim 15, wherein the associated remote game session is one of a new session to be added with respect to the particular game title or an ongoing session with respect to the particular game title.

17. The system of claim 10, wherein the program instructions for iteratively incrementing respective bandwidth allocations comprise instructions operative to perform incrementing for a subset of remote game sessions having a minimum adequacy value.

18. The system of claim 17, wherein the program instructions further comprise instructions for effectuating a bandwidth allocation of a candidate remote game session belonging to the subset such that the bandwidth allocation is incremented subject to the bandwidth ceiling of the candidate remote game session.

19. A computer-readable storage medium having instructions stored thereon that, when executed by one or more processors of a network slice bandwidth manager, cause the network slice bandwidth manager to perform operations comprising:

populating a remote game session list that identifies multiple remote game sessions sharing a network slice having a slice bandwidth size, each remote game session identified in the remote game session list with a session identifier (ID) and having a bandwidth ceiling, a bandwidth floor, and a tier, wherein the bandwidth ceiling, the bandwidth floor, and the tier corresponding to a particular respective remote game session are determined based on at least one of: a quality of service (QoS) indication identified in a session request from a gaming client device with respect to a game title, a game profile table associated with the game title, and one or more device capability parameters indicated in the session request; and responsive to detecting a triggering input, performing a bandwidth allocation process to determine a bandwidth allocated to each respective remote game session, wherein the bandwidth allocation process includes an initial assignment of the bandwidth floors to respective remote game sessions and iteratively incrementing respective bandwidth allocations to one or more remote game sessions based on respective adequacy values determined using at least one of respective tier, bandwidth floor and ceiling parameters.

20. The computer-readable storage medium of claim 19, wherein the instructions, when executed, cause the network slice bandwidth manager to perform operations further comprising:

performing a culling process on a subset of the remote game sessions, after the initial assignment, upon determining that a sum of the bandwidth floors exceeds the slice bandwidth size.

\* \* \* \* \*